(12) United States Patent
Carlen

(10) Patent No.: US 11,959,859 B2
(45) Date of Patent: Apr. 16, 2024

(54) MULTI-GAS DETECTION SYSTEM AND METHOD

(71) Applicant: Edwin Thomas Carlen, Almont, MI (US)

(72) Inventor: Edwin Thomas Carlen, Almont, MI (US)

( * ) Notice: Subject to any disclaimer, the term of this patent is extended or adjusted under 35 U.S.C. 154(b) by 0 days.

(21) Appl. No.: 17/828,845

(22) Filed: May 31, 2022

(65) Prior Publication Data

US 2022/0390378 A1    Dec. 8, 2022

Related U.S. Application Data

(60) Provisional application No. 63/195,974, filed on Jun. 2, 2021.

(51) Int. Cl.
*G01N 21/65* (2006.01)
*G01J 3/44* (2006.01)

(52) U.S. Cl.
CPC .............. *G01N 21/658* (2013.01); *G01J 3/44* (2013.01); *G01N 2201/0221* (2013.01); *G01N 2201/06113* (2013.01)

(58) Field of Classification Search
CPC ......... G01N 21/658; G01N 2201/0221; G01N 2201/06113; G01J 3/44
See application file for complete search history.

(56) References Cited

U.S. PATENT DOCUMENTS

| | | | |
|---|---|---|---|
| 4,222,011 A | 9/1980 | Kurnit | |
| 4,886,358 A | 12/1989 | Pellenbarg et al. | |
| 5,255,067 A | 10/1993 | Carrabba et al. | |
| 5,450,193 A | 9/1995 | Carlsen et al. | |
| 5,521,703 A | 5/1996 | Mitchell | |
| 6,795,177 B2 | 9/2004 | Doyle | |

(Continued)

FOREIGN PATENT DOCUMENTS

| | | | |
|---|---|---|---|
| WO | 2008036710 A3 | 3/2008 | |
| WO | WO2008036710 A3 | 3/2008 | |

(Continued)

OTHER PUBLICATIONS

Kumar et al., Nanopore-Induced Spontaneous Concentration for Optofluidic Sensing and Particle Assembly, 2013, American Chemical Society, 85, 971-977 (Year: 2013).*

(Continued)

*Primary Examiner* — Roy M Punnoose

(57) ABSTRACT

A Raman multi-gas detection system including an enhancement unit coupled between a light source and a detector. The enhancement unit includes a nanongrid having a plurality of nanogaps. A gas is coupled to the enhancement unit and is configured to flow through the plurality of nanogaps of the nanogrid. The nanogrid comprises one or more plasmon-active materials. The light source is configured to generate plasmon-enhanced electric fields in the plurality of nanogaps of the nanogrid to induce enhanced Raman scattering of the constituent molecules in the gas within the plurality of nanogaps such that a plurality of different constituent molecules in the gas can be detected. In one embodiment, a molecule in the gas is configured to scatter the light from the light source at a rate more than 1000 times greater than in the free space in the enhancement unit.

20 Claims, 50 Drawing Sheets

(56) References Cited

U.S. PATENT DOCUMENTS

| | | |
|---|---|---|
| 6,947,132 B1 | 9/2005 | Boss et al. |
| 6,967,717 B1 | 11/2005 | Boss et al. |
| 7,116,416 B1 | 10/2006 | Boss et al. |
| 7,139,072 B1 | 11/2006 | Boss et al. |
| 7,391,511 B1 | 6/2008 | Bratkovski et al. |
| 7,397,558 B2 | 7/2008 | Kamins et al. |
| 7,502,106 B2 | 3/2009 | Gu et al. |
| 8,427,639 B2 | 4/2013 | Moskovits et al. |
| 8,599,373 B1 | 12/2013 | Djeu et al. |
| 8,674,306 B2 | 3/2014 | Falk et al. |
| 8,736,835 B2 | 5/2014 | Djeu et al. |
| 8,830,450 B2 * | 9/2014 | Bond .............. G02B 6/107 356/73 |
| 9,322,823 B2 | 4/2016 | Denomme et al. |
| 9,581,592 B2 | 2/2017 | Fan et al. |
| 10,401,296 B1 | 9/2019 | Muller |
| 10,444,154 B2 | 10/2019 | Yamada |
| 10,520,440 B2 | 12/2019 | Mourey et al. |
| 10,633,734 B2 | 4/2020 | Walavalker et al. |
| 10,712,280 B2 | 7/2020 | Ge et al. |
| 11,118,971 B2 * | 9/2021 | Goldring .......... H04M 1/72412 |
| 2003/0230716 A1 | 12/2003 | Russel |
| 2004/0096981 A1 | 5/2004 | Weimer |
| 2006/0061762 A1 | 3/2006 | Dwight et al. |
| 2007/0020144 A1 | 1/2007 | Du et al. |
| 2007/0252982 A1 | 11/2007 | Wang et al. |
| 2008/0094621 A1 | 4/2008 | Li et al. |
| 2010/0007876 A1 | 1/2010 | Chen et al. |
| 2011/0001625 A1 * | 1/2011 | Reilly, Jr. ............ G01N 33/004 73/23.3 |
| 2011/0128536 A1 | 6/2011 | Bond et al. |
| 2011/0267613 A1 * | 11/2011 | Amako .............. G01N 21/658 356/301 |
| 2012/0081703 A1 | 4/2012 | Moskovits et al. |
| 2012/0105827 A1 | 5/2012 | Carter et al. |
| 2012/0154791 A1 | 6/2012 | Kuo et al. |
| 2012/0162640 A1 | 6/2012 | Sakagami |
| 2012/0184047 A1 | 7/2012 | Jonsson et al. |
| 2012/0236301 A1 | 10/2012 | Hashimoto |
| 2012/0262718 A1 * | 10/2012 | Yamada ............. G01N 21/553 356/436 |
| 2012/0327417 A1 | 12/2012 | Amako et al. |
| 2013/0003056 A1 | 1/2013 | Piorek et al. |
| 2013/0077094 A1 | 3/2013 | Ban et al. |
| 2013/0092823 A1 | 4/2013 | Amako et al. |
| 2013/0107254 A1 | 4/2013 | Yu et al. |
| 2013/0135617 A1 | 4/2013 | Pris et al. |
| 2014/0168651 A1 * | 6/2014 | Guo .................. G01N 21/554 359/566 |
| 2015/0062576 A1 | 3/2015 | Alam et al. |
| 2015/0098085 A1 | 4/2015 | Mano |
| 2015/0103347 A1 * | 4/2015 | Sugimoto .......... G01N 21/553 428/221 |
| 2015/0109619 A1 | 4/2015 | Sugimoto et al. |
| 2015/0131092 A1 | 5/2015 | Sakagami et al. |
| 2016/0041101 A1 | 2/2016 | Wackerbarth et al. |
| 2016/0061736 A1 | 3/2016 | Ito et al. |
| 2016/0109369 A1 | 4/2016 | Ukon |
| 2017/0030836 A1 | 2/2017 | Kim |
| 2017/0045454 A1 | 2/2017 | Sharma et al. |
| 2017/0067831 A1 | 3/2017 | Yamada |
| 2017/0089832 A1 | 3/2017 | Uemura et al. |
| 2017/0108439 A1 | 4/2017 | Stievater et al. |
| 2017/0261435 A1 | 9/2017 | Oyama et al. |
| 2021/0381895 A1 | 12/2021 | Yang et al. |

FOREIGN PATENT DOCUMENTS

| | | |
|---|---|---|
| WO | 2015026297 A1 | 2/2015 |
| WO | WO2015026297 A1 | 2/2015 |
| WO | 2016153892 A1 | 9/2016 |
| WO | WO2016153892 A1 | 9/2016 |
| WO | 2017082930 A1 | 5/2017 |
| WO | WO2017082930 A1 | 5/2017 |
| WO | 2021067742 A1 | 4/2021 |
| WO | WO2021067742 A1 | 4/2021 |

OTHER PUBLICATIONS

Wong et al., Surface-enhanced Raman scattering (SERS)-based volatile organic compounds (VOCs) detection using plasmonic bimetallic nanogap substrate, Aug. 23, 2014, Springer, 117, 687-692 (Year: 2014).*

Bahns, et al., High Fidelity Nano-Hole-Enhanced Raman Spectroscopy, Jun. 9, 2009, American Chemical Society, 113, 11190-11197. (Year: 2009).*

Pinyi Wang, et al., Hazardous Gas Detection by Cavity-Enhanced Raman Spectroscopy for Environmental Safety Monitoring, Analytical Chemistry, Nov. 14, 2021, 15474-15481, 93, 46, American Chemical Society, USA.

Andreas Knebl, et al., Hydrogen and C2-C6 Alkane Sensing in Complex Fuel Gas Mixtures with Fiber-Enhanced Raman Spectroscopy, Analytical Chemistry, Jul. 23, 2021, 10546-10552, 93, 30, American Chemical Society, USA.

William S.M. Brooks, et al., Development of a gas-phase Raman instrument using a hollow core anti-resonant tubular fibre, Journal of Raman Spectroscopy, Oct. 2021, 1772-1782, 52, 10, John Wiley & Sons Ltd., UK.

Jianxin Wang, et al., Fiber-enhanced Raman spectroscopy for highly sensitive H2 and SO2 sensing with a hollow core anti-resonant fiber, Optics Express, Sep. 27, 2021, 32296-32311, 29, 20, Optical Society of America, USA.

Dmitry V. Petrov, et al., Silver holographic gratings as substrates for surface-enhanced Raman scattering gas analysis, Applied Optics, Mar. 20, 2020, 2929-2934, 59, 9, Optical Society of America, USA.

Dmitry V. Petrov, et al., Enhancement of Raman scattering of a gaseous medium near the surface of a silver holographic grating, Optics Letters, Nov. 15, 2017, 4728-4731, 42, 22, Optical Society of America, USA.

Dmitry V. Petrov, et al., Multipass optical system for a Raman gas spectrometer, Applied Optics, Nov. 20, 2016, 9521-9525, 55, 33, Optical Society of America, USA.

S.A. Holmstrom, et al., Trace gas Raman spectroscopy using functionalized waveguides, Optica, Aug. 2016, 891-896, 3, 8, Optical Society of America, USA.

M. Hippler, et al., Cavity-enhanced Raman spectroscopy of natural gas with optical feedback cw-diode lasers, Analytical Chemistry, Jul. 10, 2015, 7803-7809, 87, 15, American Chemical Society, USA.

J. Thorstensen, et al., Low-cost resonant cavity Raman gas probe for multi-gas detection, Journal of the European Optical Society Rapid Publication, Dec. 16, 2014, 14054, 9, European Optical Society, Finland.

S. Hanf, et al., Fiber-enhanced Raman multigas spectroscopy: A versatile tool for environmental gas sensing and breath analysis, Analytical Chemistry, May 20, 2014, 5278-5285, 86, 11, American Chemical Society, USA.

B. Petrak, et al., Purcell-enhanced Raman scattering from atmospheric gases in a high-finesse microcavity, Physical Review A, Feb. 10, 2014, 023811, 89, 2, American Physical Society, USA.

Loan Li Thi Ngoc, et al., Large area metal nanowire arrays with tunable sub-20 nm nanogaps, ACS Nano, May 6, 2013, 5223-5234, 7, 6, American Chemical Society, USA.

S.I. Rae, et al., Surface enhanced Raman spectroscopy (SERS) sensors for gas analysis, Analyst, Apr. 12, 2010, 1365-1369, 135, 6, The Royal Society of Chemistry, UK.

M.P. Buric, et al., Improved sensitivity gas detection by spontaneous Raman scattering, Applied Optics, Aug. 1, 2009, 4424-4429, 48, 22, Optical Society of America USA.

F. Eftekhari, et al., Nanoholes as nanochannels: flow-through plasmonic sensing, Analytical Chemistry, May 1, 2009, 4308-4311, 81, 11, American Chemical Society, USA.

Xiaoyun Li, et al., Near-confocal cavity-enhanced Raman spectroscopy for multitrace-gas detection, Optics Letters, Sep. 15, 2008, 2143-2145, 33, 18, Optical Society of America, USA.

(56) References Cited

OTHER PUBLICATIONS

W.F. Pearman, et al., Quantitative measurements of CO2 and CH4 using a multipass Raman capillary cell, Applied Optics, Sep. 1, 2008, 4627-4632, 47, 25, Optical Society of America, USA.

M.P. Buric, et al., Enhanced spontaneous Raman scattering and gas composition analysis using a photonic crystal fiber, Applied Optics, Aug. 10, 2008, 4255-4261, 47, 23, Optical Society of America, USA.

Brian D. Piorek, et al., Free-surface microfluidic control of surface-enhanced Raman spectroscopy for the optimized detection of airborne molecules, Proceedings of The National Academy of Sciences of the USA, Nov. 27, 2007, 18898-18901, 104, 48, The National Academy of Sciences of the USA.

He Yan, et al., Hollow core photonic crystal fiber surface-enhanced Raman probe, Applied Physics Letters, Nov. 15, 2006, 20401, 89, 20, American Institute of Physics Publishing, USA.

Chi Lok Wong, et al., Surface-enhanced Raman scattering SERS)-based volatile organic compounds (VOCs) detection using plasmonic bimetallic nanogap substrate, Aug. 23, 2014, Applied Physics A, Springer, 117, 687-692 (Year: 2014).

Shailabh Kumar, et al., Nanopore-Induced Spontaneous Concentration for Optofluidic Sensing and Particle Assembly, 2013, Analytical Chemistry, American Chemical Society, 85, 971-977 (Year: 2013).

John T Bahns, et al., High Fidelity Nano-Hole-Enhanced Raman Spectroscopy, Jun. 9, 2009, J. Phys. Chem. C, American Chemical Society, 113, 11190 11197. (Year: 2009).

\* cited by examiner

MULTI-GAS DETECTION SYSTEM AND METHOD

FIELD

The present invention relates to gas detection for the identification and concentration quantification of the molecular constituents of a gas and more specifically to the identification of a plurality of gases in a hand held gas detector.

BACKGROUND OF INVENTION

Many industries employ multi-gas detectors for monitoring and controlling hazardous gas emissions, such as flammable, explosive, and toxic gases commonly used and produced by industrial and manufacturing processes, such as, but not limited to, oil and gas refineries, chemical processing and production, power generation, glass and ceramic production, cement production, metal production, wastewater treatment, mining operations, military operations, and the shipping industry.

Monitoring industrial process gases with a multi-gas detector and their subsequent control is an effective way to optimize manufacturing efficiency, such as monitoring flue gas concentrations to optimize the combustion process of furnaces, heaters, and boilers, which can result in significant operational cost savings, as well as reducing the emission of hazardous and toxic pollutants to satisfy regulatory requirements.

Multi-gas detectors are employed for assessing outdoor air quality by means of monitoring various hazardous gases and pollutants, such as, but not limited to, oxygen, carbon monoxide, carbon dioxide, nitrogen oxides, ammonia and sulfur dioxide, hydrocarbons, volatile organic compounds, and many others. Industrial operations use air quality levels to provide controls to maintain a safe work environment and ensure compliance with environmental regulations. Smart cites are employing networks of wirelessly connected multi-gas detectors for assessing environmental air quality to ensure the health and safety of its citizens.

Multi-gas detectors are also important for indoor air quality monitoring of various hazardous gases and pollutants that can occur in private homes and office buildings. Furthermore, multi-gas detectors are used for monitoring the indoor air quality of automobile cabins. Portable handheld multi-gas detectors are critical for monitoring mobile, unknown, and remote sources of hazardous gases, which are important for applications such as, but not limited to, non-stationary industrial hazard monitoring, environmental hazard monitoring, pre-entry monitoring of confined spaces, hazardous materials handling, and emergency response. Another important application area for multi-gas detectors is for the detection and analyses of the constituent gases in exhaled breath, which are commonly called breathalyzers. Breathalyzers for medical diagnostics that detect the constituent gases in exhaled breath is important for non-invasive and early warning disease detection, such as, but not limited to, Type 1 diabetes, cancers, and other diseases. Furthermore, multi-gas detector breathalyzers employed to monitor exhaled breath for trace amounts of gases indicative of alcohol and/or marijuana consumption are important for enforcing safe vehicle and heavy equipment operation.

Conventional multi-gas detectors capable of the detection, identification, and concentration quantification of the molecular constituents of multi-gas samples are large and expensive instruments that are typically slow and can require cumbersome sample preparation procedures, such as mass spectrometry, gas chromatography, and various types of optical spectroscopy, such as Fourier transform infrared spectroscopy and Raman spectroscopy.

Currently, there is no commercially available portable handheld multi-gas detector capable of identifying and quantifying multiple constituent gases in a multi-gas sample with high selectivity, and capable of spectral fingerprinting specific gases in a multi-gas sample. Herein, portable is defined as a multi-gas detector small enough to fit into the hand of a person. Furthermore, there is no commercially available handheld multi-gas sampling probe, for connection to an external portable Raman detector, that is capable of detecting, identifying, and quantifying the constituent gases of a multi-gas sample. There is strong demand for a portable multi-gas detector, handheld multi-gas sampling probe, and fixed-location multi-gas detector capable of highly accurate, rapid, and reliable detection, identification, and concentration quantification of multiple different constituent gases in a multi-gas sample.

BRIEF DESCRIPTION OF THE DRAWINGS

Various features of the system are set forth with particularity in the appended claims. The embodiments herein, can be understood by reference to the following description, taken in conjunction with the accompanying drawings, in which:

DETAILED DESCRIPTION

Figure 1:
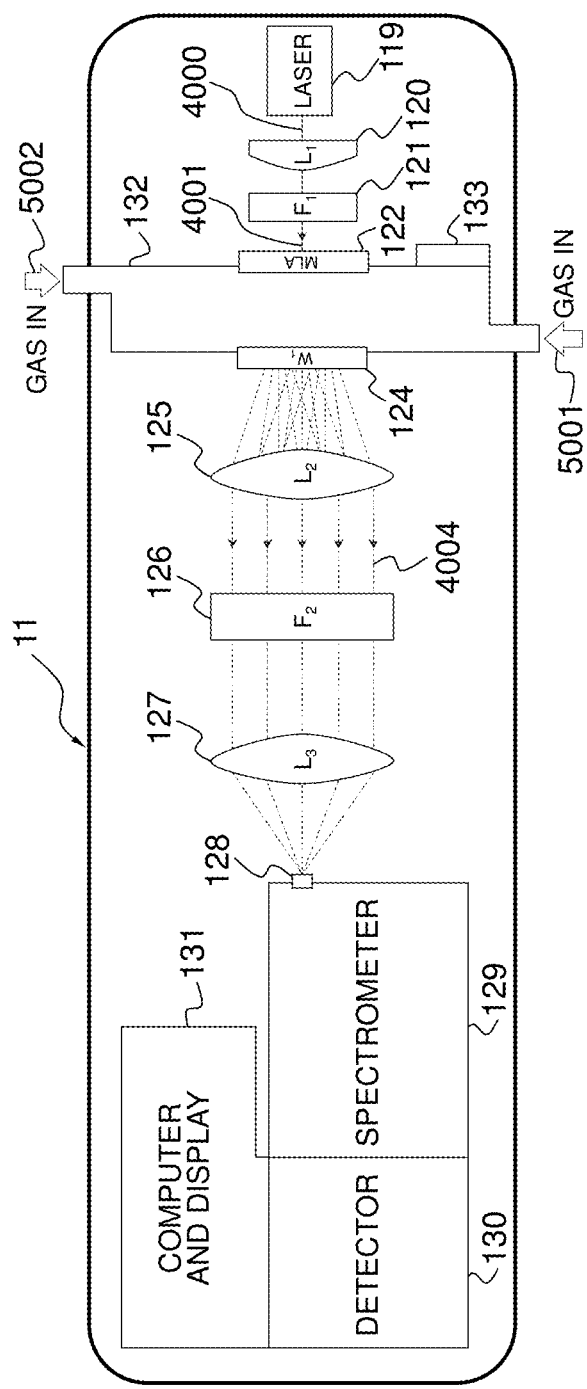
FIG. 1 is a schematic diagram of a multi-gas Raman detector with pump-driven gas sampling according to one example embodiment of the present invention.

The following description of embodiment(s) is merely illustrative in nature and is in no way intended to limit the invention, its application, or uses.

For simplicity and clarity of the illustration(s), elements in the figures are not necessarily to scale, are only schematic, are non-limiting, and the same reference numbers in different figures denote the same elements, unless stated otherwise. Additionally, descriptions and details of well-known steps and elements are omitted for simplicity of the description. Notice that once an item is defined in one figure, it may not be discussed or further defined in the following figures.

The terms "first", "second", "third" and the like in the Claims or/and in the Detailed Description are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Processes, techniques, apparatus, and materials as known by one of ordinary skill in the art may not be discussed in detail but are intended to be part of the enabling description where appropriate.

While the specification concludes with claims defining the features of the invention that are regarded as novel, it is believed that the invention will be better understood from a consideration of the following description in conjunction with the drawing figures, in which like reference numerals are carried forward.

The current invention describes a multi-gas detector that utilizes enhanced Raman scattering. As is well known in the art, Raman spectroscopy is a proven technique for the simultaneous detection and analyses of the constituent gases in a multi-gas sample, where Stokes-shifted Raman scattered light from most types of gas molecules form a unique set of bands occurring at specific frequencies and intensities that represent molecular vibrations of specific molecular bonds. The Raman spectra of these different gases represent molecular fingerprints that can be used for highly specific identification and concentration quantification of the molecular constituents of a multi-gas sample. As is also well known in the art, Raman scattering is an optical process generated due to the interaction of a laser beam with the sample being analyzed. However, the Raman scattering process is very weak, especially for low-density gaseous samples, which typically requires the use of a high-power laser and a high sensitivity detector, and results in long detection times, thus severely limiting its use for practical gas detection and analyses. The multi-gas Raman detector of the present invention utilizes an array of flow-through enhancement nanostructures structured with flow-through nanogaps, termed flow-through enhancement nanogrids herein, where Raman scattering from the constituent molecules in a sample gas within, or flowing through, the nanogaps of each nanogrid, is strongly enhanced by plasmon-enhanced electric fields generated in the nanogaps of the nanogrids by an array of incident laser beams.

A multi-gas detector utilizing plasmon-enhanced Raman scattering of a multi-gas sample enables the use of a low-power laser diode and low-cost optical components while providing a low limit of detection limit and short detection time. Such a multi-gas Raman detector, utilizing plasmon-enhanced Raman scattering, enables a portable handheld Raman spectroscopy system that is capable of detecting, identifying, and quantifying a wide range of gases with one enhancement unit coupled to one detection hardware configuration, e.g., but not limited to, oxygen ($O_2$), nitrogen ($N_2$), hydrogen ($H_2$), chlorine ($Cl_2$), hydrofluoric acid (HF), hydrochloric acid (HCl), hydrogen cyanide (HCN), carbon monoxide (CO), carbon dioxide ($CO_2$), ozone ($O_3$), nitric oxide (NO), nitrogen dioxide ($NO_2$), nitrous oxide ($N_2O$), sulfur dioxide ($SO_2$), hydrogen sulfide ($H_2S$), chlorine dioxide ($ClO_2$), ammonia ($NH_3$), phosphine ($PH_3$), arsine ($AsH_3$), silane ($SiH_4$), hydrogen bromide (HBr), ammonium chloride ($NH_4Cl$), formaldehyde ($CH_2O$), carbon tetrachloride ($CCl_4$), chloroform ($CHCl_3$), phosgene ($COCl_2$), perchloroethylene ($C_2Cl_4$), methane ($CH_4$), propane ($C_3H_8$), methanol ($CH_3OH$), ethanol ($C_2H_5OH$), methyl ethyl ketone ($C_4H_8O$), isopropyl alcohol ($C_3H_8O$), acetylene ($C_2H_2$), ethylene ($C_2H_4$), ethane ($C_2H_6$), butane ($C_4H_{10}$), hexane ($C_6H_{14}$), pentane ($C_5H_{12}$), ethylene oxide ($C_2H_4O$), acetaldehyde ($CH_3CHO$), benzene ($C_6H_6$), toluene ($C_7H_8$), acetone ($C_3H_6O$), carbon tetrafluoride ($CF_4$), sulfur hexafluoride ($SF_6$), silicon tetrafluoride ($SiF_4$), sulfuryl fluoride ($SO_2F_2$), styrene ($C_8H_8$), xylenes ($C_8H_{10}$), trichloroethane ($C_2H_3Cl_3$), and ethylbenzene ($C_6H_5CH_2CH_3$).

A multi-gas detector utilizing plasmon-enhanced Raman scattering of a multi-gas sample enables the use of a low-power laser diode and low-cost optical components while providing a low limit of detection limit and short detection time. Such a multi-gas Raman detector, utilizing plasmon-enhanced Raman scattering, enables a portable handheld Raman spectroscopy system that is capable of simultaneously detecting, identifying, and quantifying many gases in a multi-gas mixture with one enhancement unit coupled to one detection hardware configuration, e.g., but not limited to, oxygen ($O_2$), nitrogen ($N_2$), hydrogen ($H_2$), chlorine ($Cl_2$), hydrogen cyanide (HCN), carbon monoxide (CO), carbon dioxide ($CO_2$), ozone ($O_3$), nitric oxide (NO), nitrogen dioxide ($NO_2$), nitrous oxide ($N_2O$), sulfur dioxide ($SO_2$), hydrogen sulfide ($H_2S$), chlorine dioxide ($ClO_2$), ammonia ($NH_3$), phosphine ($PH_3$), formaldehyde ($CH_2O$), acetylene ($C_2H_2$), methane ($CH_4$), propane ($C_3H_8$), and butane ($C_4H_{10}$).

FIG. 1 illustrates a multi-gas Raman detector 11 as an example embodiment in accordance with the current invention. Multi-gas Raman detector 11 employs an array of flow-through nanogrids that provide plasmon-enhanced Raman scattering of the constituent molecules in a multi-gas sample within, or flowing through, each of the nanogaps of the nanogrids, which is described elsewhere herein. Multi-gas Raman detector 11 includes a laser source 119 generating a linearly polarized laser beam 4000 with a wavelength in the VIS to NIR spectral range of 400 nm up to 1200 nm. Most commercially available lasers produce a linearly polarized laser beam. In certain cases, the laser beam polarization state is aligned to the orientation of the nanogrids of the flow-through enhancement nanogrid array, which is part of the enhancement unit 132 and is described elsewhere herein. A collimation lens 120 is coupled to laser source 119. A narrow-band bandpass cleanup filter 121 is coupled to collimation lens 120. Cleanup filter 121 removes optical noise accompanying the laser beam. The collimated laser beam 4001 enters enhancement unit 132 via a microlens array 122, made of fused silica, BK7 glass, or similar appropriate material, and the outer face of microlens array 122 is coated with an anti-reflective layer. Microlens array 122 distributes collimated laser beam 4001 into an array of focused laser beamlets each spatially aligned to one flow-through nanogrid, of an array of flow-through enhancement nanogrids, located within enhancement unit 132, which is described elsewhere herein. The focused laser beamlets at each of the nanogrids generate plasmon-enhanced Stokes-shifted Raman scattering of the constituent molecules in a multi-gas sample within, or flowing through, each of the nanogrids, which is described elsewhere herein. The gas sample is drawn through each of the flow-through nanogrids located in enhancement unit 132, via gas inlets 5001 and 5002, using motorized pump 133. Sample gas drawn through gas inlet 5001 passes through the enhancement nanogrids from the top surface to the bottom surface, which will be described elsewhere herein. Sample gas drawn through gas inlet 5002 flows through the enhancement nanogrids from the bottom surface to the top surface, which will be described elsewhere herein. Motorized pump 133 may be a diaphragm pump, rotary pump, or peristaltic pump, actively draws the sample gas into enhancement unit 132 and can reduce the response time of the multi-gas detector. The multi-gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the Raman scattered signals, which is described elsewhere herein. Alternatively, the flow of the sample gas can be pulsed, on and off, with a variable duty cycle to optimize the residence time of the sample in the nanogaps of the enhancement nanogrids, while ensuring sufficient sample gas is drawn through the detector. A filter is used at the gas inlets to remove particles and debris from the sample gas. The enhanced Raman scattered signals, generated from gas molecules at the top surfaces of the flow-through enhancement nanogrids, as part of enhancement unit 132, pass through optical window 124, and are collected and collimated by lens 125. The enhanced Raman signals 4004 pass through laser rejection filter 126 removing laser light prior to entering spectrometer 129. Lens 127 focuses the enhanced Raman signals 4004 at entrance slit 128 of spectrometer 129. The étendue of the optical collection system, comprised of optical elements 124, 125, 126, 127, and 128, is optimized to maximize the intensity of the enhanced Raman scattered signals. Etendue is defined as the product of the cross-sectional area of a light beam and the solid angle it subtends. An optimal étendue has an optical system where the spot size of the collection lens, or lenses, of the enhanced scattered Raman light and associated solid angle, is configured to match entrance slit 128 and spectrometer 129. Optical detector 130 detects the dispersed Raman scattered emission lines from spectrometer 129 and converts the optical signal data into a format suitable for data processing by digital computer 131, for data analytics, visual display of a spectrum representing the vibration bands of the constituent molecules in a multi-gas sample, and for providing alerts of potential hazardous gases, or other gases of interest, in a multi-gas sample.

Figure 2:
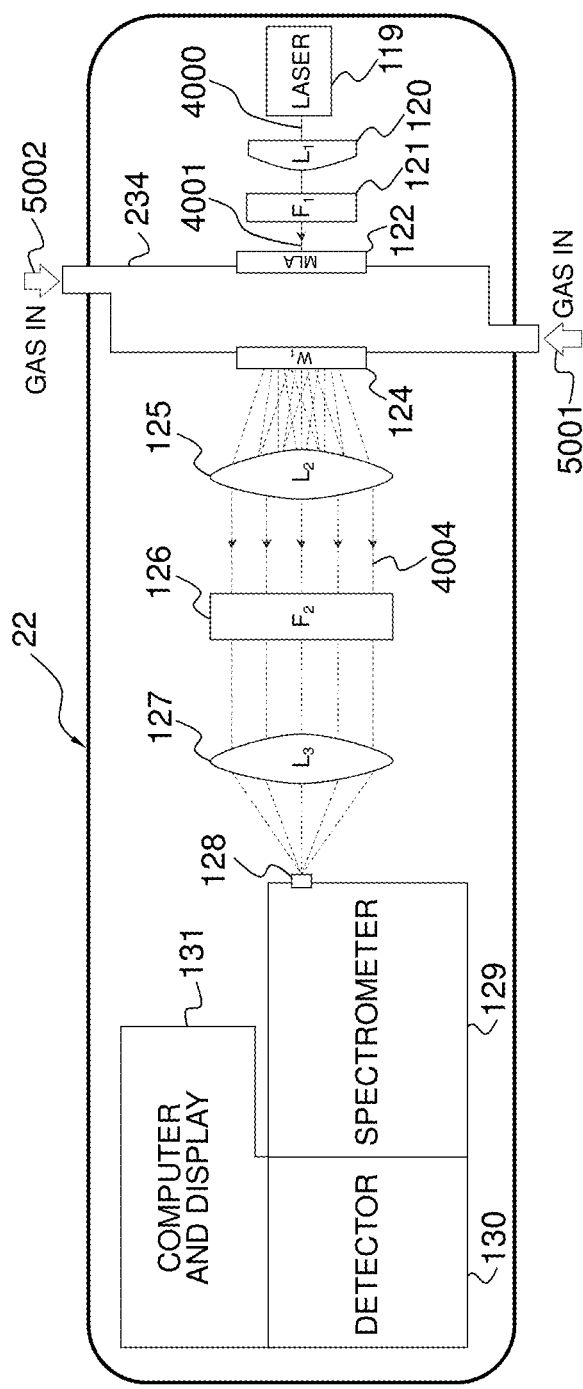
FIG. 2 is a schematic diagram of a multi-gas Raman detector with diffusion-driven gas sampling according to an example embodiment of the present invention.

FIG. 2 illustrates a multi-gas Raman detector 22 as an example embodiment in accordance with the current invention. Multi-gas Raman detector 22 employs an array of flow-through nanogrids that generate plasmon-enhanced Raman scattering of the constituent molecules in a multi-gas sample within, or flowing through, each of the nanogrids, which is described elsewhere herein. Multi-gas Raman detector 22 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 234, which is described elsewhere herein. Collimation lens 120 is coupled to laser source 119. Narrow-band bandpass cleanup filter 121 is coupled to collimation lens 120. Cleanup filter 121 removes optical noise accompanying the laser beam. Collimated laser beam 4001 enters enhancement 234 via microlens array 122, which is made of an appropriate material and outer face coated with an anti-reflective layer. Microlens array 122 distributes the incident collimated laser beam into an array of focused laser beamlets each spatially aligned to a nanogrid, of an array of flow-through enhancement nanogrid located within enhancement unit 234, which is described elsewhere herein. The focused laser beamlets at each of the nanogrids provide plasmon-enhanced Stokes-shifted Raman scattering of the constituent molecules in a multi-gas sample within, or flowing through, each of the flow-through nanogrids, which is described elsewhere herein. In this embodiment of the invention, the gas sample moves through the flow-through nanogrids of enhancement unit 234, via gas inlets 5001 and 5002, by diffusion. Diffusion-driven sample gas flow is a passive process that reduces the cost and power consumption of the multi-gas detector, while typically resulting in a longer response time. Sample gas entering through gas inlet 5001 flows through the enhancement nanogrids from the top surface to the bottom surface, which will be described elsewhere herein. Sample gas entering through gas inlet 5002 flows through the enhancement nanogrids from the bottom surface to the top surface, which will be described elsewhere herein. A filter is used at the gas inlets to remove particles and debris from the sample gas. The enhanced Raman scattered signals, generated from gas molecules at the top surface of the flow-through enhancement nanogrid, as part of the enhancement unit 234, pass through optical window 124 and are collected and collimated by lens 125. Enhanced Raman signals 4004 pass through laser rejection filter 126 to remove laser light prior to entering spectrometer 129. Lens 127 focuses Raman scattered signals 4004 at entrance slit 128 of spectrometer 129. The étendue of the optical collection system, comprised of optical elements 124, 125, 126, 127, and 128, is optimized to maximize the intensity of the enhanced Raman scattered signals. Optical detector 130 detects the dispersed Raman scattered emission lines and converts the optical signal data into a format suitable for data processing by digital computer 131 for data analytics and visual display of the Raman spectrum representing the vibration bands of the constituent molecules in a multi-gas sample, and for providing alerts of potential hazardous gases, or other gases of interest, in a multi-gas sample.

Figure 3:
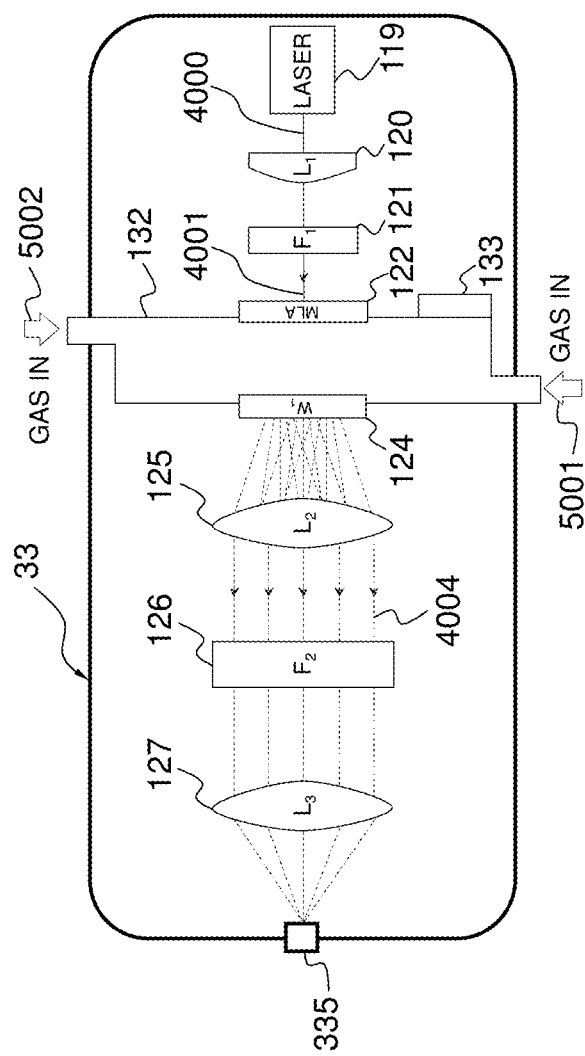
FIG. 3 is a schematic diagram of a multi-gas Raman detector with a fiber-optic port for connection to an external Raman detector and pump-driven gas sampling according to an example embodiment of the present invention.

FIG. 3 illustrates a multi-gas Raman detector 33 as an example embodiment in accordance with the current invention. Multi-gas Raman detector 33 is connected to an external Raman detector via a fiber optic cable and enables the detection of multi-gas samples using any suitable external Raman detector. The gas sample is actively drawn through the detector by a motorized pump. Multi-gas Raman detector 33 employs an array of flow-through nanogrids that provide plasmon-enhanced Raman scattering of the constituent molecules in a multi-gas sample within, or flowing through, each of the nanogrids, which is described elsewhere herein. Multi-gas Raman detector 33 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 132, which is described elsewhere herein. Collimation lens 120 is coupled to laser source 119. Narrow-band bandpass cleanup filter 121 is coupled to collimation lens 120. Cleanup filter 121 removes optical noise accompanying the laser beam. Collimated laser beam 4001 enters enhancement unit 132 via microlens array 122, which is made of an appropriate material with the outer face coated with an anti-reflective layer. Microlens array 122 distributes the incident collimated laser beam into an array of focused laser beamlets each spatially aligned to a nanogrid of an array of flow-through enhancement nanogrids located within enhancement unit 132, which is described elsewhere herein. The focused laser beamlets at each of the nanogrids provide plasmon-enhanced Stokes-shifted Raman scattering of the constituent molecules in a multi-gas sample within, or flowing through, each of the flow-through nanogrids, which is described elsewhere herein. The sample gas is drawn through enhancement unit 132, via gas inlets 5001 and 5002, using motorized pump 133. Sample gas drawn through gas inlet 5001 passes through the enhancement nanogrids from the top surface to the bottom surface, which will be described elsewhere herein. Sample gas drawn through gas inlet 5002 flows through the enhancement nanogrids from the bottom surface to the top surface, which will be described elsewhere herein. Motorized pump 133 enables the multi-gas Raman detector to draw a sample gas from a potentially hazardous area prior to entering, which is important for many industrial sites requiring access to confined spaces. The motorized pump actively draws the sample gas into enhancement unit 132 and can reduce the response time of the multi-gas Raman detector. The multi-gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the enhanced Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at the gas inlets to remove particles and debris from the sample gas. The generated enhanced Raman scattered signals, from gas molecules at the top surface of a flow-through enhancement nanogrid, as part of enhancement unit 132, pass through optical window 124, and are collected and collimated by lens 125. Enhanced Raman scattered signals 4004 pass through laser rejection filter 126 to remove laser light. Lens 127 focuses enhanced Raman scattered signals 4004 at exit fiber-optic port 335. The étendue of the optical collection system, comprised of optical elements 124, 125, 126, 127, and 335, is optimized to maximize the enhanced Raman scattered signals. The multi-gas Raman detector 33 is coupled to an external Raman detector using an appropriate fiber-optic cable through exit port 335.

Figure 4:
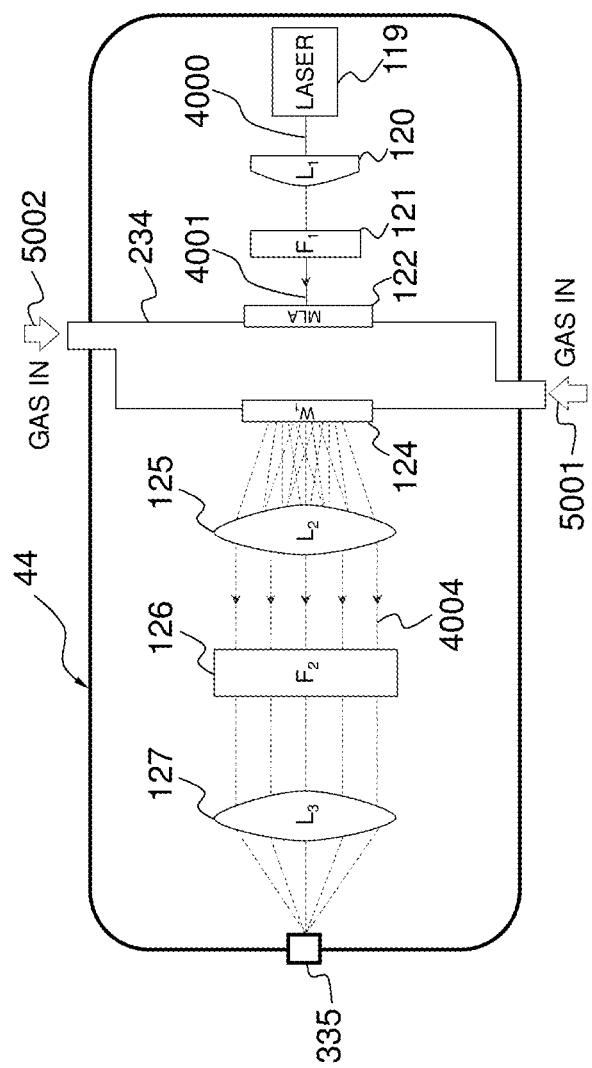
FIG. 4 is a schematic diagram of a multi-gas Raman detector with a fiber-optic port for connection to an external Raman detector, and diffusion-driven gas sampling according to an example embodiment of the present invention.

FIG. 4 illustrates a multi-gas Raman detector 44 as an example embodiment in accordance with the current invention. Multi-gas Raman detector 44 is connected to an external Raman detector via a fiber optic cable and enables the detection of multi-gas samples using any suitable external Raman detector. The gas sample moves through the detector by diffusion. Multi-gas Raman detector 44 employs an array of flow-through nanogrids that generate plasmon-enhanced Raman scattering of the constituent molecules in a multi-gas sample within, or gas flowing, through each of the nanogrids, which is described elsewhere herein. Multi-gas Raman detector 44 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 234, which is described elsewhere herein. Collimation lens 120 is coupled to laser source 119. Narrow-band bandpass cleanup filter 121 is coupled to collimation lens 120. Cleanup filter 121 removes optical noise accompanying the laser beam. Collimated laser beam 4001 enters enhancement unit 234 via microlens array 122, which is made of an appropriate material with the outer face coated with an anti-reflective layer. Microlens array 122 distributes the incident collimated laser beam into an array of focused laser beamlets each spatially aligned to a nanogrid of an array of flow-through enhancement nanogrid located within enhancement unit 234, which is described elsewhere herein. The focused laser beams at each of the nanogrids provide plasmon-enhanced Stokes-shifted Raman scattering of the constituent molecules in a multi-gas sample within, or flowing through, each flow-through nanogrid, which is described elsewhere herein. In this embodiment of the invention, the gas sample moves through the flow-through nanogrids of enhancement unit 234, via gas inlets 5001 and 5002, by diffusion. Diffusion-driven sample gas flow is a passive process that reduces the cost and power consumption of the multi-gas Raman detector, while typically resulting in a longer response time. Sample gas entering through gas inlet 5001 flows through the enhancement nanogrids from the top surface to the bottom surface, which will be described elsewhere herein. Sample gas entering through gas inlet 5002 flows through the enhancement nanogrids from the bottom surface to the top surface, which will be described elsewhere herein. A filter is used at the gas inlets to remove particles and debris from the sample gas. The generated enhanced Raman scattered signals, from the gas molecules at the top surface of a flow-through enhancement nanogrid as part of enhancement unit 234, pass through optical window 124 and are collected and collimated by lens 125. Enhanced Raman scattered signals 4004 pass through laser rejection filter 126 to remove laser light. Lens 127 focuses the enhanced Raman scattered signals at exit fiber-optic port 335. The étendue of the optical collection system, comprised of optical elements 124, 125, 126, 127, and 335, is optimized to maximize the intensity of the Raman scattered signals. Multi-gas Raman detector 44 is coupled to an external Raman detector by an appropriate fiber-optic cable through exit port 335. The external Raman detector provides alerts of potential hazardous gases, or other gases of interest, in a multi-gas.

Figure 5:
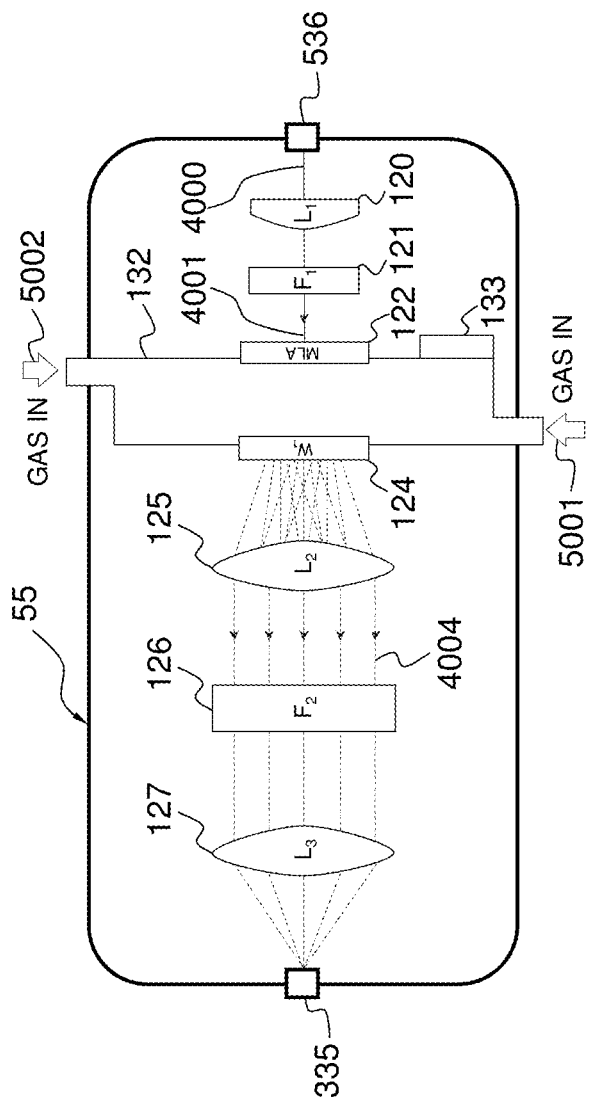
FIG. 5 is a schematic diagram of a multi-gas Raman detector with fiber-optic ports for connection to an external laser and external Raman detector, and pump-driven gas sampling according to an example embodiment of the present invention.

FIG. 5 illustrates a multi-gas Raman detector 55 as an example embodiment in accordance with the current invention. Multi-gas Raman detector 55 is connected to an external laser source and an external Raman detector via fiber optic cables and enables the detection of multi-gas samples. The gas sample is actively drawn through the detector by a motorized pump. Multi-gas Raman detector 55 employs an array of flow-through nanogrids that provide plasmon-enhanced Raman scattering of the constituent molecules in a multi-gas sample within, or flowing through, each of the nanogrids. An external laser source, generating laser beam 4000 with a wavelength in the VIS to NIR range, is coupled to multi-gas Raman detector 55 by an appropriate fiber-optic cable connected to entrance port 536. The laser source polarization is controlled and described elsewhere herein. Collimation lens 120 is coupled to the laser beam 4000 that enters multi-gas Raman detector 55 through port 536. Narrow-band bandpass cleanup filter 121 is coupled to collimation lens 120. Cleanup filter 121 removes optical noise accompanying the laser beam. Collimated laser beam 4001 enters enhancement unit 132 via microlens array 122, which is made of an appropriate material with the outer face coated with an anti-reflective layer. Microlens array 122 distributes the incident collimated laser beam into an array of focused laser beamlets each spatially aligned to a nanogrid of an array of flow-through enhancement nanogrids located within enhancement unit 132, which is described elsewhere herein. The focused laser beams at each of the nanogrids provide plasmon-enhanced Stokes-shifted Raman scattering of the constituent molecules in a multi-gas sample within, or flowing through, each of the flow-through nanogrids, which is described elsewhere herein. The sample gas is drawn through enhancement unit 132, via gas inlets 5001 and 5002, using motorized pump 133. Motorized pump 133 enables the handheld multi-gas Raman detector to draw a sample gas from a potentially hazardous area prior to entering, which is important for many industrial sites requiring access to confined spaces. Sample gas drawn through gas inlet 5001 passes through the enhancement nanogrids from the top surface to the bottom surface, which will be described elsewhere herein. Sample gas drawn through gas inlet 5002 flows through the enhancement nanogrids from the bottom surface to the top surface, which will be described elsewhere herein. A motorized pump actively draws the sample gas into enhancement unit 132 and can reduce the response time of the multi-gas Raman detector. The multi-gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at the gas inlets to remove particles and debris from the sample gas. The generated enhanced Raman scattered signals, from gas molecules at the top surface of a flow-through enhancement nanogrid as part of enhancement unit 132, pass through optical window 124, and are collected and collimated by lens 125. Enhanced Raman scattered signals 4004 pass through laser rejection filter 126 to remove laser light. Lens 127 focuses the Raman scattered signals at exit fiber-optic port 335. The étendue of the optical collection system, comprised of optical elements 124, 125, 126, 127, and 335, is optimized to maximize the enhanced Raman scattered signals. Multi-gas Raman detector 55 is coupled to an external Raman detector using an appropriate fiber-optic cable through exit port 335.

Figure 6:
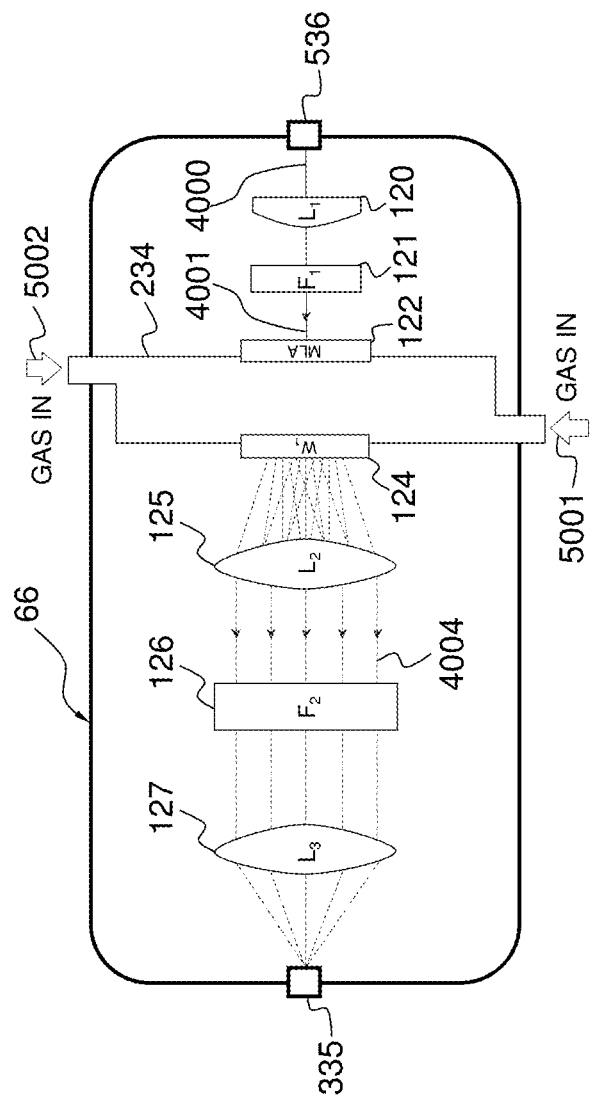
FIG. 6 is a schematic diagram of a multi-gas Raman detector with fiber-optic ports for connection to an external laser and external Raman detector, and diffusion-driven gas sampling according to an example embodiment of the present invention.

FIG. 6 illustrates a multi-gas Raman detector 66 as an example embodiment in accordance with the current invention. Multi-gas Raman detector 66 is connected to an external laser source and an external Raman detector via fiber optic cables and enables the detection of multi-gas samples. The gas sample moves through the detector by diffusion. Multi-gas Raman detector 66 employs an array of flow-through nanogrids that generate plasmon-enhanced Raman scattering of the constituent molecules in a multi-gas sample within, or gas flowing, through each of the nanogrids, which is described elsewhere herein. An external laser source, generating a laser beam 4000 with a wavelength in the VIS to NIR range, is coupled to the multi-gas Raman detector 66 by a fiber-optic cable connected to entrance fiber-optic port 536. The laser source polarization is controlled and described elsewhere herein. Collimation lens 120 is coupled to the laser beam 4000 that enters multi-gas Raman detector 66 through entrance fiber-optic port 536. Narrow-band bandpass cleanup filter 121 is coupled to collimation lens 120. Cleanup filter 121 removes optical noise accompanying the laser beam. Collimated laser beam 4001 enters enhancement unit 234 via microlens array 122, which is made of an appropriate material with the outer face coated with an anti-reflective layer. Microlens array 122 distributes incident collimated laser beam 4001 into an array of focused laser beamlets each spatially aligned to a nanogrid of an array of flow-through enhancement nanogrid located within enhancement unit 234, which is described elsewhere herein. The focused laser beamlets at each of the nanogrids provide plasmon-enhanced Stokes-shifted Raman scattering of the constituent molecules in a multi-gas sample within, or flowing through, each flow-through nanogrid, which is described elsewhere herein. In this embodiment of the invention, the gas sample moves through the flow-through nanogrids of enhancement unit 234, via gas inlets 5001 and 5002, by diffusion. Diffusion-driven sample gas flow is a passive process that reduces the cost and power consumption of the multi-gas Raman detector, while typically resulting in a longer response time. Sample gas entering through gas inlet 5001 flows through the enhancement nanogrids from the top surface to the bottom surface, which will be described elsewhere herein. Sample gas entering through gas inlet 5002 flows through the enhancement nanogrids from the bottom surface to the top surface, which will be described elsewhere herein. A filter is used at the gas inlets to remove particles and debris from the sample gas. The generated enhanced Raman scattered signals, from the gas molecules at the top surface of a flow-through enhancement nanogrid as part of enhancement unit 234, pass through optical window 124 and are collected and collimated by lens 125. Enhanced Raman scattered signals 4004 pass through laser rejection filter 126 to remove laser light. Lens 127 focuses enhanced Raman signals 4004 at exit fiber-optic port 335. The étendue of the optical collection system, comprised of optical elements 124, 125, 126, 127, and 335, is optimized to maximize the intensity of the enhanced Raman scattered signals. Multi-gas Raman detector 66 is coupled to an external Raman detector by an appropriate fiber-optic cable through exit port 335.

Figure 7:
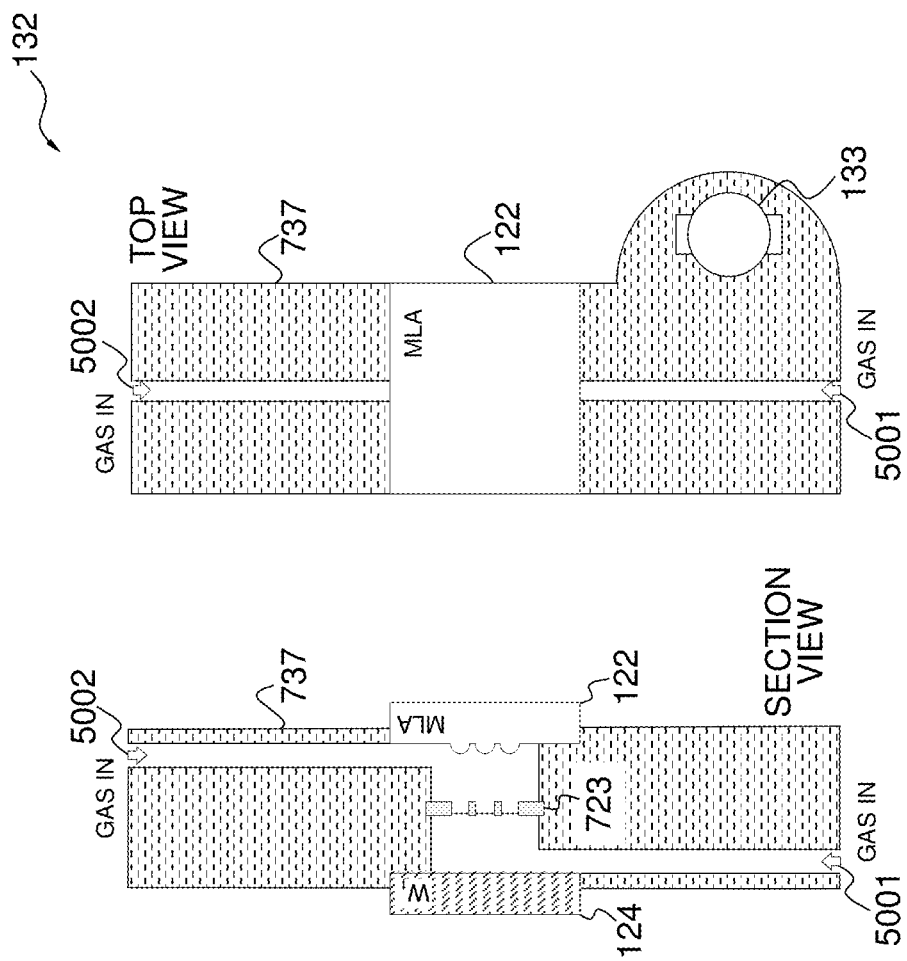
FIG. 7 is a schematic diagram of an enhancement unit forming part of the multi-gas Raman detectors of FIG. 1, FIG. 3, and FIG. 5, which utilize a motorized pump to control the flow of the gas sample.

FIG. 7 illustrates the enhancement unit 132 defined by multi-gas Raman detectors of FIG. 1, FIG. 3, and FIG. 5. Enhancement unit 132 is comprised of housing 737 that defines the flow path of the sample gas, microlens array 122 that distributes the incident, collimated laser beam into an array of focused laser beamlets, flow-through enhancement nanogrid array 723 that provides plasmon-enhanced Raman scattering of the constituent molecules in a multi-gas sample, and optical window 124 that defines the optical pathway of the forward scattered enhanced Raman scattered signals. A collimated laser beam enters enhancement unit 132 via microlens array 122 that creates an array of focused laser beamlets, where each focused laser beamlet excites the localized surface plasmon resonance of a spatially aligned nanogrid of flow-through enhancement nanogrid array 723, which results in the generation of plasmon-enhanced Stokes-shifted Raman scattering from the constituent molecules in a multi-gas sample within, or flowing through, each of the nanogrids of the array of flow-through enhancement nanogrids 723, which is described elsewhere herein. Sample gas is drawn through gas inlets 5001 and 5002, via an appropriate filter to remove particles and debris, of enhancement unit 132 by motorized pump 133. Sample gas drawn through gas inlet 5001 passes through the enhancement nanogrids from the top surface to the bottom surface, which will be described elsewhere herein. Sample gas drawn through gas inlet 5002 flows through the enhancement nanogrids from the bottom surface to the top surface, which will be described elsewhere herein. Motorized pump 133, such as, but not limited to, a diaphragm pump, rotary pump, or peristaltic pump, actively draws the sample gas into enhancement unit 132 and can reduce the response time of the multi-gas detector. The multi-gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the enhanced Raman scattered signals, which is described elsewhere herein. Alternatively, the flow of the sample gas can be pulsed, on and off, with a variable duty cycle to optimize the residence time of the sample in the nanogaps of the enhancement nanogrids, while ensuring sufficient sample gas is drawn through the detector. For applications requiring temperature control of the Raman scattering process, an integrated temperature controller can be utilized to set the temperature of flow-through enhancement nanogrid 723. Many different configurations are possible with these key components.

Figure 8:
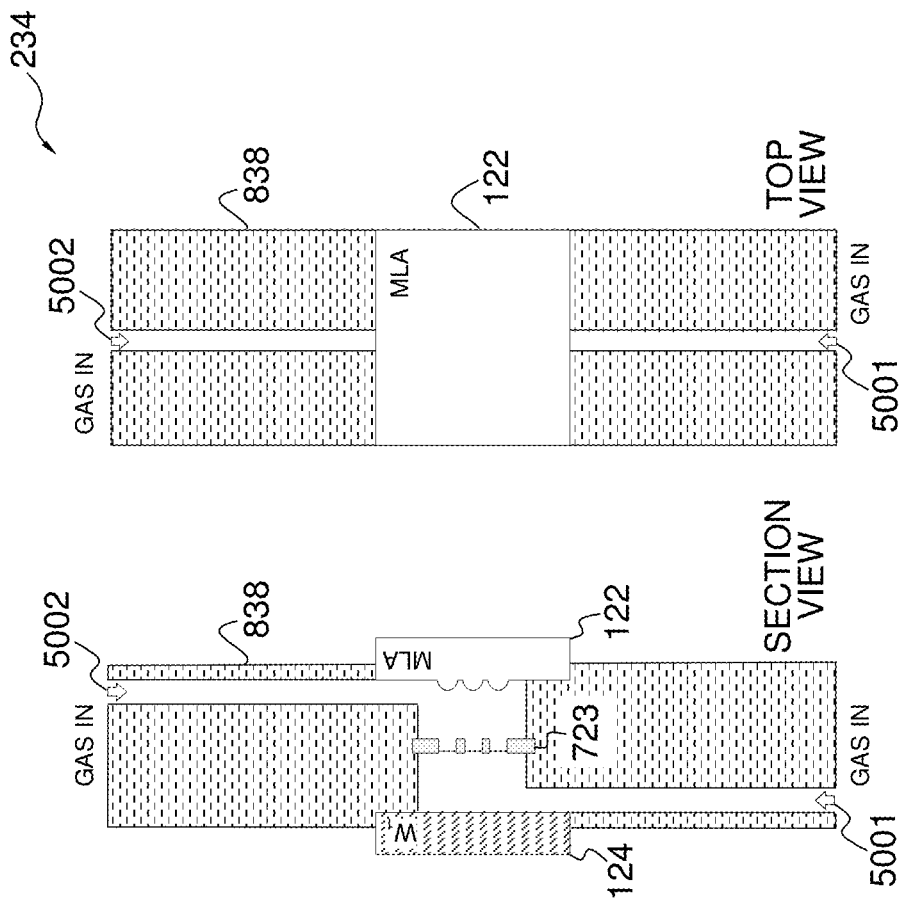
FIG. 8 is a schematic diagram of an enhancement unit forming part of the multi-gas Raman detectors of FIG. 2, FIG. 4, and FIG. 6, which utilize diffusion-driven gas flow.

FIG. 8 illustrates the enhancement unit 234 defined by multi-gas Raman detectors of FIG. 2, FIG. 4, and FIG. 6. Enhancement unit 234 includes housing 838 that defines the flow path of the sample gas, microlens array 122 that distributes the incident laser beam into an array of focused laser beamlets, flow-through enhancement nanogrid array 723 that provide plasmon-enhanced Raman scattering of the constituent molecules in a multi-gas sample, and optical window 124 that defines the optical pathway of the forward scattered enhanced Raman scattered signals. A laser beam enters enhancement unit 234 via microlens array 122, and an array of focused laser beamlets excites the localized surface plasmon resonance of each nanogrid of enhancement nanogrid array 723, which results in the generation of plasmon-enhanced Stokes-shifted Raman scattering of molecules in a multi-gas sample within, or flowing through, each of the nanogrids, of enhancement nanogrid array 723, which is described elsewhere herein. The multi-gas sample moves through gas inlets 5001 and 5002, via an appropriate filter to remove particles and debris from the sample gas, of enhancement unit 234 by diffusion. Sample gas entering through gas inlet 5001 flows through the enhancement nanogrids from the top surface to the bottom surface, which will be described elsewhere herein. Sample gas entering through gas inlet 5002 flows through the enhancement nanogrids from the bottom surface to the top surface, which will be described elsewhere herein. Diffusion-driven sample gas flow is a passive process that reduces the cost and power consumption of the multi-gas detector, while typically resulting in a longer response time. For applications requiring temperature control of the Raman scattering process, an integrated temperature controller can be utilized to set the temperature of flow-through enhancement nanogrid 723. Many different configurations are possible with these key components.

Figure 9:
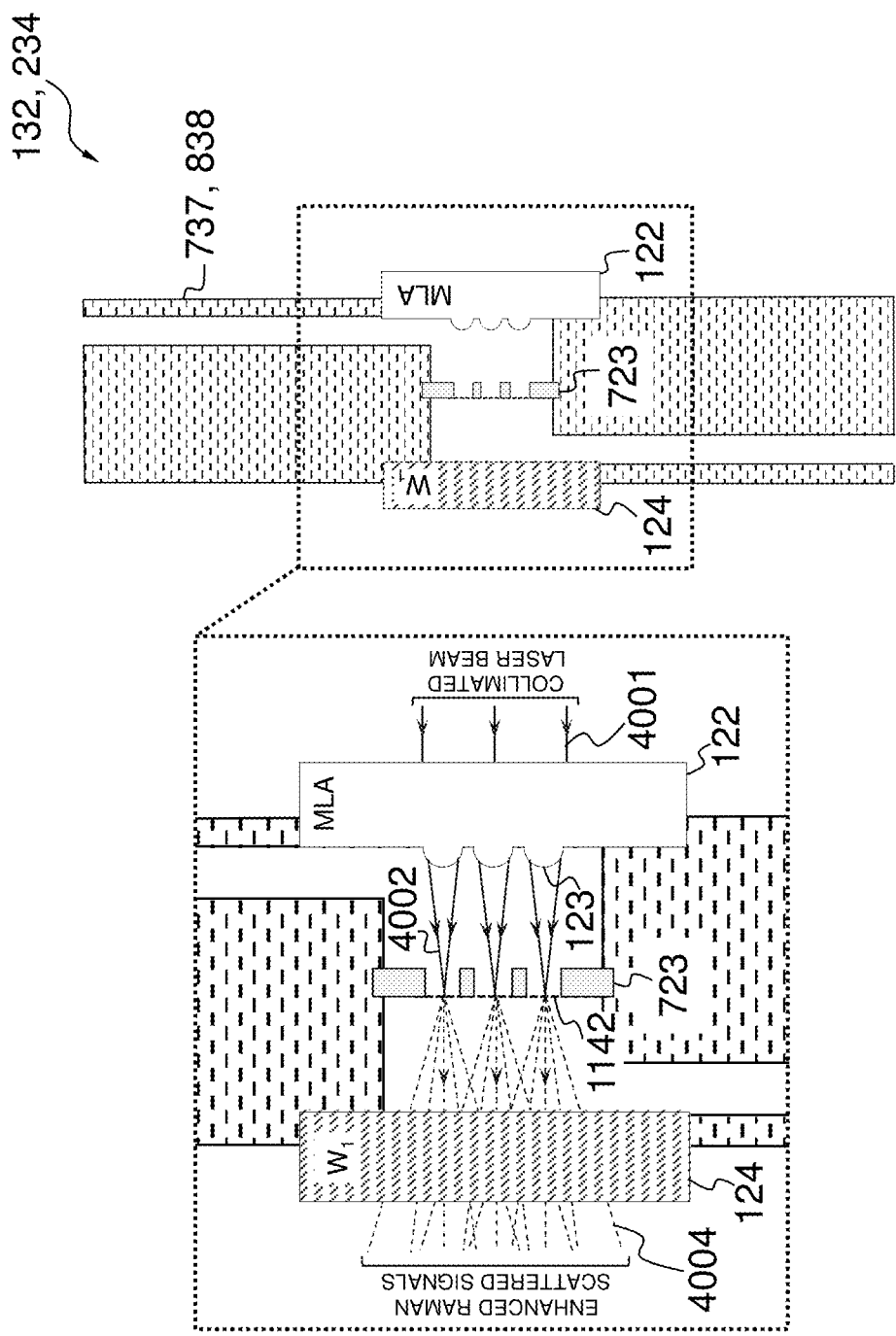
FIG. 9 is a schematic diagram illustrating the optical pathways through an enhancement unit that forms part of the multi-gas Raman detectors of FIG. 1, FIG. 2, FIG. 3, FIG. 4, FIG. 5, and FIG. 6.

FIG. 9 illustrates the optical pathways through enhancement unit 132, defined by multi-gas Raman detectors of FIG. 1, FIG. 3, and FIG. 5, and enhancement unit 234, defined by multi-gas Raman detectors of FIG. 2, FIG. 4, and FIG. 6. Referring to the inset, incident, collimated laser beam 4001 enters enhancement units 132 and 234 via microlens array 122. Microlens array 122 distributes incident, collimated laser beam 4001 into an array of laser beamlets 4002, each focused by microlens 123 spatially aligned to one nanogrid 1142 of the enhancement nanogrid array 723. The array of focused laser beamlets excites the localized surface plasmon resonance in the nanogaps of each nanogrid of flow-through enhancement nanogrid array 723. The excitation of the localized surface plasmon resonance of each nanogrid generates plasmon-enhanced Stokes-shifted Raman scattered signals 4004 of the constituent molecules in a multi-gas sample within, or flowing through, each of the nanogrids of flow-through enhancement nanogrid array 723, which is described elsewhere herein. Plasmon-enhanced Raman scattered signals 4004 of enhancement units 132 and 234 pass through optical window 124.

Figure 10:
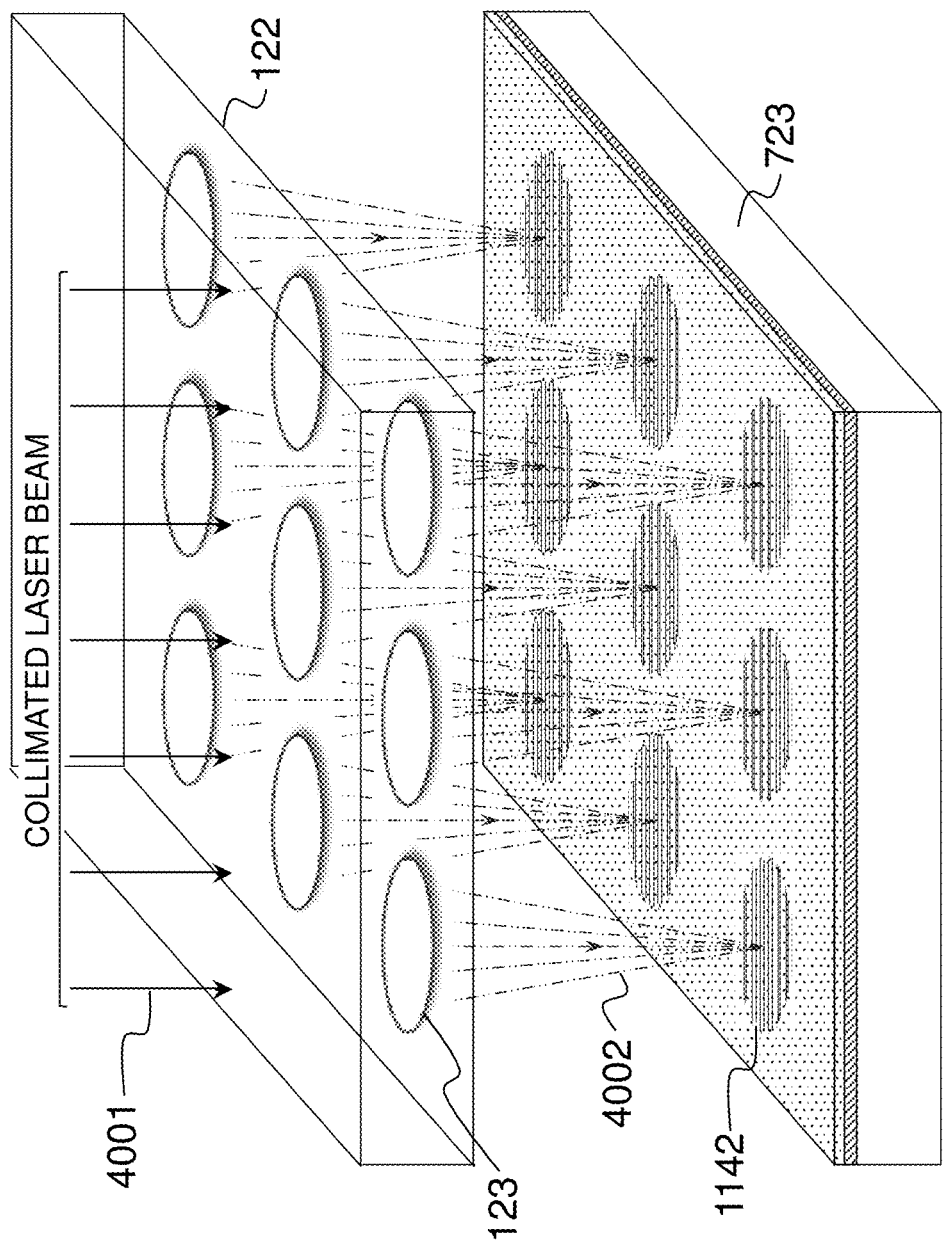
FIG. 10 is a schematic diagram illustrating optical pathways of an incident, collimated laser beam through a microlens array producing an array of focused laser beamlets each spatially aligned to one nanogrid of a flow-through enhancement nanogrid array.

FIG. 10 illustrates the optical pathway of the laser beam to the surface of flow-through enhancement nanogrid array 723. Incident, collimated laser beam 4001 enters microlens array 122 and each microlens 123 forms laser beamlet 4002 that is focused at a spatially aligned nanogrid 1142 of flow-through enhancement nanogrid array 723. For illustration purposes, nine focused laser beamlets 4002 are each focused by microlens 123 at a spatially aligned nanogrid, of flow-through enhancement nanogrid array of nine nanogrids 723. Microlens array 122 and flow-through enhancement nanogrid array 723 can be of any arbitrary size and spatial arrangement. The array of focused laser beamlets excites the localized surface plasmon resonance in the nanogaps of each nanogrid of enhancement nanogrid array 723. The polarization state of the laser beam depends on the structure of the nanogrids, which is described elsewhere herein. The excitation of the localized surface plasmon resonance of each enhancement nanogrid generates plasmon-enhanced Stokes-shifted Raman scattering of the constituent molecules in a multi-gas sample within, or flowing through, each of the nanogrids of nanogrid array 723.

Figure 11:
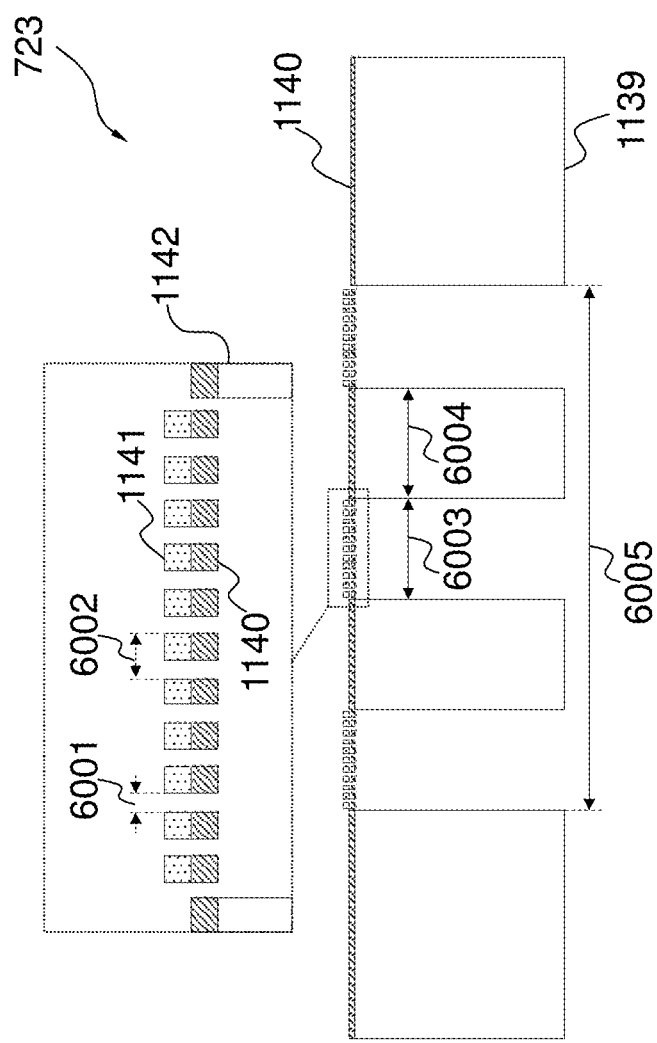
FIG. 11 is a schematic diagram of a flow-through enhancement nanogrid array forming part of an enhancement unit. The inset shows the details of a single flow-through enhancement nanogrid.

FIG. 11 illustrates an example embodiment of the flow-through enhancement nanogrid array 723, defined in the enhancement units of FIG. 7 and FIG. 8. Flow-through enhancement nanogrid 723 is defined as a nanostructure comprised of nanogaps of any shape and positioned in any preferred arrangement in a plasmon-active material, or plasmon-active materials, that can support the excitation of localized surface plasmon resonance and generation of plasmon-enhanced electric fields in the nanogaps by an incident laser beam, and allows a gas within, or to flow-through, each of the nanogaps of the nanogrid of an array of nanogrids. Flow-through enhancement nanogrid array 723 can be comprised of a single enhancement nanogrid, or an array of enhancement nanogrids of any number and size, depending on the requirements of the application. Flow-through enhancement nanogrid 723 is fabricated on a common substrate. For illustration purposes, a section view of flow-through enhancement nanogrid array 723 shows three flow-through nanogrids. Flow-through enhancement nanogrid array 723 is comprised of substrate 1139 to support enhancement nanogrid array 723. Substrate 1139 can be any material that can be structured to accommodate all materials and dimensions used to form the enhancement nanogrid array while providing sufficient mechanical support, such as, but not limited to, silicon, glass, plastics, or polymers. The inset shows a single flow-through nanogrid element 1142 arranged with nanopatterned thin-film support layer 1140 and upper plasmon-active nanogrid layer 1141. Lower support layer 1140 can be any material compatible with substrate layer 1139 and upper plasmon-active nanogrid layer 1141 that provides mechanical support for the suspended layers without affecting the performance of upper plasmon-active nanogrid layer 1141, such as, but not limited to, low-stress silicon nitride, low-stress polycrystalline silicon, single crystal silicon, and low-stress polymers. The material used for upper plasmon-active nanogrid layer 1141 can be any plasmon-active material that is compatible with the lower support layer and generates strong plasmon-enhanced Raman scattering of the constituent molecules in a multi-gas sample within, or flowing through, each of the nanogaps in each of the enhancement nanogrid elements 1142 of an array of nanogrids 723. Plasmon-active nanogrid layer 1141 can be any material capable of generating localized surface plasmon resonance in the nanogap regions by incident light with a wavelength in the VIS to NIR wavelength range of 400 nm to 1200 nm, such as, but not limited to, gold, silver, aluminum, copper, alloyed materials, and various semiconductor materials. The nanogaps 6001 and pitch spacings 6002 of plasmon-active nanogrid layer 1141 and support layer 1140, of flow-through nanogrid 1142, are formed using nanolithography patterning techniques capable of realizing nanostructures with well-defined and controllable dimensions and with short-range and long-range order, e.g., but not limited to, deep ultra-violet lithography, electron beam lithography, and nanoimprint lithography. Plasmon-active nanogrid layer 1141 can be deposited on support layer 1140 using conventional physical vapor deposition techniques, e.g., vacuum evaporation or sputtering. Support layer 1140 can be formed using conventional etching techniques, e.g., reactive-ion etching. Substrate layer 1139 can be patterned using conventional lithography techniques and selectively removed using conventional etching techniques, e.g., reactive-ion etching, or wet etching. The dimensions of nanogaps 6001 and pitch spacings between adjacent nanostructures 6002, formed in plasmon-active nanogrid layer 1141, are chosen to generate a localized surface plasmon resonance that maximizes the plasmon-enhanced Raman scattering of the molecules in a multi-gas sample within, or flowing through, each of the nanogaps of each of the nanogrids of enhancement nanogrid array 723, which is discussed in more detail using FIG. 16 and FIG. 17. Enhancement nanogrids 723 can be arranged with, e.g., a flow-through enhancement nanogrid with flow channel width 6003, inner support width 6004, and nanogrid array width 6005, which are chosen to ensure that the suspended nanograting structures are mechanically stable and enable sufficient gas sample flow through the enhancement nanogrids. The dimension of inner support width 6004 can vary from approximately 10 µm up to 1 mm. The nanogrid array width 6005 can vary from approximately 10 µm up to 100 cm. Many different configurations are possible with these key components.

Figure 12:
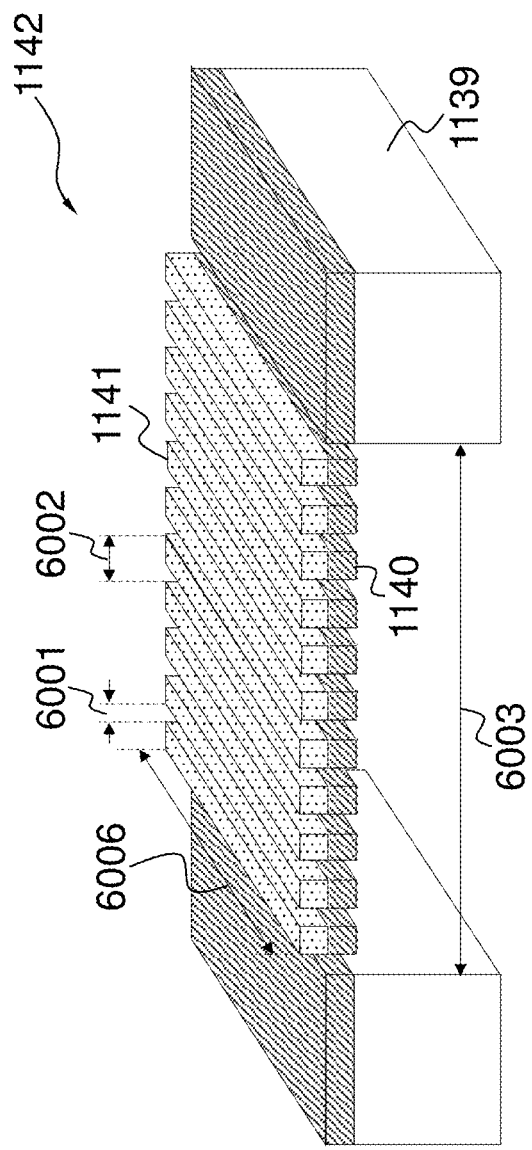
FIG. 12 is a schematic diagram of a single flow-through enhancement nanogrid structured as a nanograting forming part of an enhancement unit.

FIG. 12 illustrates an example embodiment of the single flow-through nanogrid element 1142, defined in flow-through enhancement nanogrid array 723 of FIG. 11, that is structured as a nanograting with nanogaps 6001, pitch spacing 6002, and flow channel width 6003 and length 6006. Nanogaps 6001 and pitch spacings 6002 of plasmon-active nanogrid layer 1141 and lower support layer 1140, are chosen to generate a localized surface plasmon resonance that maximizes plasmon-enhanced Raman scattering of the molecules in a multi-gas sample within, or flowing through, nanogrid array 723, defined in FIG. 11, which is described elsewhere using FIG. 16 and FIG. 17. Nanogaps 6001 can range from the sub-nm up to 100 nm. Pitch spacings 6002 can range from approximately 50 nm up to 1000 nm. For nanogrids structured as nanogratings, alignment of the polarization state of the incident laser beam is required. For a laser beam with transverse-electric polarization, the plane of incidence is aligned parallel to the length 6006 of the nanograting to optimally excite the localized surface plasmon resonance. Localized surface plasmon resonance is excited in plasmon-active nanogrid layer 1141 by incident light of wavelength in the VIS to NIR wavelength range. The incidence angle of the laser beam with respect to the surface of nanogrid array 723 can be used to change the wavelength required by the laser beam to excite the localized surface plasmon resonance of the nanogrids of nanogrid array 723, which is described elsewhere herein. Flow channel width 6003 and length 6006, under the nanograting, are chosen to ensure that the suspended nanograting structure is mechanically stable while providing sufficient gas sample flow through nanogrid array 723, defined in FIG. 11. For a circular flow channel through the substrate layer, width 6003 and length 6006 of the nanograting structure are equal and defined as the diameter of the flow channel. Dimensions of flow channel width and length, 6003 and 6006, can vary from approximately 10 µm up to 1 mm, respectively.

Figure 13:
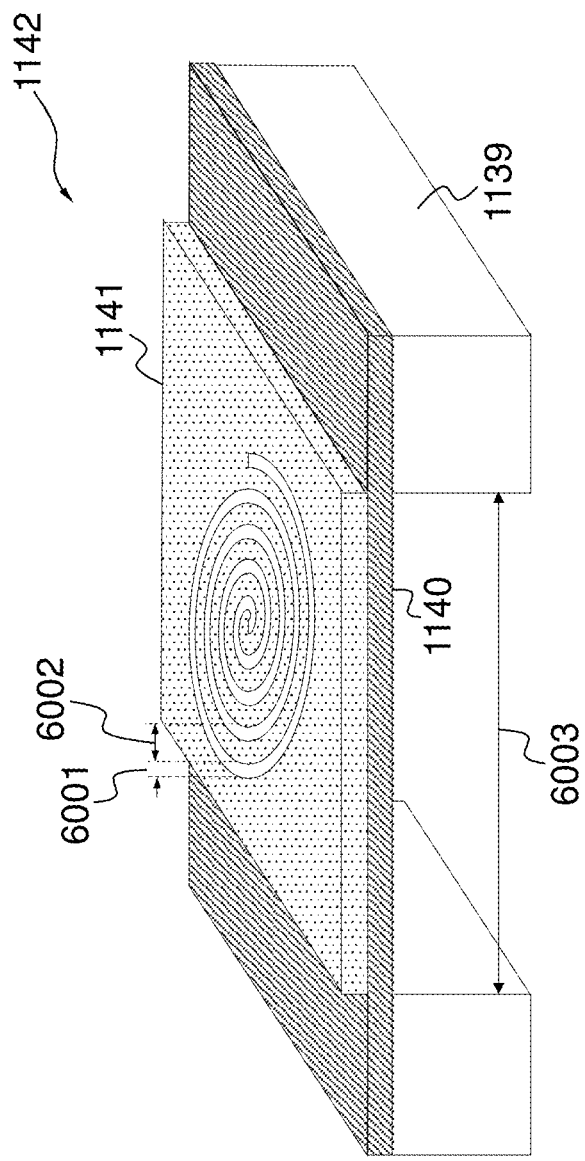
FIG. 13 is a schematic diagram of a single flow-through enhancement nanogrid structured as a circular nanograting forming part of an enhancement unit.

FIG. 13 illustrates an example embodiment of the single flow-through nanogrid element 1142, defined in flow-through enhancement nanogrid array 723 of FIG. 11, that is structured as a circular nanograting with nanogaps 6001, pitch spacings 6002, and flow channel width 6003. Nanogaps 6001 and pitch spacings 6002 of plasmon-active nanogrid layer 1141, and lower support layer 1140, are chosen to generate a localized surface plasmon resonance that maximizes plasmon-enhanced Raman scattering of the molecules in a multi-gas sample within, or flowing through, the nanogaps of nanogrid element 1142, which is described elsewhere using FIG. 16 and FIG. 17. Nanogaps 6001 can range from the sub-nm range up to 100 nm. Pitch spacings 6002 can range from approximately 50 nm up to 1000 nm. In the case of a circular nanograting, alignment of the polarization state of the incident laser beam is not required. Localized surface plasmon resonance is excited in plasmon-active nanogrid layer 1141 by incident light of wavelength in the VIS to NIR wavelength range. The incidence angle of the laser beam with respect to the surface of nanogrid array 723, defined in FIG. 11, can be used to change the wavelength required by the laser beam to excite the localized surface plasmon resonance of the nanogrids of nanogrid array 723, defined in FIG. 11. Flow channel width 6003, under the circular nanograting, is chosen to ensure that the suspended nanograting structure is mechanically stable while providing sufficient gas sample flow through nanogrid array 723. The dimensions of flow channel width 6003 can vary from approximately 10 μm up to 1 mm.

Figure 14:
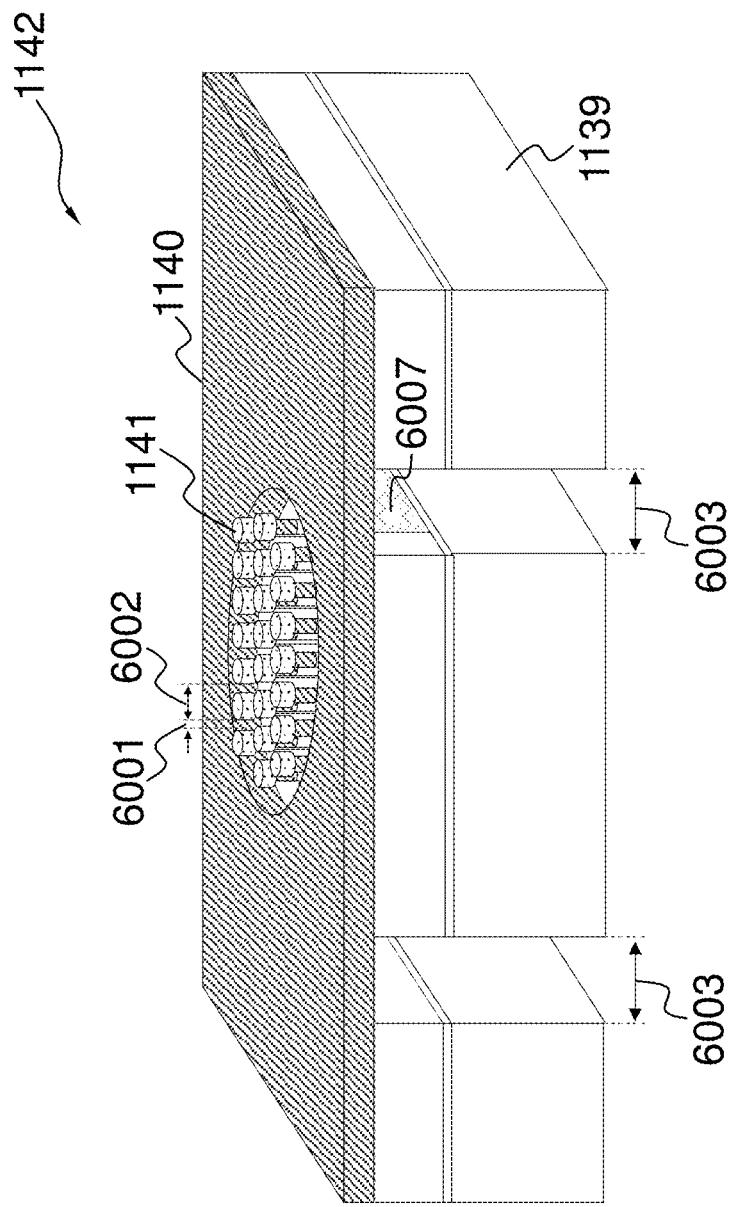
FIG. 14 is a schematic diagram of a single flow-through enhancement nanogrid structured as nanopost array forming part of an enhancement unit.

FIG. 14 illustrates an example embodiment of the flow-through nanogrid element 1142, defined in flow-through enhancement nanogrid array 723 of FIG. 11, that is structured as an array of nanoposts with nanogaps 6001 between adjacent nanoposts, pitch spacings 6002, and width 6003. The dimensions of nanoposts 6001 and 6002, in plasmon-active nanogrid layer 1141, are chosen to generate a localized surface plasmon resonance that maximizes the enhancement of the Raman scattering of the constituent molecules in a multi-gas sample within, or flowing through, nanogaps 6001 of nanogrid element 1142, which is discussed in more detail herein using FIG. 16 and FIG. 17. In this case, the polarization state of the laser beam requires alignment to the orientation of the nanogaps between adjacent nanoposts. Localized surface plasmon resonance is excited in plasmon-active nanogrid layer 1141 by incident light of wavelength in the VIS to NIR wavelength range. The flow channel width 6003 is chosen to ensure that the suspended nanopost array structure is mechanically stable and enables sufficient gas sample flow through the enhancement nanogrid. Flow channel 6007 allows sample gas to flow through nanogrid 1142. The dimension of nanogaps 6001 can vary from approximately 1 nm up to 100 nm. The dimension of pitch spacings 6002 can vary from approximately 50 nm up to 1000 nm. The dimensions of flow channel widths 6003 and 6007 can vary from approximately 10 μm up to 1 mm. Many different configurations are possible with these key components.

Figure 15:
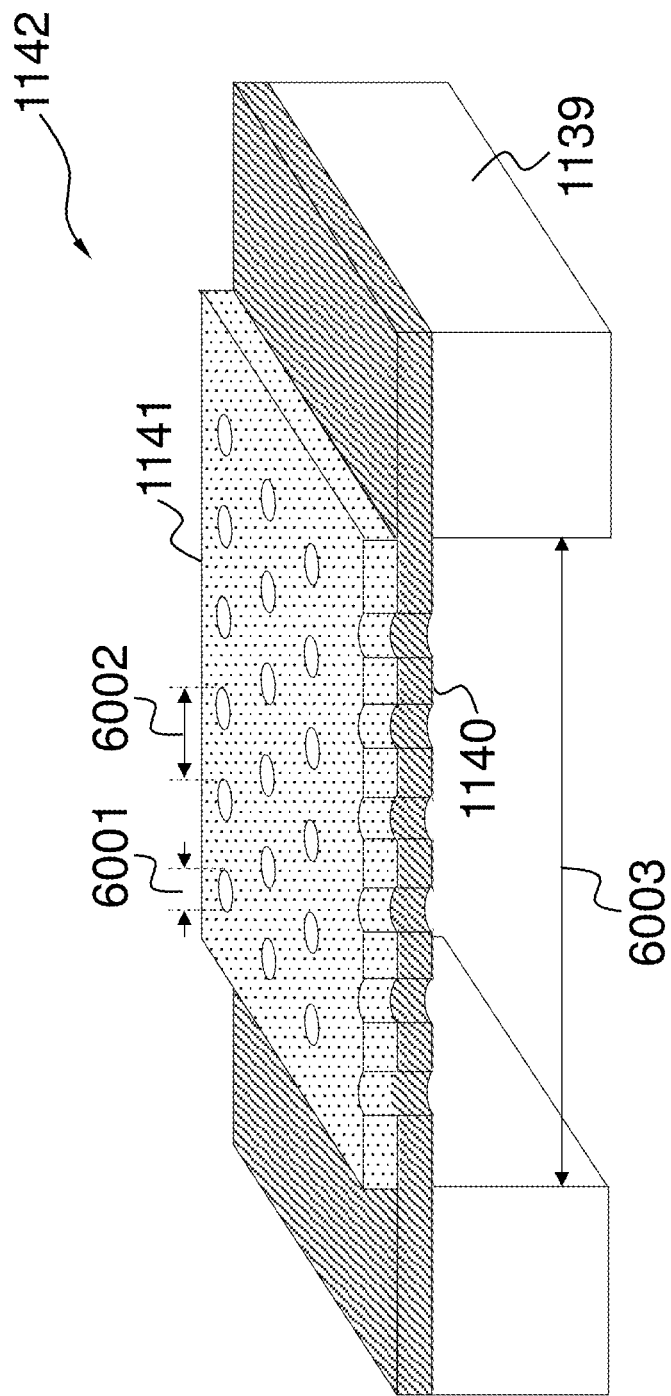
FIG. 15 is a schematic diagram of a single flow-through enhancement nanogrid structured as a nanohole array forming part of an enhancement unit.

FIG. 15 illustrates an example embodiment of flow-through nanogrid element 1142, defined in flow-through enhancement nanogrid array 723 of FIG. 11, is structured as an array of nanoholes with nanohole radius 6001, nanohole-to-nanohole spacings 6002, and nanohole array width 6003. Nanohole dimensions 6002 and 6002, in plasmon-active nanogrid layer 1141, are chosen to generate a localized surface plasmon resonance that maximizes the enhancement of the Raman scattering of the constituent molecules in a multi-gas sample within, or flowing through, the nanogaps of enhancement nanogrid element 1142, which is discussed in more detail herein using FIG. 16 and FIG. 17. In this case, the polarization state of the laser beam does not require special alignment to the orientation of the nanogrid. Localized surface plasmon resonance is excited in plasmon-active nanogrid layer 1141 by incident light of wavelength in the VIS to NIR wavelength range. Flow channel width 6003 is chosen to ensure that the suspended nanohole structure is mechanically stable and enables sufficient gas sample flow through the enhancement nanogrid. In the case where the flow channel through the substrate layer is circular in shape, flow channel width 6003 is the diameter. The dimension of nanohole radius 6001 can vary from approximately 1 nm up to 100 nm. The dimension of nanohole-to-nanohole spacings 6002 can vary from approximately 10 nm up to 100 nm. The dimension of flow channel width 6003 can vary from approximately 10 μm up to 1 mm. Many different configurations are possible with these key components.

Figure 16:
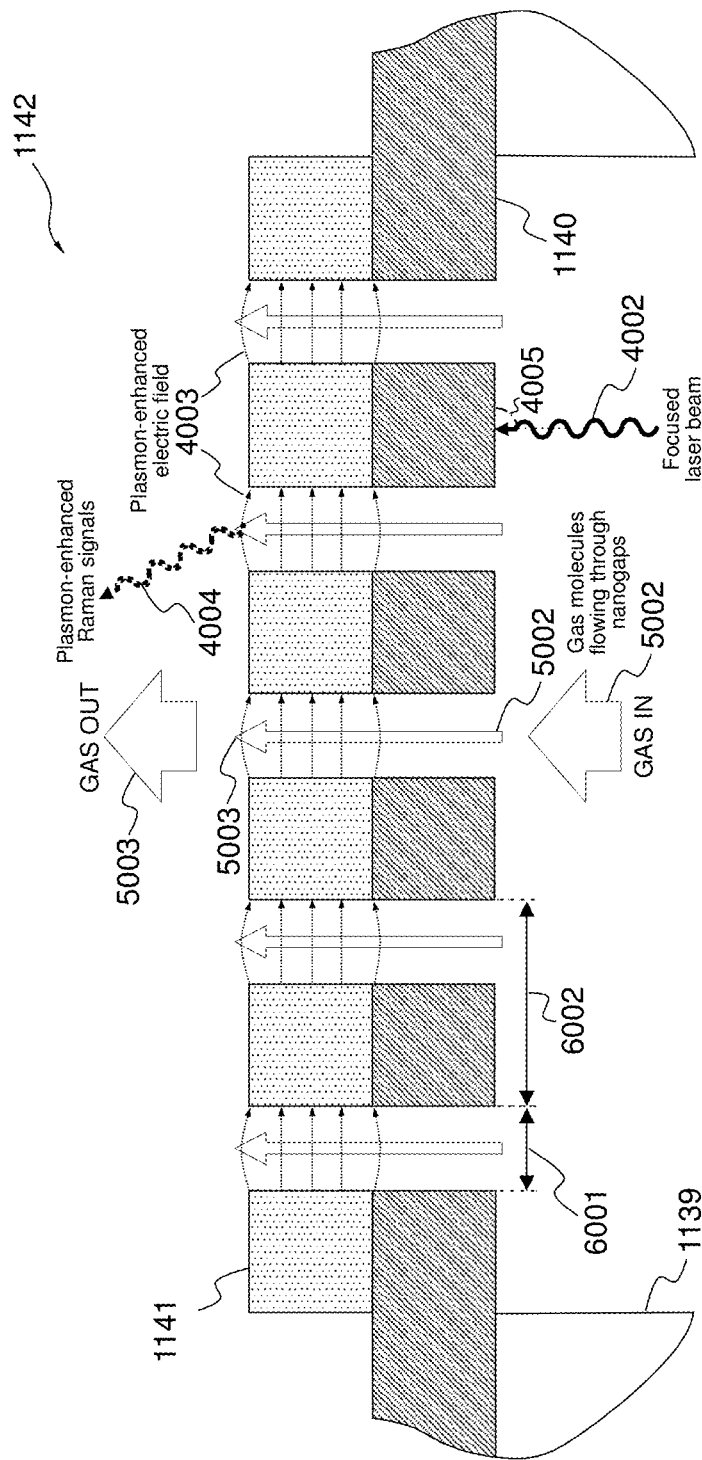
FIG. 16 is a schematic diagram showing the key mechanisms of plasmon-enhanced Raman scattering from molecules in a gas sample within, or flowing through, the nanogaps of a flow-through enhancement nanogrid for a given multi-gas Raman detector in a forward scattering configuration.

FIG. 16 illustrates the process of generating plasmon-enhanced Raman scattering of gas molecules within, or flowing through, the nanogaps of flow-through enhancement nanogrid 1142 for a given multi-gas Raman detector. Raman vibrational spectroscopy is based upon the detection and analysis of inelastic Raman scattering generated by laser radiation incident on a sample. Forces acting on the electronic shells of the sample molecules induce electric dipole moments leading to spontaneous light emission, which is represented as an optical spectrum containing bands with specific intensities, bandwidths, and frequencies corresponding to specific molecular bond vibrations. The observed optical intensity of each vibration band of a Stokes-shifted Raman scattered signal can be estimated as $I_R(v_i)=KNI_0\sigma_i$, where $v_i$ is the frequency of the i-th vibration mode of a particular molecule, K is an instrument factor of the detection system, N is the number of molecules, $I_0$ is the intensity of the incident laser beam, and $\sigma_i$ is the Raman scattering cross-section of the i-th vibration mode of a particular molecule. The Raman scattered signal is proportional to molecular concentration, or partial pressure, thus quantitative analysis using Raman spectroscopy can be performed with controlled experimental conditions. The Raman scattering cross-section is typically very small, and the number of molecules in a dilute gas is also small, thus the intensities of Raman scattered signals generated from most gaseous samples are extremely weak. For conventional Raman spectroscopy, the weak Raman scattering process requires the use of high-power laser sources (~1-10 W), high pressures (~10-100 atm), high sensitivity detectors, and long measurement times, which has prevented the realization of portable gas analyzers utilizing Raman spectroscopy. An effective technique to increase the Raman scattering rate of Raman-active molecules is by means of surface plasmon field enhancement; also commonly referred to as surface-enhanced Raman scattering or plasmon-enhanced Raman scattering. FIG. 16 depicts a section view of flow-through nanogrid element 1142, with substrate support layer 1139, lower support layer 1140, and upper plasmon-active nanogrid layer 1141. Upper plasmon-active nanogrid layer 1141 is comprised of a row of nanogaps 6001 with pitch spacings 6002. The nanogap regions of nanogrid 1142 of plasmon-active nanogrid layer 1141 are especially important because they are plasmonic nanocavities that support very large plasmon-enhanced electric fields 4003 due to coupling of the electric fields generated by the localized surface plasmon resonance modes of adjacent nanostructures across nanogaps 6001. Furthermore, the nanogaps serve as flow paths for gas sample 5002. The multi-gas Raman detectors of FIG. 1, FIG. 2, FIG. 3, FIG. 4, FIG. 5, and FIG. 6 employ focused laser beamlet 4002 incident on the bottom surface of nanogrid 1142. Laser beam 4002, with intensity $I_0(v_0)$ and frequency $v_0$, incident on the bottom surface of nanogrid 1142, with incidence angle 4005, generates a localized surface plasmon resonance in upper plasmon-active nanogrid layer 1141. The excitation of localized surface plasmon resonance generates plasmon-enhanced electric fields 4003 in the nanogaps 6001 of plasmon-active nanogrid 1142; represented herein as $E_{PE}(r,v_0)$, where r=(x, y,z) is the spatial position in the nanogaps. The polarization state of incident laser beam 4002 required to excite the localized surface plasmon resonance depends on the structure of the nanogrid, which is described elsewhere herein. Plasmon-enhanced Raman scattering occurs when molecules of sample gas 5002 are within plasmon-enhanced electric fields 4003. Molecules of sample gas 5002 in the vicinity of plasmon-excited nanogaps 6001 experience strongly enhanced plasmon-enhanced electric fields 4003, which generate dipoles oscillating at the Raman-shifted frequencies of each of the i-th vibration modes. The dipolar Raman fields excite localized surface plasmon oscillations of enhancement nanogrid 1142 at the Raman-shifted frequencies. The localized surface plasmons at the Raman-shifted frequencies are converted to far-field scattering, which results in emission of plasmon-enhanced Raman scattered signals 4004 that are estimated as $I_{PER}(v_i)=$ $G_i KNI_0 \sigma_i$, where $I_{PER}(v_i)$ is the plasmon-enhanced Raman scattering intensity, $G_i$ is the ensemble-averaged Raman scattering enhancement factor of the i-th vibration mode. Plasmon-enhanced Raman scattering effectively enhances $\sigma_i$ of each vibration mode of each molecule in the gas sample. In this case, plasmon-enhanced Raman signals 4004 are generated in a forward scattering configuration. The Raman scattering enhancement factor is estimated as $G_i = M(v_0)M(v_i)$, where $M(v_i) = |E_{PE}(v_i)|^2/|E_0|^2$ is defined as a spatially averaged electric field enhancement factor at frequency $v_i$, $|E_{PE}(v_i)|$ is the magnitude of average plasmon-enhanced electric field 4003, and $|E_0|$ is the magnitude of the electric field of incident laser beam 4002. The wavelength of incident laser beam 4002 that generates the maximum localized surface plasmon resonance depends on the following: a) type of material used for upper plasmon-active nanogrid layer 1141 can support strong surface plasmon resonance at the laser wavelength, b) nanogaps 6001 and pitch spacings 6002, c) refractive index and thickness of lower support layer 1140, and d) incidence angle 4005 of laser beam 4002 with respect to the nanogrid element surface. Molecules from a gas sample within, or flowing through, the nanogaps of upper plasmon-active nanogrid layer 1141, of flow-through nanogrid element 1142, move through plasmon-enhanced electric field 4003, which results in plasmon-enhanced Raman scattered signals 4004 with intensities $I_{PER}(v_i)$. An optimal Raman scattering enhancement factor $G_i$ is achieved by maximizing $M(v_0)$ and $M(v_i)$, which requires spectral alignment of the field enhancement factor $M(v)$ with respect to the vibration mode frequencies $v_i$ and excitation laser frequency $v_0$, which is described elsewhere using FIG. 18.

Figure 17:
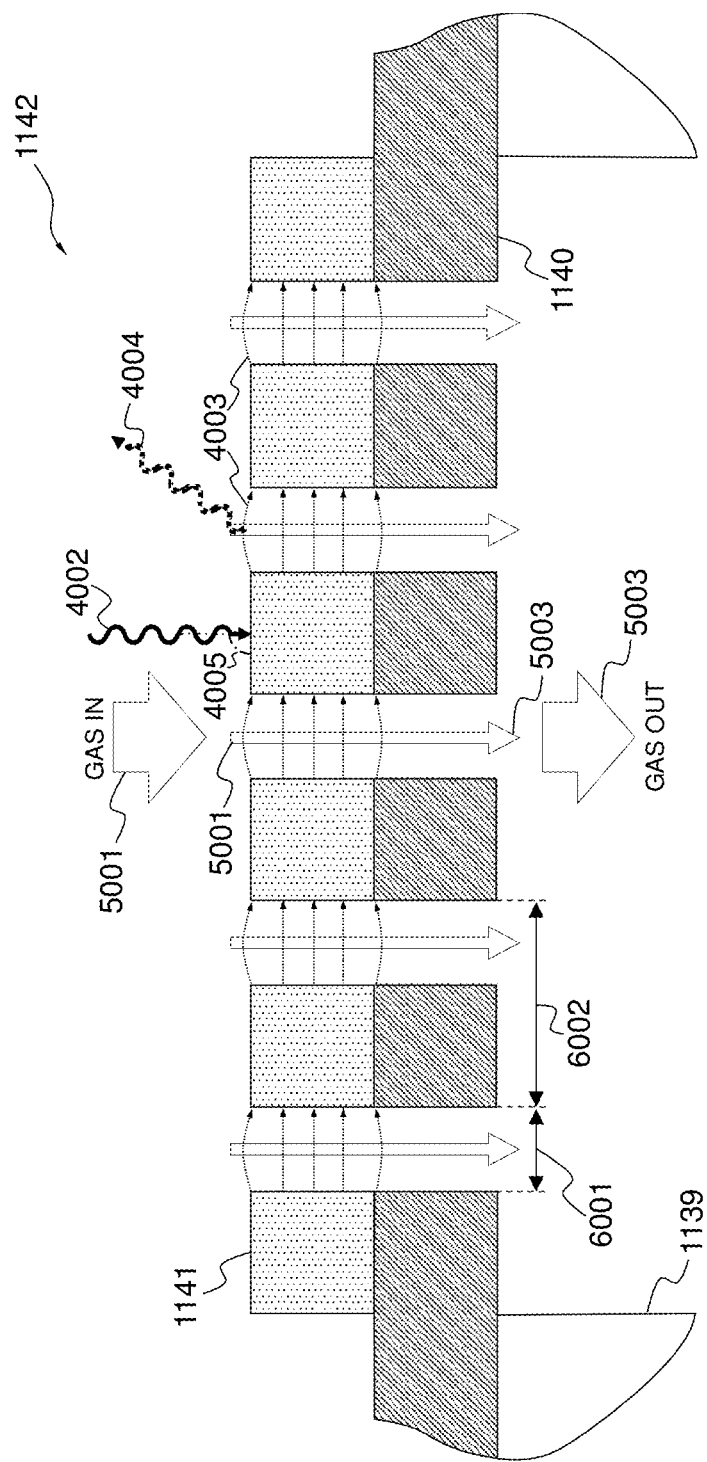
FIG. 17 is a schematic diagram showing the key mechanisms of plasmon-enhanced Raman scattering from molecules in a gas sample within, or flowing through, the nanogaps of a flow-through enhancement nanogrid for a given multi-gas Raman detector in a backward scattering configuration.

FIG. 17 illustrates another scenario for generating plasmon-enhanced Raman scattering of gas molecules within, or flowing through, the nanogaps of flow-through enhancement nanogrid 1142 for a given multi-gas Raman detector. The section view depicts flow-through nanogrid element 1142, with substrate support layer 1139, lower support layer 1140, and upper plasmon-active nanogrid layer 1141. Upper plasmon-active nanogrid layer 1141 is comprised of a row of nanogaps 6001 with pitch spacings 6002. The multi-gas Raman detectors of FIG. 19, FIG. 27, FIG. 28, FIG. 29, FIG. 30, FIG. 31, FIG. 32, FIG. 35, FIG. 36, FIG. 37, FIG. 38, FIG. 39, and FIG. 40 employ laser beam 4002 incident on the top surface of nanogrid 1142. Laser beam 4002, with intensity $I_0(v_0)$ and frequency $v_0$, incident on the top surface of nanogrid 1142, with incidence angle 4005, generates a localized surface plasmon resonance in upper plasmon-active nanogrid layer 1141. The excitation of localized surface plasmon resonance generates plasmon-enhanced electric field 4003 in nanogaps 6001 of plasmon-active nanogrid 1141. The polarization state of incident laser beam 4002 required to excite the localized surface plasmon resonance depends on the structure of the nanogrid, which is described elsewhere herein. In this case, plasmon-enhanced Raman signals 4004 are generated in a backward scattering configuration. The Raman scattering enhancement factor is estimated as $G_i = M(v_0)M(v_i)$, where $M(v_i) = |E_{PE}(v_i)|^2/|E_0|^2$ is the spatially averaged electric field enhancement factor. The wavelength of incident laser beam 4002 that generates the maximum localized surface plasmon resonance depends on the following: a) type of material used for upper plasmon-active nanogrid layer 1141 can support strong surface plasmon resonance at the laser wavelength, b) nanogaps 6001 and pitch spacings 6002, and c) incidence angle 4005 of laser beam 4002 with respect to the surface of nanogrid element 1142. Molecules from a gas sample within, or flowing through, the nanogaps of upper plasmon-active nanogrid layer 1141, of flow-through nanogrid element 1142, move through plasmon-enhanced electric field 4003, which results in plasmon-enhanced Raman scattered signals 4004 with intensities $I_{PER}(v_i)$. The optimal Raman scattering enhancement factor $G_i$ is maximized is achieved by maximizing $M(v_0)$ and $M(v_i)$, which requires spectral alignment of the field enhancement factor $M(v)$ with respect to the vibration mode frequencies $v_i$ and excitation laser frequency $v_0$, which is described elsewhere using FIG. 18.

Figure 18:
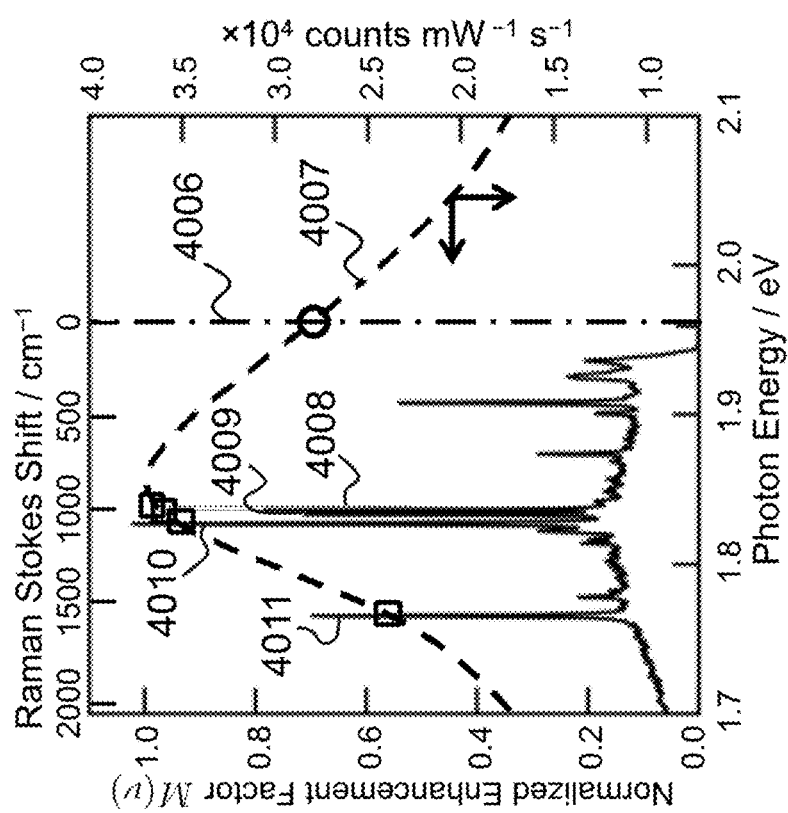
FIG. 18 is a data plot showing an example of spectral alignment of the plasmon-enhanced electric field enhancement factor spectrum, excitation laser wavelength, and Raman Stokes scattered spectrum of benzenethiol self-assembled monolayer on a gold nanograting type of enhancement nanogrid.

FIG. 18 illustrates the spectral alignment of the field enhancement factor 4007 with respect to the vibration mode frequencies $v_i$ and excitation laser frequency $v_0$. A simulation plot of normalized electric field enhancement factor 4007 of a gold nanograting with nanogap of 10 nm and pitch spacing of 200 nm is overlayed on a spectrum of select Raman scattered vibration modes from a benzenethiol self-assembled monolayer measured from a gold nanograting measured using helium-neon laser excitation source 4006. As is well established in the art, the Raman scattering plasmon-enhancement factor is estimated as $G_i = M(v_0)M(v_i)$, where $M(v_0)$ represents the laser excitation channel enhancement that generates the dipolar Raman fields and $M(v_i)$ represents the dipole emission channel enhancements of the i-th vibration mode. In this case, the laser beam excitation channel enhancement $M(v_0)$ depends on the spectral position of laser source 4006 with respect to field enhancement spectrum 4007, which is shown as a circle. The dipole emission channel enhancements $M(v_i)$ of select vibration modes of the benzenethiol self-assembled monolayer chemisorbed on the gold nanograting, i.e., 4008 (vibration mode: 12(a1)), 4009 (vibration mode: 18a(a1)), 4010 (vibration mode: 1(a1)), and 4011 (vibration mode: 8a(a1)), are shown with respect to the normalized field enhancement spectrum 4007 as black squares. To achieve the maximum Raman scattering enhancement, the electric field enhancement factor spectrum $M(v)$ 4007 must be spectrally aligned to the incident excitation frequency and Raman scattered frequencies. In this case, the measured average Raman enhancement factor is $G \sim 10^7$. The spectral position and bandwidth of electric field enhancement factor 4007 $M(v)$ can be controlled by the following conditions: a) structure of the enhancement nanogrid, e.g., employing a nanograting, circular nanograting, nanopost array, nanohole array, or other structure, b) nanogrid dimensions, e.g., by changing the nanogap and pitch spacing of the nanograting structure, and c) incidence angle of the laser beam with respect to the surface of the enhancement nanogrid.

Figure 19:
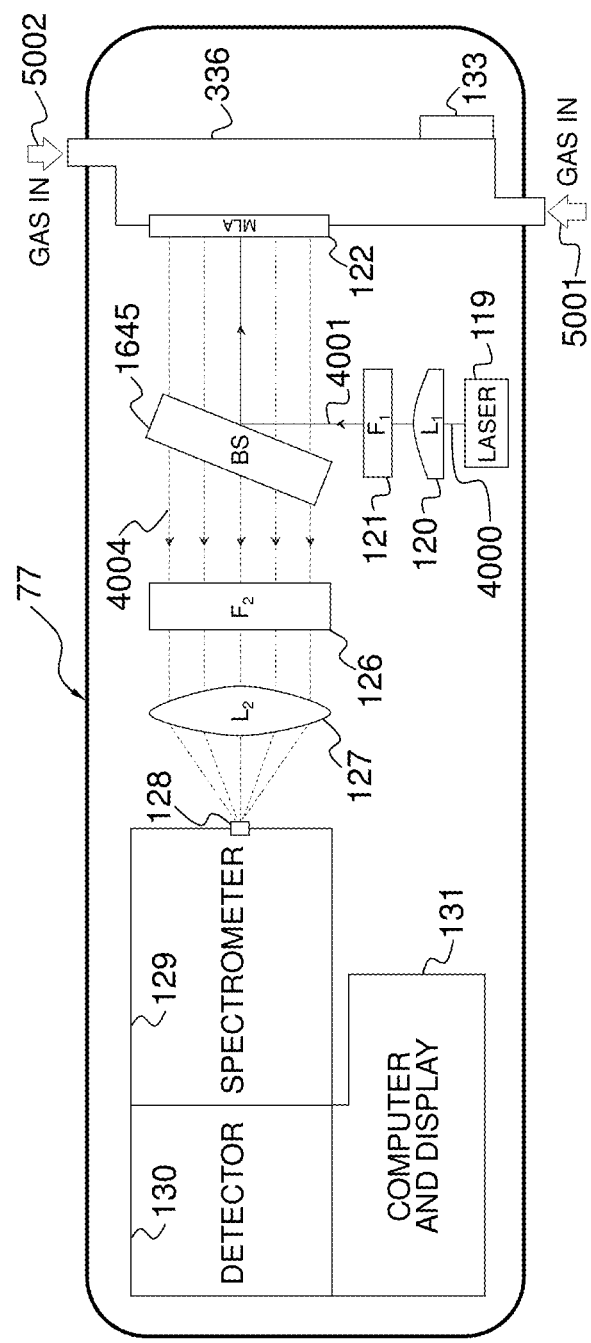
FIG. 19 is a schematic diagram of a multi-gas Raman detector with pump-driven gas sampling according to an example embodiment of the present invention.

FIG. 19 illustrates a multi-gas Raman detector 77 as an example embodiment in accordance with the current invention. In this embodiment, multi-gas Raman detector 77 employs an array of flow-through nanogrids that provide plasmon-enhanced Raman scattering of the constituent molecules in a multi-gas sample within, or flowing through, each of the nanogaps of the nanogrids, in a backward scattering configuration. Multi-gas Raman detector 77 includes laser source 119 generating linearly polarized laser beam 4000 with a wavelength in the VIS to NIR spectral range of 400 nm up to 1200 nm. In certain cases, the laser beam polarization state is aligned to the orientation of the nanogrids of the flow-through enhancement nanogrid array, which is part of enhancement unit 336 and is described elsewhere herein. Collimation lens 120 is coupled to laser source 119. Narrow-band bandpass cleanup filter 121 is coupled to collimation lens 120. Cleanup filter 121 removes optical noise accompanying the laser beam. Collimated laser beam 4001 is directed to dichroic beam splitter 1645.

Dichroic beam splitter 1645 directs laser beam 4001 to microlens array 122. Collimated laser beam 4001 enters enhancement unit 336 via microlens array 122, which is made of an appropriate material and both faces are coated with an anti-reflective layer. Microlens array 122 distributes collimated laser beam 4001 into an array of focused laser beamlets each spatially aligned to one flow-through nanogrid, of an array of flow-through enhancement nanogrids, located within enhancement unit 336, which is described elsewhere herein. The focused laser beamlets at each of the nanogrids generate plasmon-enhanced Stokes-shifted Raman scattering of the constituent molecules in a multi-gas sample within, or flowing through, each of the nanogrids, which is described elsewhere herein. The gas sample is drawn through each of the flow-through nanogrids located in enhancement unit 336, via gas inlets 5001 and 5002, using motorized pump 133. Sample gas drawn through gas inlet 5001 passes through the enhancement nanogrids from the top surface to the bottom surface, which will be described elsewhere herein. Sample gas drawn through gas inlet 5002 flows through the enhancement nanogrids from the bottom surface to the top surface, which will be described elsewhere herein. Motorized pump 133, such as, but not limited to, a diaphragm pump, rotary pump, or peristaltic pump, actively draws the sample gas into enhancement unit 336 and can reduce the response time of the multi-gas detector. The multi-gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the Raman scattered signals, which is described elsewhere herein. Alternatively, the flow of the sample gas can be pulsed, on and off, with a variable duty cycle to optimize the residence time of the sample in the nanogaps of the enhancement nanogrids, while ensuring sufficient sample gas is drawn through the detector. A filter is used at gas inlets 5001 and 5002 to remove particles and debris from the sample gas. The enhanced Raman scattered signals, generated from gas molecules at the top surfaces of the flow-through enhancement nanogrids, as part of enhancement unit 336, pass through microlens array 122 and dichroic beam splitter 1645. Dichroic beam splitter 1645 serves as an optical filter to remove laser light from the enhanced Raman signals. In this case, enhanced Raman signals 4004 are generated in a backward scattering configuration. Enhanced Raman signals 4004 pass through laser rejection filter 126 removing laser light prior to entering spectrometer 129. Lens 127 focuses the enhanced Raman signals 4004 at entrance slit 128 of spectrometer 129. The étendue of the optical collection system, comprised of optical elements 122, 1645, 126, 127, and 128, is optimized to maximize the intensity of the enhanced Raman scattered signals. Optical detector 130 detects the dispersed Raman scattered emission lines from spectrometer 129 and converts the optical signal data into a format suitable for data processing by digital computer 131, for data analytics, visual display of a spectrum representing the vibration bands of the constituent molecules in a multi-gas sample, and for providing alerts of potential hazardous gases, or other gases of interest, in a multi-gas sample.

Figure 20:
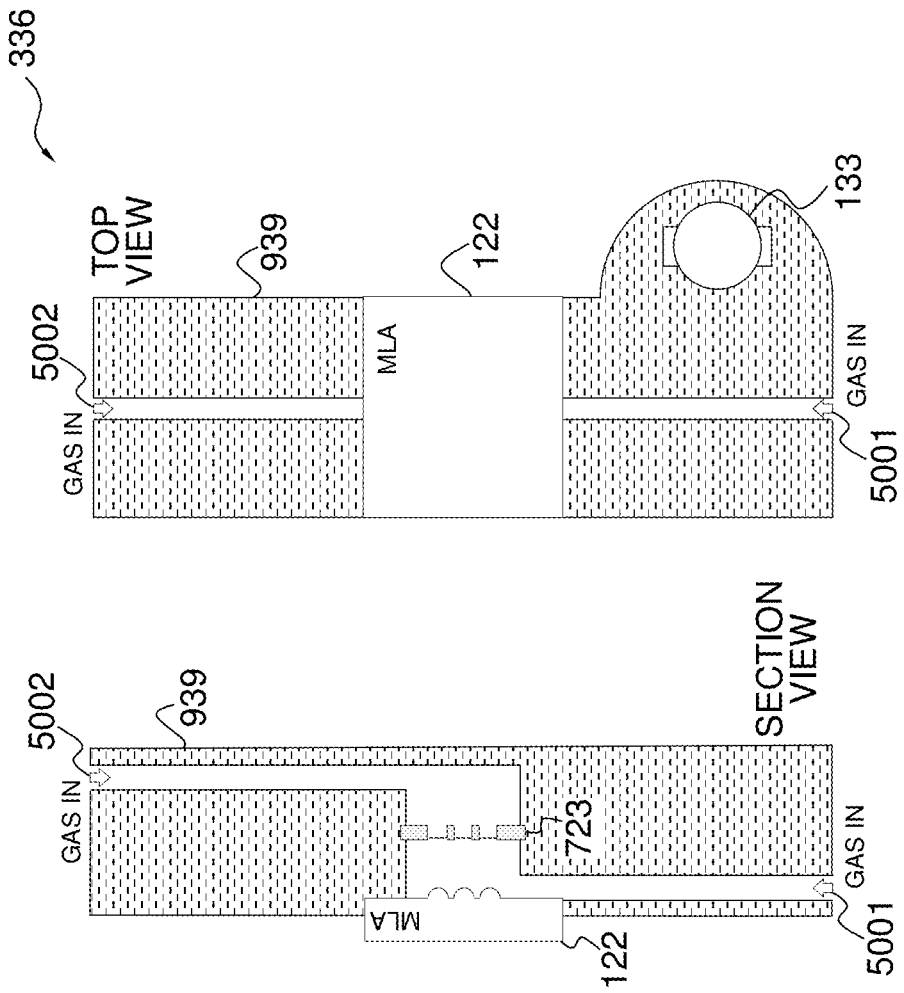
FIG. 20 is a schematic diagram of the enhancement unit forming part of the multi-gas Raman detectors of FIG. 19 utilizing a motorized pump.

FIG. 20 illustrates the enhancement unit 336 defined by the multi-gas Raman detector of FIG. 19. Enhancement unit 336 is comprised of housing 939 that defines the flow path of the sample gas, microlens array 122 that distributes the incident, collimated laser beam into an array of focused laser beamlets, and flow-through enhancement nanogrid array 723 that provides plasmon-enhanced Raman scattering of the constituent molecules in a multi-gas sample. Microlens array 122 defines the optical pathway of the backward scattered enhanced Raman signals. A collimated laser beam enters enhancement unit 336 via microlens array 122 that creates an array of focused laser beamlets, where each focused laser beam excites the localized surface plasmon resonance of a spatially aligned nanogrid of flow-through enhancement nanogrid array 723, which results in the generation of plasmon-enhanced Stokes-shifted Raman scattering from the constituent molecules in a multi-gas sample within, or flowing through, each of the nanogrids of the array of flow-through enhancement nanogrids 723, which is described elsewhere herein. The sample gas is drawn through gas inlets 5001 and 5002, via an appropriate filter to remove particles and debris, of enhancement unit 336 by motorized pump 133. Sample gas drawn through gas inlet 5001 passes through the enhancement nanogrids from the top surface to the bottom surface, which will be described elsewhere herein. Sample gas drawn through gas inlet 5002 flows through the enhancement nanogrids from the bottom surface to the top surface, which will be described elsewhere herein. Motorized pump 133, such as, but not limited to, a diaphragm pump, rotary pump, or peristaltic pump, actively draws the sample gas into enhancement unit 336 and can reduce the response time of the multi-gas detector. The multi-gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the enhanced Raman scattered signals, which is described elsewhere herein. Alternatively, the flow of the sample gas can be pulsed, on and off, with a variable duty cycle to optimize the residence time of the sample in the nanogaps of the enhancement nanogrids, while ensuring sufficient sample gas is drawn through the detector. For applications requiring temperature control of the Raman scattering process, an integrated temperature controller can be utilized to set the temperature of flow-through enhancement nanogrid 723. Many different configurations are possible with these key components.

Figure 21:
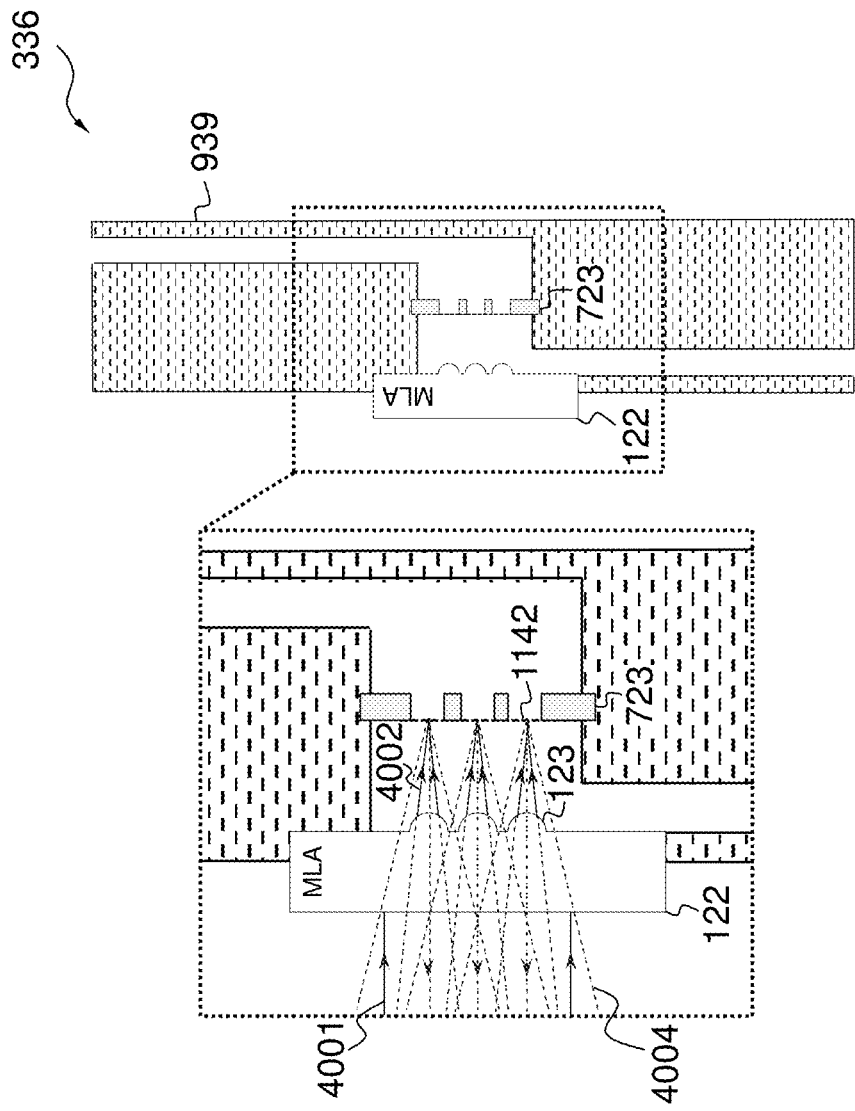
FIG. 21 is a schematic diagram illustrating the optical pathways through an enhancement unit that forms part of the multi-gas Raman detectors of FIG. 19.

FIG. 21 illustrates the optical pathways through enhancement unit 336, defined by the multi-gas Raman detector of FIG. 19. Referring to the inset, incident, collimated laser beam 4001 enters enhancement unit 336 via microlens array 122. Microlens array 122 distributes the incident, collimated laser beam into an array of laser beamlets 4002, each focused by microlens 123 spatially aligned to one nanogrid 1142 of enhancement nanogrid array 723. The array of focused laser beamlets excites the localized surface plasmon resonance in the nanogaps of each nanogrid of the flow-through enhancement nanogrid array 723. The excitation of the localized surface plasmon resonance of each nanogrid generates plasmon-enhanced Stokes-shifted Raman scattered signals 4004 of the constituent molecules in a multi-gas sample within, or flowing through, each of the nanogrids of flow-through enhancement nanogrid array 723, which is described elsewhere herein. In this case, plasmon-enhanced Raman signals 4004 are generated in backward scattering configuration. Plasmon-enhanced Raman scattered signals 4004 of enhancement unit 336 pass through microlens array 122.

Figure 22:
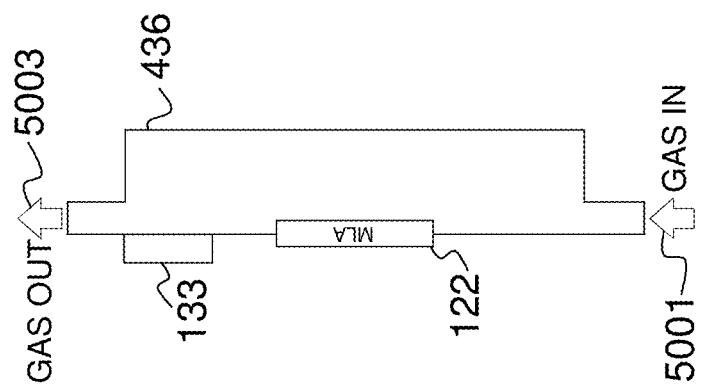
FIG. 22 is a schematic diagram of an enhancement unit that forms part of a multi-gas Raman detector that employs an array of flow-across nanogrids and utilizes a motorized pump.

FIG. 22 illustrates an example embodiment of the enhancement unit 436, as part of the multi-gas Raman detector invention. Enhancement unit 436 employs an array of flow-across nanogrids that generate plasmon-enhanced Raman scattering of the constituent molecules in a multi-gas sample within, or flowing across, each of the nanogaps of the nanogrids, which is described elsewhere herein. A collimated laser beam enters enhancement 436 via microlens array 122, which distributes an incident collimated laser beam into an array of focused laser beamlets each spatially aligned to one nanogrid, of an array of flow-across enhancement nanogrids, which is described elsewhere herein. In this embodiment of the invention, the sample gas is drawn through gas inlet 5001, via an appropriate filter to remove particles and debris, by motorized pump 133. Motorized pump 133 draws the sample gas across the flow-across enhancement nanogrid and out of enhancement unit 436 through gas outlet 5003. The enhanced Raman scattered signals are generated in a backward scattering configuration from gas molecules at the top surface of the flow-across enhancement nanogrid, as part of enhancement unit 436, and pass through microlens array 122.

Figure 23:
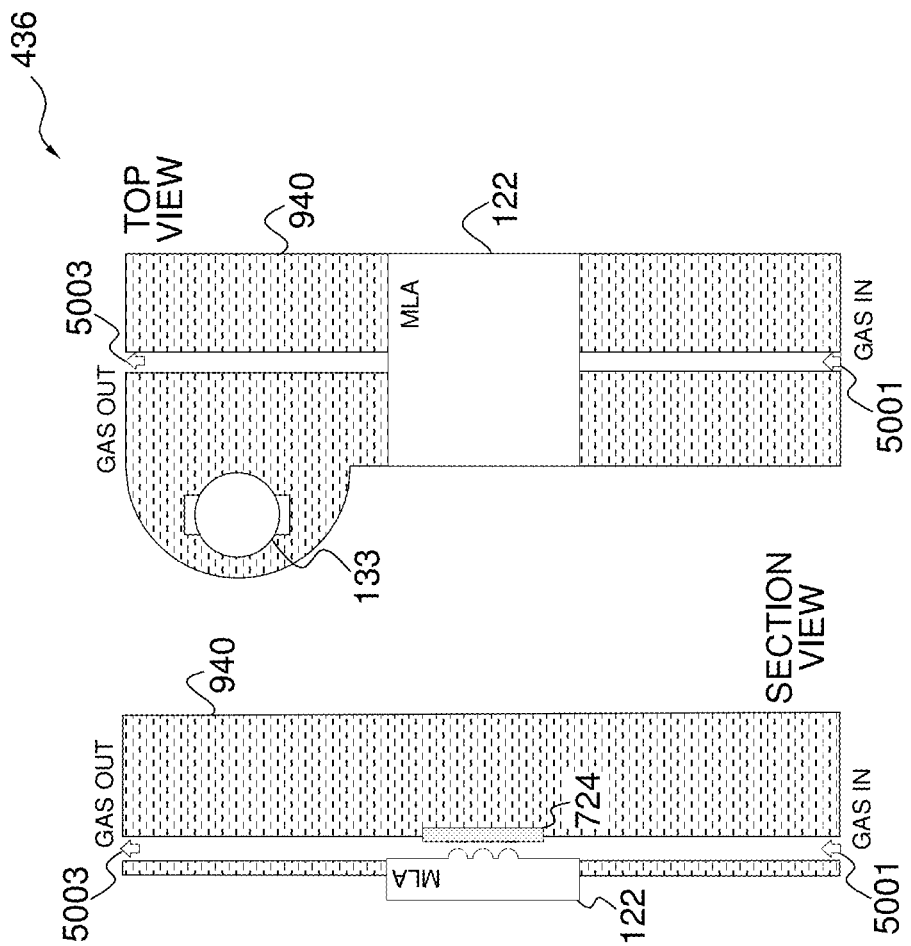
FIG. 23 is a schematic diagram of the enhancement unit of FIG. 22 that forms part of a multi-gas Raman detector employing an array of flow-across nanogrids and pump-driven gas flow.

FIG. 23 illustrates an example embodiment of enhancement unit 436, defined in FIG. 22. Enhancement unit 436 is comprised of a housing 940 that defines the flow path of the sample gas, microlens array 122 that distributes the incident laser beam into an array of focused laser beamlets, and flow-across enhancement nanogrid array 724 that provides plasmon-enhanced Raman scattering of the constituent molecules in a multi-gas sample. A collimated laser beam enters enhancement unit 436 via microlens array 122 that creates an array of focused laser beamlets, where each focused laser beamlet excites the localized surface plasmon resonance of a spatially aligned nanogrid of the flow-across enhancement nanogrid array 724. The focused laser beamlets at each of the nanogrids provide plasmon-enhanced Stokes-shifted Raman scattering of the constituent molecules in a multi-gas sample within, or flowing across, each of the flow-across nanogrids, of the enhancement nanogrid array 724, which is described elsewhere herein. The enhanced Raman scattered signals are generated in a backward scattering configuration and pass through enhancement unit 436 via microlens array 122. The sample gas is drawn through gas inlet 5001, via an appropriate filter to remove particles and debris, by motorized pump 133. Motorized pump 133, such as, but not limited to, a diaphragm pump, rotary pump, or peristaltic pump, actively draws the sample gas into enhancement unit 436 and can reduce the response time of the multi-gas detector. The multi-gas sample flow rate can be actively modulated with motorized pump 133. For example, the sample gas can be drawn continuously through the detector at varying flow rates enabling controlled volume sampling. Furthermore, the sample gas can be continuously drawn through the detector and subsequently recirculated across the enhancement nanogrids to maximize the intensity of the enhanced Raman scattered signals. Alternatively, the flow of the sample gas can be pulsed, on and off, with a variable duty cycle to optimize the residence time of the sample in the nanogaps of the enhancement nanogrids, while ensuring sufficient sample gas is drawn through the detector. For applications requiring temperature control of the Raman scattering process, an integrated temperature controller can be utilized to set the temperature of flow-across enhancement nanogrid array 724. Many different configurations are possible with these key components.

Figure 24:
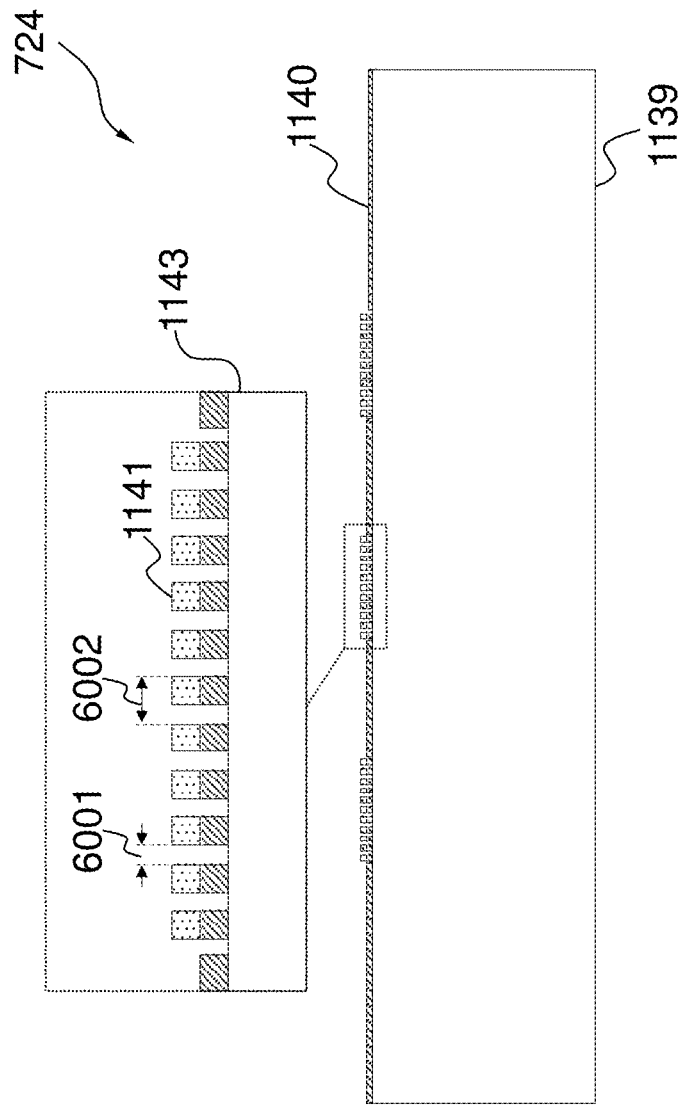
FIG. 24 is a schematic section view diagram of a flow-across enhancement nanogrid array forming part of an enhancement unit of FIG. 22.

FIG. 24 illustrates example embodiment of the flow-across enhancement nanogrid array 724, defined in the enhancement units of FIG. 22 and FIG. 23. The flow-across enhancement nanogrid is defined as a nanostructure comprised of nanogaps of any shape and positioned in any preferred arrangement in a plasmon-active material, or plasmon-active materials, that can support the excitation of localized surface plasmon resonance and generation of plasmon-enhanced electric fields in the nanogaps by an incident laser beam, and allows a gas within, or to flow-across, each of the nanogaps of the nanogrid of an array of nanogrids. The flow-across enhancement nanogrid array can be comprised of a single enhancement nanogrid, or an array of enhancement nanogrids of any number and size, depending on the requirements of the application. The flow-across enhancement nanogrids are fabricated on a common substrate. For illustration purposes, a section view of flow-across enhancement nanogrid array 724 shows three flow-across nanogrids. Flow-across enhancement nanogrid array 724 is comprised of substrate 1139 to support the enhancement nanogrid array. The substrate can be any material that can be structured to accommodate all materials and dimensions used to form the enhancement nanogrid array while providing sufficient mechanical support, such as, but not limited to, silicon, glass, plastics, or polymers. The inset shows a single flow-across nanogrid element 1143 arranged with nanopatterned thin-film support layer 1140 and upper plasmon-active nanogrid layer 1141. Lower support layer 1140 can be any material compatible with substrate layer 1139 and upper plasmon-active nanogrid layer 1141 that provides mechanical support for all layers without affecting the performance of upper plasmon-active nanogrid layer 1141, such as, but not limited to, silicon nitride, polycrystalline silicon, single crystal silicon, polymers, and plastics. The material used for upper plasmon-active nanogrid layer 1141 can be any plasmon-active material that is compatible with the lower support layer and generates strong plasmon-enhanced Raman scattering of the constituent molecules in a multi-gas sample within, or flowing across, each of the nanogaps in each of the enhancement nanogrids of an array of nanogrids 724. Plasmon-active nanogrid layer 1141 can be any material capable of generating localized surface plasmon resonance in the nanogap regions by incident light with a wavelength in the VIS to NIR wavelength range of 400 nm to 1200 nm, such as, but not limited to, gold, silver, aluminum, copper, alloyed materials, and various semiconductor materials. The dimensions of nanogaps 6001 and pitch spacings between adjacent nanostructures 6002 of plasmon-active nanogrid layer 1141 are chosen to generate a localized surface plasmon resonance that maximizes the plasmon-enhanced Raman scattering of the molecules in a multi-gas sample within, or flowing across, each of the nanogaps of each of the nanogrids of enhancement nanogrid array 724, which is discussed in more detail using FIG. 25. Many different configurations are possible with these key components.

Figure 25:
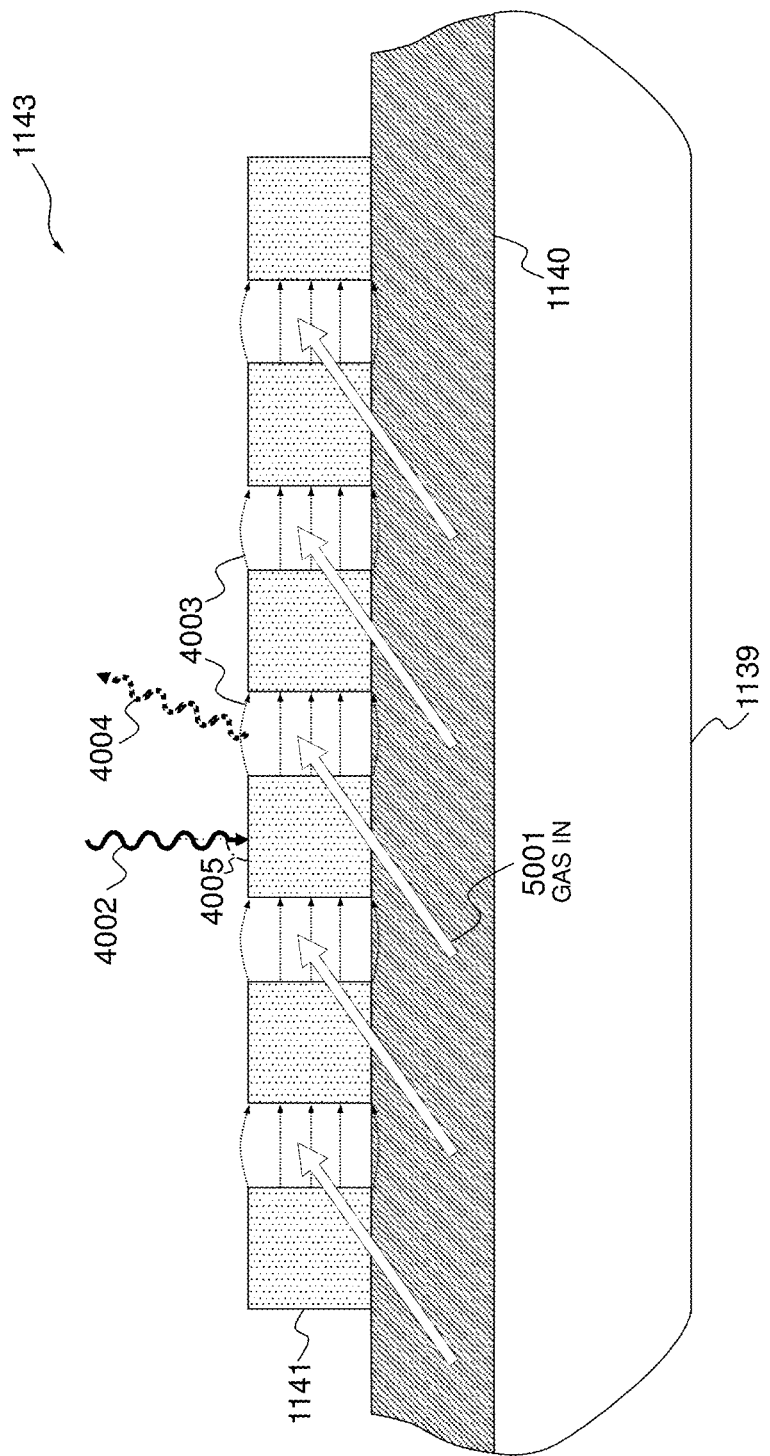
FIG. 25 is a schematic diagram showing the key technical mechanisms of plasmon-enhanced Raman scattering from molecules in a gas sample flowing across the nanogaps of a flow-across enhancement nanogrid.

FIG. 25 illustrates a section view of flow-across nanogrid element 1143, with substrate support layer 1139, lower support layer 1140, and upper plasmon-active nanogrid layer 1141. Upper plasmon-active nanogrid layer 1141 is comprised of a row of nanogaps 6001 with pitch spacings 6002. Nanogaps 6001 of nanogrid 1143 are important because they are plasmonic nanocavities that support the generation of very large plasmon-enhanced electric fields 4003 due to coupling of the localized surface plasmon resonance modes across the nanogaps of plasmon-active nanogrid layer 1141. Laser beam 4002, with intensity $I_0(v_0)$ and frequency $v_0$, incident on the top surface of nanogrid 1143, with incidence angle 4005, generates a localized surface plasmon resonance in upper plasmon-active nanogrid layer 1141. The excitation of localized surface plasmon resonance generates plasmon-enhanced electric field 4003 in the nanogap regions of plasmon-active nanogrid 1141; represented herein as $E_{PE}(r, v_0)$. The polarization state of incident laser beam 4002 required to excite the localized surface plasmon resonance depends on the structure of the nanogrid, which is described elsewhere herein. Plasmon-enhanced Raman scattering occurs when molecules of sample gas 5001 are within plasmon-enhanced electric field 4003, which results in emission of plasmon-enhanced Raman signals 4004 with intensities estimated as $I_{PER}(v_i)=G_i KNI_0\sigma_i$, where $G_i$ is the ensemble-averaged Raman scattering enhancement factor of the i-th vibration mode. In this case, plasmon-enhanced Raman signals 4004 are generated in a backward scattering configuration. The Raman scattering enhancement factor is estimated as $G_i=M(v_0)M(v_i)$, where $M(v_i)=|E_{PE}(v_i)|^2/|E_0|^2$ is the spatially averaged electric field enhancement factor. The wavelength of incident laser beam 4002 that generates the maximum localized surface plasmon resonance depends on the following: a) type of material used for upper plasmon-active nanogrid layer 1141 can support strong surface plasmon resonance at the laser wavelength, b) nanogaps 6001 and pitch spacings 6002, and c) incidence angle 4005 of the laser beam with respect to the nanogrid element surface. Molecules from a gas sample within, or flowing across, the nanogaps of upper plasmon-active nanogrid layer 1141, of flow-across nanogrid element 1143, move through plasmon-enhanced electric field 4003, which results in plasmon-enhanced Raman scattered signals 4004 with intensities $I_{PER}(v_i)$. The optimal Raman scattering enhancement factor $G_i$ is achieved by maximizing $M(v_0)$ and $M(v_i)$, which requires spectral alignment of the field enhancement factor $M(v)$ with respect to the vibration mode frequencies $v_i$ and excitation laser frequency $v_0$, which is described elsewhere using FIG. 18.

Figure 26:
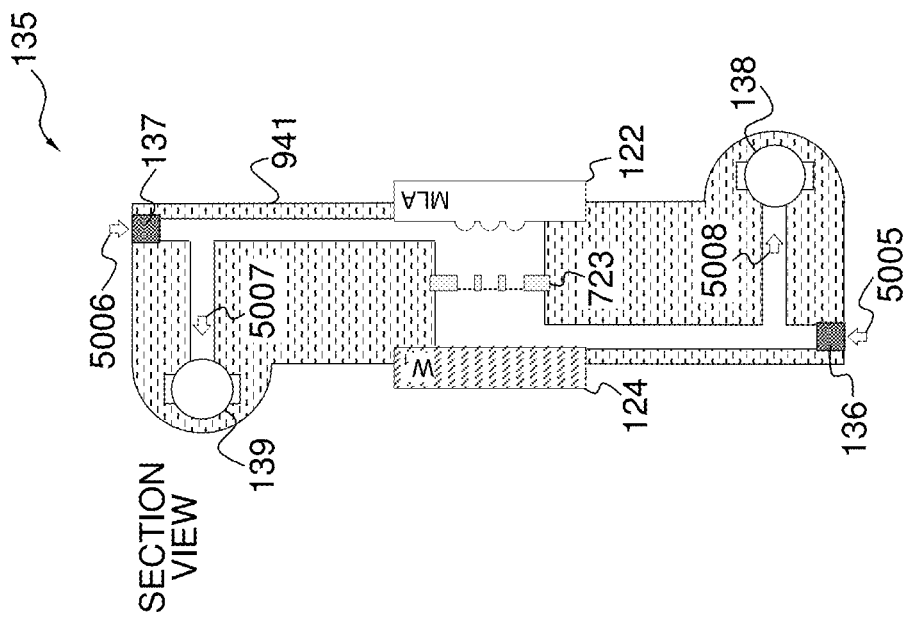
FIG. 26 is schematic diagram showing a configuration to recirculate gases in an enhancement unit employing a flow-through enhancement nanogrid.

FIG. 26 illustrates an example embodiment of an enhancement unit 135 providing sample gas recirculation through the enhancement nanogrids to maximize the intensity of the enhanced Raman scattered signals, defined by multi-gas Raman detectors of FIG. 1, FIG. 3, and FIG. 5. Enhancement unit 135 is comprised of housing 941 that defines the flow path of the sample gas, microlens array 122 that distributes the incident, collimated laser beam into an array of focused laser beamlets, flow-through enhancement nanogrid array 723 that provides plasmon-enhanced Raman scattering of the constituent molecules in a multi-gas sample, and optical window 124 that defines the optical pathway of the forward scattered enhanced Raman scattered signals. Sample gas recirculation through flow-through enhancement nanogrid array 723 is facilitated by valves 136 and 137 and motorized pumps 138 and 139. The motorized pumps 138 and 139, can be, but are not limited to, diaphragm pumps, rotary pumps, or peristaltic pumps. The first cycle of the recirculation process, cycle 1, has a time duration of $t_1$ where valve 136 is open, pump 139 is on, valve 137 is closed, and pump 138 is off. The second cycle of the recirculation process, cycle 2, has a time duration of $t_2$ where valve 137 is open, and pump 138 is on, valve 136 is closed, and pump 139 is off. During cycle 1, sample gas is drawn through gas inlet 5005, through valve 136, through flow-through enhancement nanogrid array 723, and through gas outlet 5007, by motorized pump 139. Sample gas drawn through gas inlet 5005 pass through the enhancement nanogrids from the top surface to the bottom surface, which is described elsewhere herein. During cycle 2, sample gas is drawn through gas inlet 5006, through valve 137, through flow-through enhancement nanogrid array 723, and through gas outlet 5008, by motorized pump 138. Sample gas drawn through gas inlet 5006 flows through the enhancement nanogrids from the bottom surface to the top surface, which is described elsewhere herein. The sample gas drawn through gas inlets 5005 and 5006 is filtered to remove particles and debris prior to entering the flow path of housing 941 and flow-through enhancement nanogrid array 723. During a typical measurement, the sample gas is drawn into enhancement unit 135 using cycle 1 for time $t_1$. A collimated laser beam enters enhancement unit 135 via microlens array 122 that creates an array of focused laser beamlets, where each focused laser beamlet excites the localized surface plasmon resonance of a spatially aligned nanogrid of flow-through enhancement nanogrid array 723, which results in the generation of plasmon-enhanced Stokes-shifted Raman scattering from the constituent molecules in a multi-gas sample within, or flowing through, each of the nanogrids of the array of flow-through enhancement nanogrids 723. After time duration $t_1$, the sample gas is drawn into enhancement unit 135 using cycle 2 for time $t_2$. After time duration $t_2$, the cycles can be repeated. For each recirculation cycle, the sample gas present in the flow path of housing 941 of enhancement unit 135, is drawn through the nanogaps of the nanogrids of flow-through enhancement nanogrid array 723. The recirculation process, cycle 1 for time $t_1$ followed by cycle 2 for time $t_2$, can repeat several times, or can repeat continuously to increase the intensity of the enhanced Raman scattered signals. A similar sample gas recirculation configuration can be applied multi-gas Raman detectors of FIG. 27, FIG. 29, FIG. 31, FIG. 35, FIGS. 37, and 39. Moreover, a similar sample gas recirculation configuration can be applied to an enhancement unit employing flow-across enhancement nanogrid arrays. Many different configurations are possible with these key components.

Figure 27:
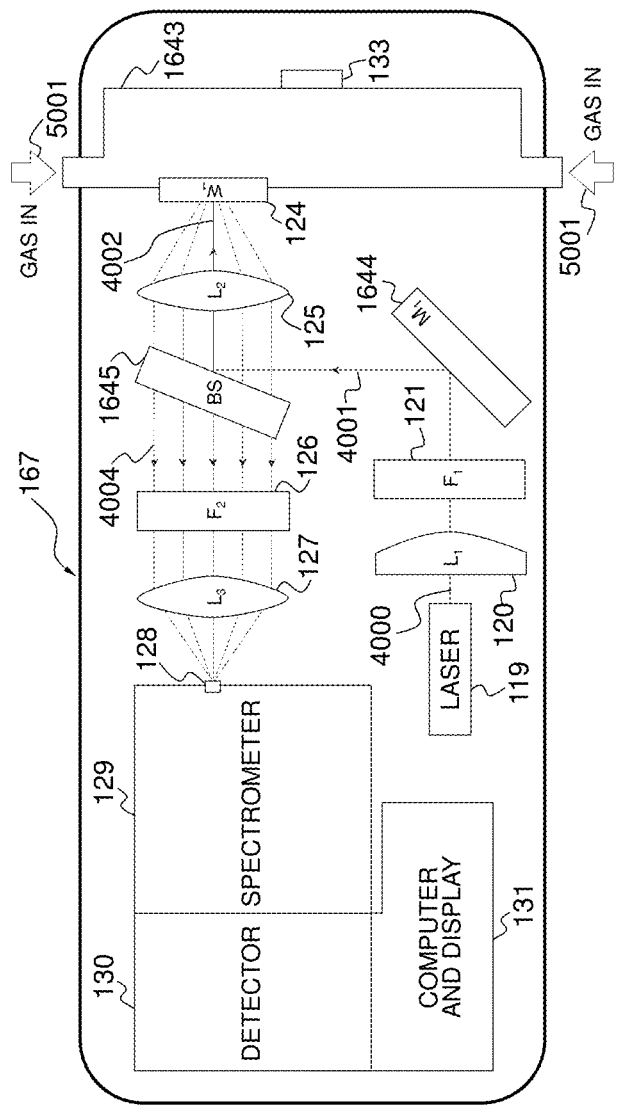
FIG. 27 is a schematic diagram of a multi-gas Raman detector with pump-driven gas sampling according to an example embodiment of the present invention.

FIG. 27 illustrates an example embodiment of a multi-gas Raman detector 167 in accordance with the current invention. Multi-gas Raman detector 167 is based on a simplified optical design that combines the optical pathways of the laser beam, for generating the plasmon-enhanced Raman scattered signals of a multi-gas sample, and the backward scattered enhanced Raman signals through a common lens 125. This configuration allows straightforward alignment of the laser beam and the collection pathway of the optical system. Multi-gas Raman detector 167 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to dichroic beam splitter 1645 by means of mirror 1644. Dichroic beam splitter 1645 directs laser beam 4001 to lens 125. Lens 125 focuses and directs laser beam 4002 to enhancement unit 1643 with normal incidence angle to optical window 124. Optical window 124 is made of an appropriate material with both faces coated with an anti-reflective layer. Focused laser beam 4002 enters enhancement unit 1643 via optical window 124 and interacts with the flow-through enhancement nanogrid, which is described elsewhere herein. Focused laser beam 4002 at the nanogrid generates plasmon-enhanced Stokes-shifted Raman scattering of the constituent molecules in the sample gas within, or flowing through, the nanogaps of the flow-through enhancement nanogrid as part of enhancement unit 1643. The gas sample is drawn through the flow-through nanogrids of enhancement unit 1643, via gas inlets 5001, using motorized pump 133, such as, but not limited to, a diaphragm pump, rotary pump, or peristaltic pump. Motorized pump 133 actively draws the sample gas into enhancement unit 1643, which can reduce the response time of the multi-gas detector. The gas sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient gas sample is drawn through the detector. A filter is used at gas inlets 5001 to remove particles and debris from the sample gas. The backward scattered enhanced Raman scattered signals, of the gas molecules from the top surface of the flow-through enhancement nanogrid as part of enhancement unit 1643, pass through optical window 124 and are collected and collimated by lens 125 and pass through dichroic beam splitter 1645. Dichroic beam splitter 1645 serves as an optical filter to remove laser light from the enhanced Raman signals. Enhanced Raman signals 4004 pass through laser rejection filter 126 to remove laser light prior to entering spectrometer 129. Lens 127 focuses enhanced Raman signals 4004 at entrance slit 128 of spectrometer 129. The étendue of the optical collection system, comprised of optical elements 124, 125, 1645, 126, 127, and 128, is optimized to maximize the intensities of the Raman scattered signals. Optical detector 130 detects the dispersed Raman scattered emission lines and converts the signal data into a format suitable for data processing by digital computer 131 for data analytics and visual display of the Raman spectrum representing the vibration bands of the constituent molecules in the sample gas, and for providing alerts of potential hazardous gases, or other gases of interest, in a multi-gas sample.

Figure 28:
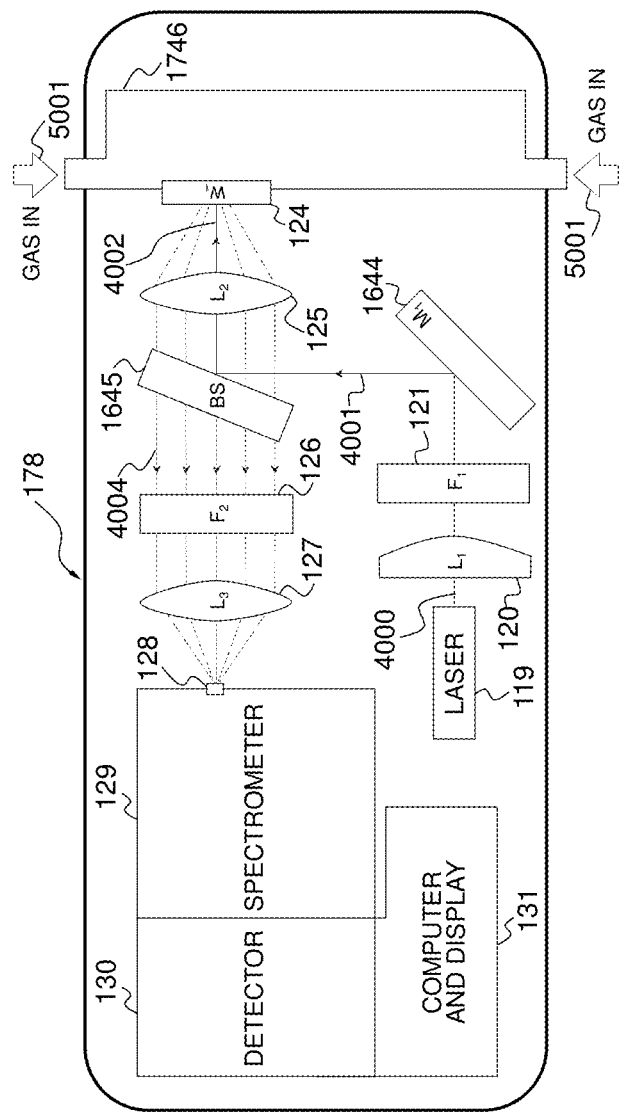
FIG. 28 is a schematic diagram of a multi-gas Raman detector with diffusion-driven gas sampling according to an example embodiment of the present invention.

FIG. 28 illustrates an example embodiment of a multi-gas Raman detector 178 in accordance with the current invention. Multi-gas Raman detector 178 is based on a simplified optical design that combines the optical pathways of the laser beam, for generating the plasmon-enhanced Raman scattered signals of a multi-gas sample, and the backward scattered enhanced Raman signals through lens 125. This configuration allows straightforward alignment of the laser beam and the collection pathway of the optical system. Multi-gas Raman detector 178 includes laser source 119 generating laser beam 4004 with a wavelength in the VIS to NIR wavelength range. In certain cases, the laser source polarization state is controlled and aligned to the orientation of the nanogrids of the flow-through enhancement nanogrid array as part of enhancement unit 1746, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to dichroic beam splitter 1645 by means of mirror 1644. Dichroic beam splitter 1645 directs laser beam 4001 to lens 125. Lens 125 focuses and directs focused laser beam 4002 to enhancement unit 1746 with normal incidence angle to optical window 124. Optical window 124 is made of an appropriate material with both faces coated with an anti-reflective layer. Focused laser beam 4002 enters enhancement unit 1746 via optical window 124 and interacts with a flow-through enhancement nanogrid, which is described elsewhere herein. Focused laser beam 4002 at the nanogrid generates plasmon-enhanced Stokes-shifted Raman scattering of the constituent molecules in the sample gas within, or flowing through, the nanogaps of the flow-through enhancement nanogrid. In this case, the gas sample moves through the flow-through nanogrids of enhancement unit 1746, via gas inlets 5001, by diffusion. Diffusion-driven sample gas flow is a passive process that reduces cost and power consumption of the multi-gas detector, while typically resulting in a longer response time. A filter is used at gas inlets 5001 to remove particles and debris from the sample gas. The resulting backward scattered enhanced Raman signals, of gas molecules from the top surface of a flow-through enhancement nanogrid as part of enhancement unit 1746, pass through optical window 124 and collimated by lens 125, and pass through Dichroic beam splitter 1645. Dichroic beam splitter 1645 serves as an optical filter to remove laser light from the backward scattered enhanced Raman signals. Enhanced Raman scattered signals 4004 pass through laser rejection filter 126 to remove laser light prior to entering spectrometer 129. Lens 127 focuses the enhanced Raman signals 4004 at entrance slit 128 of spectrometer 129. The étendue of the optical collection system, comprised of optical elements 124, 125, 1645, 126, 127, and 128, is optimized to maximize the intensities of the enhanced Raman scattered signals. Optical detector 130 detects the dispersed Raman scattered emission lines and converts the signal data into a format suitable for data processing by digital computer 131 for data analytics and visual display of the Raman spectrum representing the vibration bands of the constituent molecules in the sample gas, and for providing alerts of potential hazardous gases, or other gases of interest, in a multi-gas sample.

Figure 29:
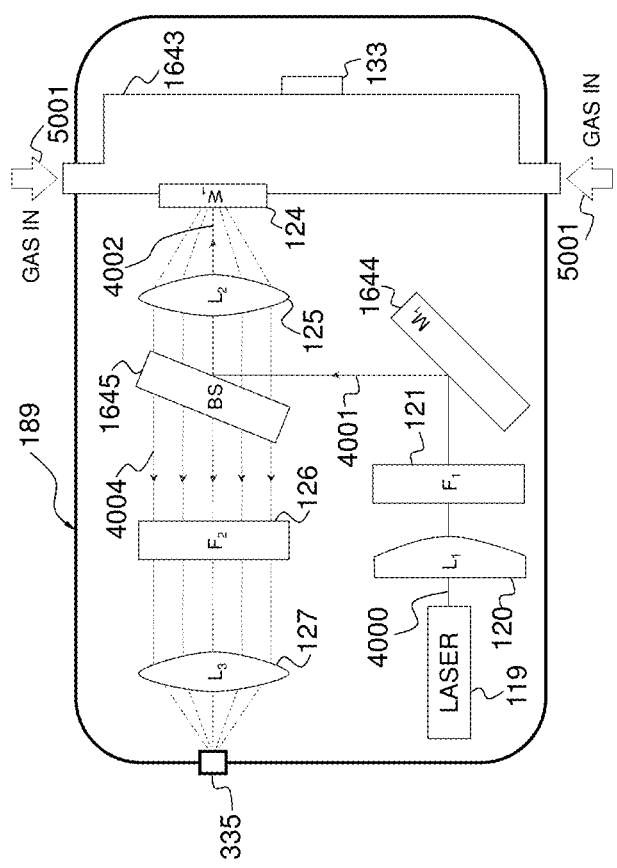
FIG. 29 is a schematic diagram of a multi-gas Raman detector with a fiber-optic port for connection to an external Raman detector and pump-driven gas sampling according to an example embodiment of the present invention.

FIG. 29 illustrates an example embodiment of a multi-gas Raman detector 189 in accordance with the current invention. Multi-gas Raman detector 189 is connected to an external Raman detector and enables the detection of multi-gas samples. The gas sample is actively drawn through the detector by a motorized pump. Multi-gas Raman detector 189 employs flow-through nanogrids that provide plasmon-enhanced Raman scattering of the constituent molecules in a multi-gas sample within, or flowing through, the nanogrids. In this embodiment, multi-gas Raman detector 189 is based on a simplified optical design that combines the optical pathways of the laser beam, for generating the plasmon-enhanced Raman scattered signals of the sample gas, and the backward scattered enhanced Raman signals through lens 125. This configuration allows straightforward alignment of the laser beam and the collection pathway of the optical system. Multi-gas Raman detector 189 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to dichroic beam splitter 1645 by mirror 1644. Dichroic beam splitter 1645 directs laser beam 4001 to lens 125. Lens 125 focuses and directs the laser beam to enhancement unit 1643 with normal incidence angle to optical window 124. Optical window 124 is made of an appropriate material with both faces coated with an anti-reflective layer. Focused laser beam 4002 enters enhancement unit 1643 via optical window 124 and interacts with a flow-through enhancement nanogrid, which is described elsewhere herein. Focused laser beam 4002 at the nanogrid generates plasmon-enhanced Stokes-shifted Raman scattering of the constituent molecules in a sample gas within, or flowing through, the flow-through enhancement nanogrid. The gas sample is drawn through the flow-through nanogrid of enhancement unit 1643, via gas inlets 5001, using motorized pump 133. Motorized pump 133 actively draws the sample gas into enhancement unit 1643, which can reduce the response time of the multi-gas detector. The sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at gas inlets 5001 to remove particles and debris from the sample gas. The resulting backward scattered enhanced Raman signals, of gas molecules from the top surface of a flow-through enhancement nanogrid as part of enhancement unit 1643, pass through optical window 124 and are collected and collimated by lens 125 and pass through dichroic beam splitter 1645. Dichroic beam splitter 1645 serves as an optical filter to remove laser light from the backward scattered enhanced Raman signals. Enhanced Raman scattered signals 4004 pass through laser rejection filter 126 to remove laser light prior to entering the exit fiber-optic port 335. Lens 127 focuses enhanced Raman scattered signals 4004 at exit fiber-optic port 335. The étendue of the optical collection system, comprised of optical elements 124, 125, 1645, 126, 127, and 335 is optimized to maximize the intensities of the enhanced Raman scattered signals directed to exit fiber-optic port 335. Multi-gas Raman detector 189 is coupled to an external Raman detector using an appropriate fiber-optic cable through exit port 335.

Figure 30:
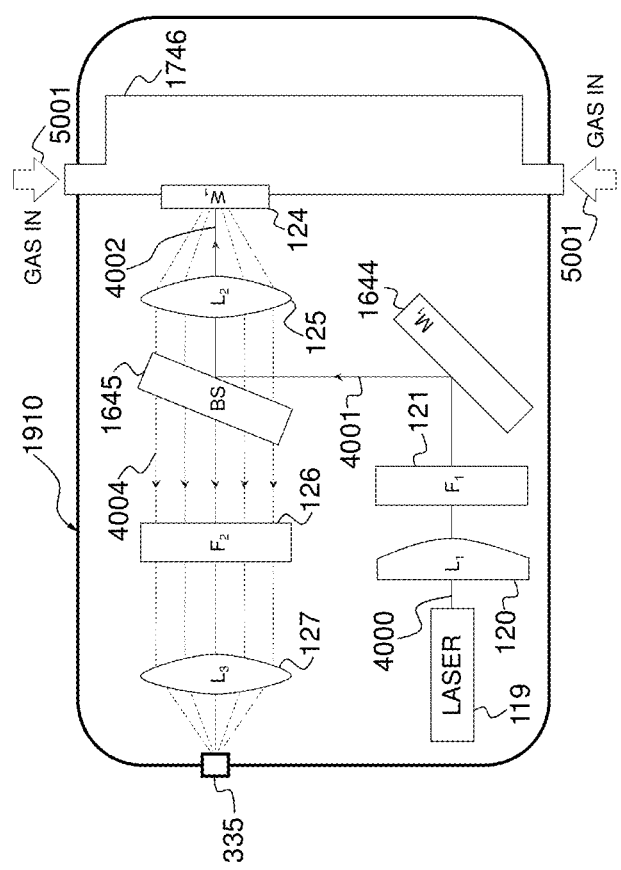
FIG. 30 is a schematic diagram of a multi-gas Raman detector with a fiber-optic port for connection to an external Raman detector and diffusion-driven gas sampling according to an example embodiment of the present invention.

FIG. 30 illustrates an example embodiment of a multi-gas Raman detector 1910 in accordance with the current invention. Multi-gas Raman detector 1910 is connected to an external Raman detector and enables remote detection of multi-gas samples for a wide variety of applications. The gas sample moves through the detector by diffusion. Multi-gas Raman detector 1910 employs flow-through nanogrids that provide plasmon-enhanced Raman scattering of the constituent molecules in the sample gas within, or flowing through, the nanogrids. In this embodiment, multi-gas Raman detector 1910 is based on a simplified optical design that combines the optical pathways of the laser beam, for generating the plasmon-enhanced Raman scattered signals of the sample gas, and the backward scattered enhanced Raman signals through a common lens. Multi-gas Raman detector 1910 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1746, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to dichroic beam splitter 1645 by means of mirror 1644. Dichroic beam splitter 1645 directs laser beam 4001 to focusing lens 125. Lens 125 focuses and directs the laser beam to enhancement unit 1746 with normal incidence angle to optical window 124. Optical window 124 is made of an appropriate material with both faces coated with an anti-reflective layer. Focused laser beam 4002 enters enhancement unit 1746 via optical window 124 and interacts with a flow-through enhancement nanogrid, which is described elsewhere herein. Focused laser beam 4002 at the nanogrid generates plasmon-enhanced Stokes-shifted Raman scattering of the constituent molecules in a sample gas within, or flowing through, the flow-through enhancement nanogrid. In this case, the gas moves through enhancement unit 1746, via gas inlets 5001, by diffusion. Diffusion-driven sample gas flow is a passive approach that reduces cost and power consumption of the multi-gas Raman detector, while typically resulting in a longer response time. A filter is used at gas inlets 5001 to remove particles and debris from the sample gas. The resulting backward scattered enhanced Raman signals, of gas molecules from the top surface of a flow-through enhancement nanogrid as part of enhancement unit 1746, pass through optical window 124 and are collected and collimated by lens 125 and pass through dichroic beam splitter 1645. Dichroic beam splitter 1645 serves as an optical filter to remove laser light from the backward scattered enhanced Raman signals. Enhanced Raman scattered signals 4004 pass through laser rejection filter 126 to remove laser light prior to entering exit fiber-optic port 335. Lens 127 focuses the enhanced Raman signals at exit fiber-optic port 335. The étendue of the optical collection system, comprised of optical elements 124, 125, 1645, 126, 127, and 335 is optimized to maximize the intensities of the enhanced Raman signals directed to exit fiber-optic port 335. Multi-gas Raman detector 1910 is coupled to an external Raman detector by an appropriate fiber-optic cable through port 335.

Figure 31:
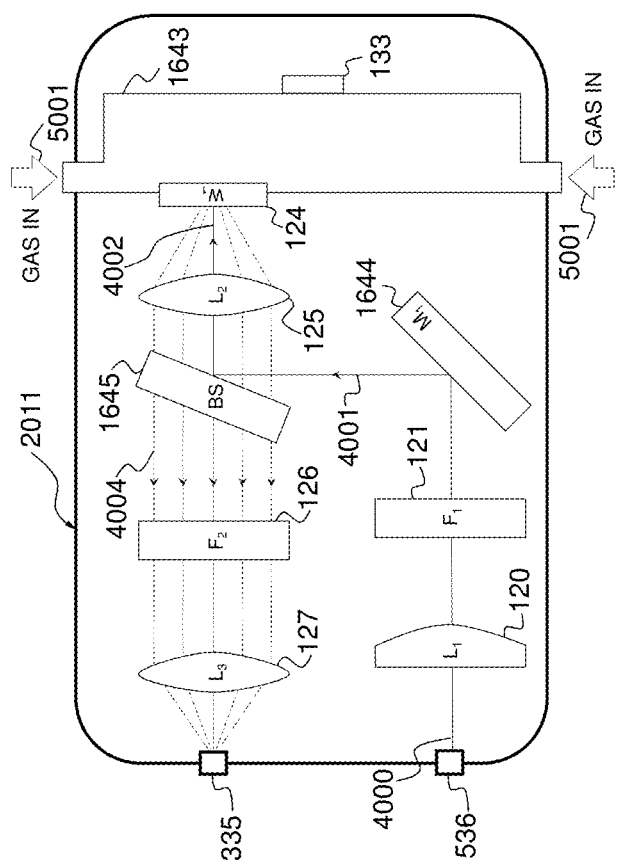
FIG. 31 is a schematic diagram of a multi-gas Raman detector with fiber-optic ports for connection to an external laser and external Raman detector and pump-driven gas sampling according to an example embodiment of the present invention.

FIG. 31 illustrates an example embodiment of a multi-gas Raman detector 2011 in accordance with the current invention. Multi-gas Raman detector 2011 is connected to an external laser source and an external Raman detector and enables remote detection of multi-gas samples for a wide variety of applications. The gas sample is actively drawn through the detector by a motorized pump. Multi-gas Raman detector 2011 employs flow-through nanogrids that provide plasmon-enhanced Raman scattering of the constituent molecules in a multi-gas sample within, or flowing through, the nanogrids. In this embodiment, multi-gas Raman detector 2011 is based on a simplified optical design that combines the optical pathways of the laser beam, for generating the plasmon-enhanced Raman scattered signals of the sample gas, and the backward scattered enhanced Raman signals through lens 125. This configuration allows straightforward alignment of the laser beam and the collection pathway of the optical system. An external laser source generates laser beam 4000 with a wavelength in the VIS to NIR wavelength range and is coupled to multi-gas Raman detector 2011 by an appropriate fiber-optic cable connected to entrance fiber-optic port 536. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser beam that enters fiber-optic port 536. Narrow-band bandpass filter 121 is coupled to collimation lens 120. Bandpass filter 121 removes optical noise accompanying the laser beam. Collimated laser beam 4001 is directed to dichroic beam splitter 1645 by mirror 1644. Dichroic beam splitter 1645 directs laser beam 4001 to lens 125. Lens 125 focuses and directs the laser beam to enhancement unit 1643 with normal incidence angle to optical window 124. Optical window 124 is made of an appropriate material with both faces coated with an anti-reflective layer. Focused laser beam 4002 enters enhancement unit 1643 via optical window 124 and interacts with a flow-through enhancement nanogrid, which is described elsewhere herein. Focused laser beam 4002 at the nanogrid generates plasmon-enhanced Stokes-shifted Raman scattering of the constituent molecules in a sample gas within, or flowing through, the flow-through enhancement nanogrid. The gas sample is drawn through the flow-through nanogrid of enhancement unit 1643, via gas inlets 5001, using motorized pump 133. Motorized pump 133 actively draws the sample gas into enhancement unit 1643, which can reduce the response time of the multi-gas detector. The sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at gas inlets 5001 to remove particles and debris from the sample gas. The backward scattered enhanced Raman signals, of gas molecules from the top surface of a flow-through enhancement nanogrid as part of enhancement unit 1643, pass through optical window 124 and are collected and collimated by lens 125 and pass through dichroic beam splitter 1645. Dichroic beam splitter 1645 serves as an optical filter to remove laser light from the backward scattered enhanced Raman signals. Enhanced Raman scattered signals 4004 pass through laser rejection filter 126 to further remove laser light prior to entering exit fiber-optic port 335. Lens 127 focuses the Raman scattered signals at exit port 335. The étendue of the optical collection system, comprised of optical elements 124, 125, 1645, 126, 127, and 335 is optimized to maximize the intensities of the enhanced Raman scattered signals directed to exit fiber-optic port 335. Multi-gas Raman detector 2011 is coupled to an external Raman detector using an appropriate fiber-optic cable through exit port 335.

Figure 32:
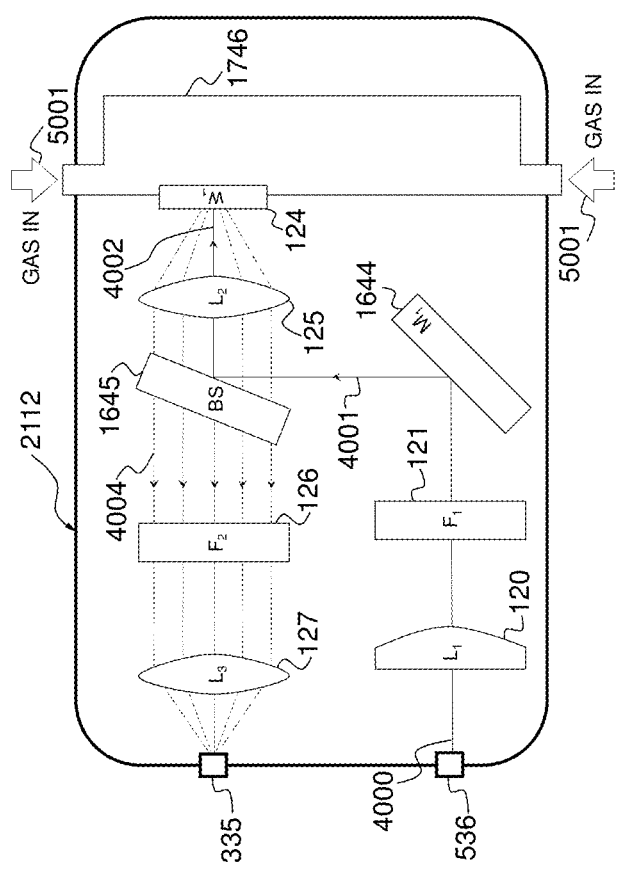
FIG. 32 is a schematic diagram of a multi-gas Raman detector with fiber-optic ports for connection to an external laser and external Raman detector and diffusion-driven gas sampling according to an example embodiment of the present invention.

FIG. 32 illustrates an example embodiment of a multi-gas Raman detector 2112 in accordance with the current invention. Multi-gas Raman detector 2112 is connected to an external laser source and an external Raman detector and enables remote detection of multi-gas samples for a wide variety of applications. The gas sample moves through the detector by diffusion. Multi-gas Raman detector 2112 employs flow-through nanogrids that provide plasmon-enhanced Raman scattering of the constituent molecules in the sample gas within, or flowing through, the nanogrids. In this embodiment, multi-gas Raman detector 2112 is based on a simplified optical design that combines the optical pathways of the laser beam, for generating the plasmon-enhanced Raman scattered signals of the sample gas, and the backward scattered enhanced Raman signals through a common lens. This configuration allows straightforward alignment of the laser beam and the collection axis of the optical system. An external laser source generates laser beam 4000 with a wavelength in the VIS to NIR wavelength range and is coupled to multi-gas Raman detector 2012 by an appropriate fiber-optic cable connected to entrance fiber-optic port 536. In certain cases, the laser source polarization state is controlled and aligned to the orientation of the nanogrids of the flow-through enhancement nanogrid array as part of enhancement unit 1746, which is described elsewhere herein. Collimation lens 120 is coupled to laser beam 4000 that enters the multi-gas Raman detector 2112 through entrance port 536. Narrow-band bandpass filter 121 is coupled to collimation lens 120. Bandpass filter 121 removes optical noise accompanying the laser beam. Laser beam 4001 is directed to dichroic beam splitter 1645 by means of mirror 1644. Dichroic beam splitter 1645 directs laser beam 4001 to focusing lens 125. Lens 125 focuses and directs the laser beam 4002 to enhancement unit 1746 with normal incidence angle to optical window 124. Optical window 124 is made of an appropriate material with both faces coated with an anti-reflective layer. Laser beam 4002 enters enhancement unit 1746 via optical window 124 and interacts with a flow-through enhancement nanogrid, which is described elsewhere herein. Focused laser beam 4002 at the nanogrid generates plasmon-enhanced Stokes-shifted Raman scattering of the constituent molecules in a sample gas within, or flowing through, the flow-through enhancement nanogrid. In this case, the gas moves through enhancement unit 1746, via gas inlets 5001, by diffusion. Diffusion-driven sample gas flow is a passive approach that reduces cost and power consumption of the multi-gas Raman detector, while typically resulting in a longer response time. A filter is used at gas inlets 5001 to remove particles and debris from the sample gas. The resulting backward scattered Raman signals, of gas molecules from the top surface of a flow-through enhancement nanogrid as part of enhancement unit 1746, pass through the optical window 124 and are collected and collimated by lens 125 and pass dichroic beam splitter 1645. Dichroic beam splitter 1645 serves as an optical filter to remove laser light from the backward scattered enhanced Raman signals. Enhanced Raman signals 4004 pass through laser rejection filter 126 to remove laser light prior to entering exit fiber-optic port 335. Lens 127 focuses the enhanced Raman scattered signals at exit fiber-optic port 335. The étendue of the optical collection system, comprised of optical elements 124, 125, 1645, 126, 127, and 335 is optimized to maximize the intensities of the enhanced Raman signals directed to exit fiber-optic port 335. Multi-gas Raman detector 2112 is coupled to an external Raman detector by an appropriate fiber-optic cable through exit port 335.

Figure 33:
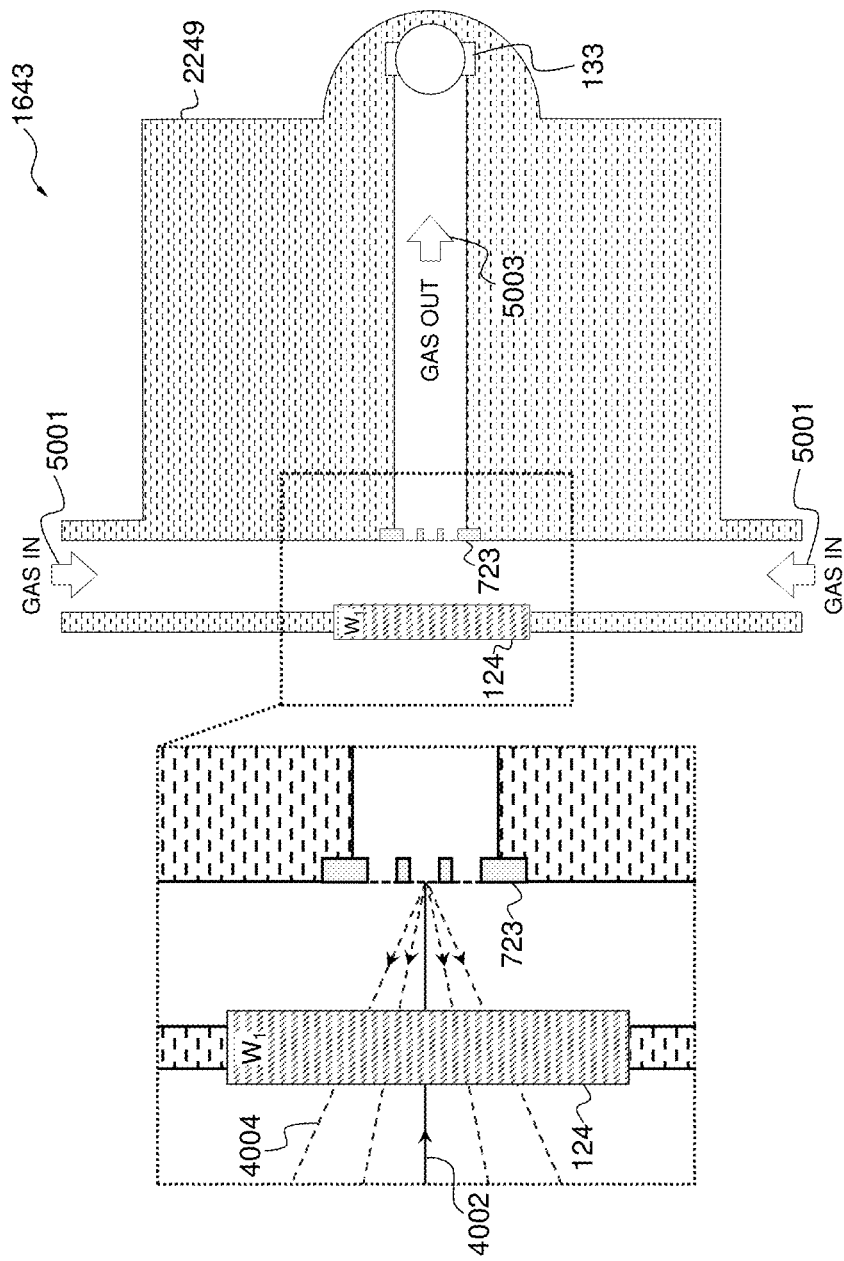
FIG. 33 is a schematic diagram an enhancement unit forming part of the multi-gas Raman detectors of FIG. 27, FIG. 29, and FIG. 31.

FIG. 33 illustrates an example embodiment of the enhancement unit 1643, which includes a housing 2249 that defines the flow path of the sample gas, optical window 124 that defines the optical pathway of laser beam 4002 and backward scattered Raman signals 4004, and flow-through enhancement nanogrid 723 that provides plasmon-enhanced Raman scattering of the sample gas. The gas sample is drawn through the flow-through nanogrid of enhancement unit 1643, via gas inlets 5001, using motorized pump 133. Motorized pump 133 actively draws the sample gas into enhancement unit 1643 through gas inlet ports 5001, through flow-through enhancement nanogrid array 723, and exit through gas outlet 5003, which can reduce the response time of the multi-gas detector. The sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at gas inlets 5001 to remove particles and debris from the sample gas. From the inset, focused laser beam 4002 enters enhancement unit 1643 via optical window 124 with a normal incidence angle that excites the localized surface plasmon resonance of flow-through enhancement nanogrid 723, which results in the generation of plasmon-enhanced Stokes-shifted Raman backward scattering 4004 from molecules in a sample gas within, or flowing through, enhancement nanogrid 723 as part of enhancement unit 1643. In this case, plasmon-enhanced Raman signals 4004 are generated in backward scattering configuration. Optical window 124 defines the optical pathway for backward scattered enhanced Raman signals 4004 that are detected by the multi-gas Raman detectors of FIG. 27, FIG. 29, and FIG. 31. Gas outlet 5003 is connected to a motorized pump, as described in the multi-gas Raman detectors of FIG. 27, FIG. 29, and FIG. 31. The plasmon-enhanced Raman scattering enhancement is maximized through spectral alignment of the electric field enhancement factor spectrum to the laser beam wavelength by controlling the dimensions and arrangement of the nanostructures of flow-through enhancement nanogrid 723, as described elsewhere herein. For applications requiring temperature control of the Raman scattering process, an integrated temperature controller can be utilized to set the temperature of flow-through enhancement nanogrid 723. Many different configurations are possible with these key components.

Figure 34:
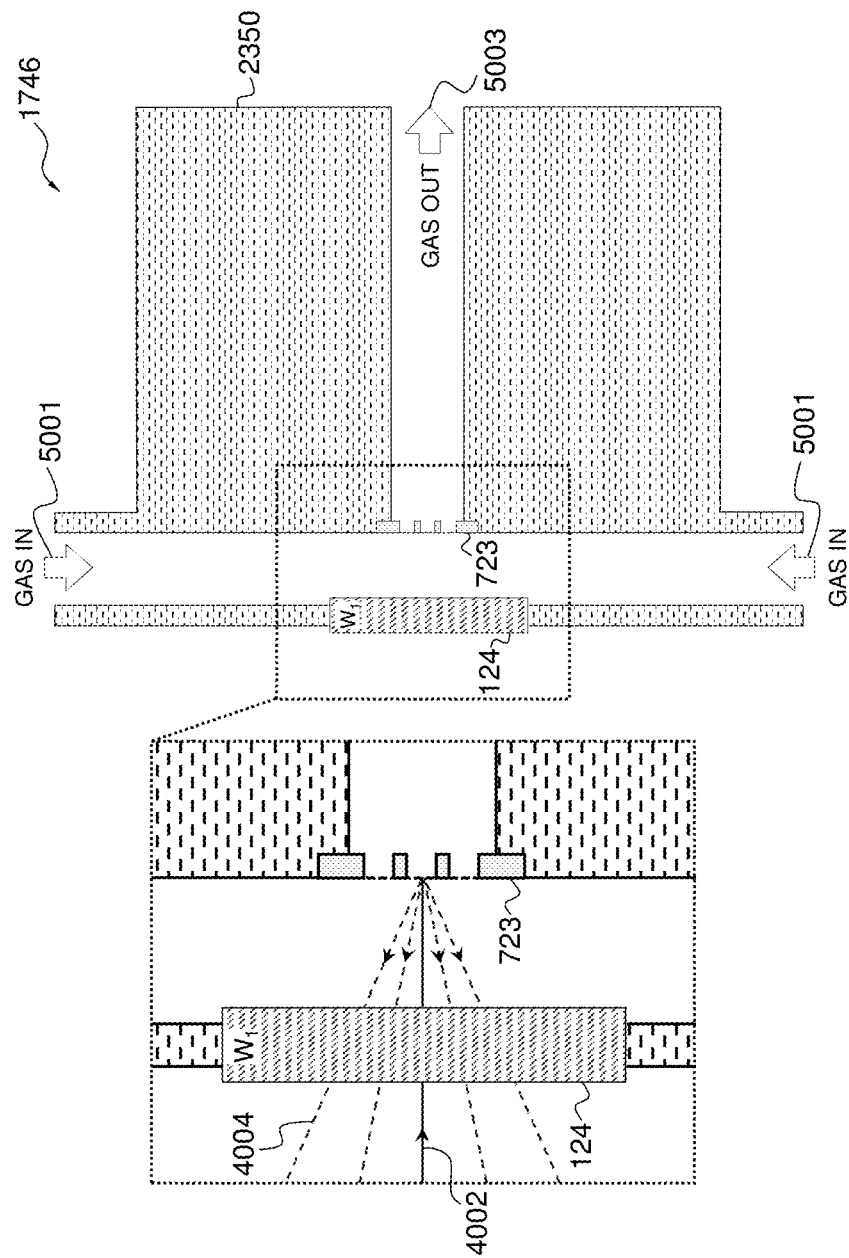
FIG. 34 is a schematic diagram an enhancement unit forming part of the multi-gas Raman detectors of FIG. 28, FIG. 30, and FIG. 32.

FIG. 34 illustrates an example embodiment of the enhancement unit 1746, which includes a housing 2350 that defines the flow path of the sample gas, optical window 124 that defines the optical pathway of laser beam 4002 and backward scattered Raman signals 4004, and flow-through enhancement nanogrid 723 that provides plasmon-enhanced Raman scattering of the sample gas. The gas sample moves through the flow-through nanogrid of enhancement unit 1746, via gas inlets 5001, diffusion. The sample gas enters enhancement unit 1643 through gas inlet ports 5001, moves through flow-through enhancement nanogrid array 723, and exits through gas outlet 5003. From the inset, focused laser beam 4002 enters enhancement unit 1746 via optical window 124 with a normal incidence angle that excites the localized surface plasmon resonance of flow-through enhancement nanogrid 723, which results in the generation of plasmon-enhanced Stokes-shifted Raman backward scattering 4004 from molecules in the sample gas within, or flowing through, enhancement nanogrid element 723, as part of enhancement unit 1746. In this case, plasmon-enhanced Raman signals 4004 are generated in backward scattering configuration. Optical window 124 defines the optical pathway for backward scattered plasmon-enhanced Raman signals 4004 that are detected by the multi-gas Raman detectors of FIG. 28, FIG. 30, and FIG. 32. Gas outlet 5003 is connected to the ambient environment, as described in the multi-gas Raman detectors of FIG. 28, FIG. 30, and FIG. 32. The plasmon-enhanced Raman scattering, of multi-gas Raman detectors defined by FIG. 28, FIG. 30, and FIG. 32, is maximized through spectral alignment of the spectrum of electric field enhancement factor to the laser beam wavelength by controlling the dimensions and arrangement of the nanostructures of flow-through enhancement nanogrid 723, as described elsewhere herein. For applications requiring temperature control of the Raman scattering process, an integrated temperature controller can be utilized to set the temperature of flow-through enhancement nanogrid 723. Many different configurations are possible with these key components.

Figure 35:
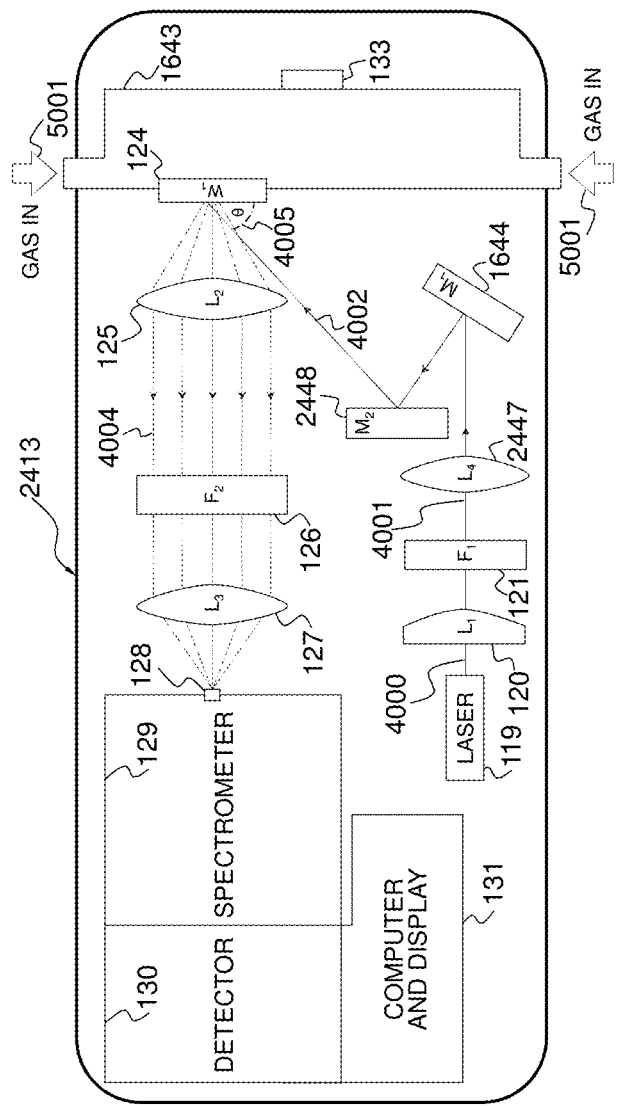
FIG. 35 is a schematic diagram of a multi-gas Raman detector with a laser beam at variable incidence angle and pump-driven gas sampling according to an example embodiment of the present invention.

FIG. 35 illustrates an example embodiment of a multi-gas Raman detector 2413 in accordance with the current invention. Multi-gas Raman detector 2413 is based on an optical design that separates the optical pathways of the laser beam, for generating the plasmon-enhanced Raman scattered signals of the sample gas, and the lens for collecting the backward scattered enhanced Raman signals. The optical pathway of the laser beam is arranged to enable an incidence angle that maximizes the plasmon-enhanced Raman scattered signals of a multi-gas sample. Multi-gas Raman detector 2413 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to enhancement unit 1643 by lens 2447, mirror 1644, and mirror 2448. Mirrors 1644 and 2448 can be rotated to change the incidence angle 4005 of laser beam 4002, with respect to the surface of optical window 124. Optical window 124 is made of an appropriate material with both faces coated with an anti-reflective layer. Focused laser beam 4002 enters enhancement unit 1643 via optical window 124 with incidence angle 4005 and interacts with a flow-through enhancement nanogrid, which is described elsewhere herein. Focused laser beam 4002 at the nanogrid generates plasmon-enhanced Stokes-shifted Raman scattering of the constituent molecules in a multi-gas sample within, or flowing through, the flow-through enhancement nanogrid. Incidence angle 4005 of the laser beam is selected to maximize the enhancement of Raman scattered signals of the gas sample. The incidence angle 4005 can vary from 5° up to 85° depending on the dimensions and arrangement of the nanostructures of the enhancement nanogrid and the wavelength of the laser beam. The gas sample is drawn through the flow-through nanogrids of enhancement unit 1643, via gas inlets 5001, using motorized pump 133, such as, but not limited to, a diaphragm pump, rotary pump, or peristaltic pump. Motorized pump 133 actively draws the sample gas into enhancement unit 1643, which can reduce the response time of the multi-gas detector. The sample flow rate can be actively modulated with motorized pump 133. For example, the sample gas can be drawn continuously through the detector at varying flow rates enabling controlled volume sampling. Furthermore, the sample gas can be continuously drawn through the detector and subsequently recirculated through the enhancement nanogrids to maximize the intensity of the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at gas inlets 5001 to remove particles and debris from the sample gas. The resulting backward scattered Raman signals, of gas molecules from the top surface of a flow-through enhancement nanogrid, as part of enhancement unit 1643, pass through optical window 124 and are collected by lens 125. Backward scattered Raman signals 4004 are collimated by lens 125 and pass through laser rejection filter 126 to remove laser light prior to entering spectrometer 129. Lens 127 focuses the Raman signals at entrance slit 128 of spectrometer 129. The étendue of the optical collection system, comprised of optical elements 124, 125, 126, 127, and 128, is optimized to maximize the intensities of the Raman scattered signals. Optical detector 130 detects the dispersed Raman scattered emission lines and converts the signal data into a format suitable for data processing by digital computer 131 for data analytics and visual display of the Raman spectrum representing the vibration bands of the constituent molecules in the sample gas, and for providing alerts of potential hazardous gases, or other gases of interest, in a multi-gas sample.

Figure 36:
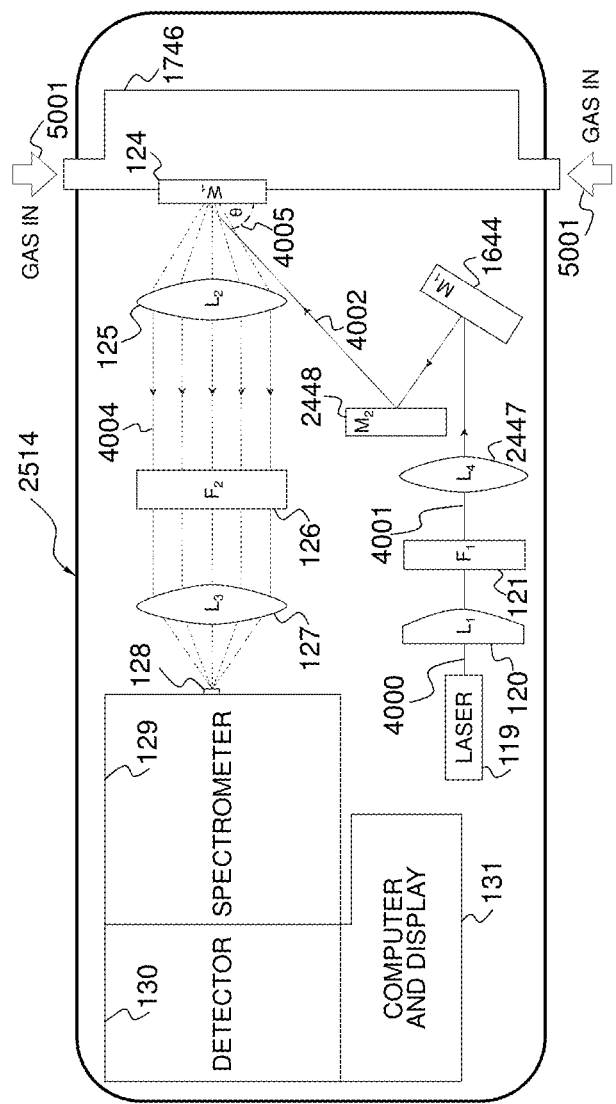
FIG. 36 is a schematic diagram of a multi-gas Raman detector with a laser beam at variable incidence angle and diffusion-driven gas sampling according to an example embodiment of the present invention.

FIG. 36 illustrates an example embodiment of a multi-gas Raman detector 2514 in accordance with the current invention. Multi-gas Raman detector 2514 is based on an optical design that separates the optical pathways of the laser beam, to generate plasmon-enhanced Raman scattered signals of the sample gas, and the backward scattered enhanced Raman signals. The optical pathway of the laser beam is arranged to enable an incidence angle that maximizes the plasmon-enhanced Raman scattered signals of a sample gas. Multi-gas Raman detector 2514 includes laser source 119 generating laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1746, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to enhancement unit 1746 by lens 2447, mirror 1644, and mirror 2448. Mirrors 1644 and 2448 can be rotated to change incidence angle 4005 of laser beam 4002, with respect to the surface of optical window 124. Optical window 124 is made of an appropriate material with both faces coated with an anti-reflective layer. Focused laser beam 4002 enters enhancement unit 1746 via optical window 124 with incidence angle 4005 and interacts with a flow-through enhancement nanogrid, which is described elsewhere herein. Focused laser beam 4002 at the nanogrid generates plasmon-enhanced Stokes-shifted Raman scattering of the constituent molecules in a multi-gas sample within, or flowing through, the flow-through enhancement nanogrid. Incidence angle 4005 of laser beam 4002 is selected to maximize the enhancement of Raman scattering of the gas sample. Incidence angle 4005 can vary from 5° up to 85° depending on the dimensions and arrangement of the nanostructures of the enhancement nanogrid and the wavelength of the laser beam. In this case, the gas sample moves through the flow-through nanogrids of enhancement unit 1746, via gas inlets 5001, by diffusion. Diffusion-driven sample gas flow is a passive process that reduces cost and power consumption of the multi-gas detector, while typically resulting in a longer response time. A filter is used at gas inlets 5001 to remove particles and debris from the sample gas. Backward scattered enhanced Raman signals, of gas molecules from the top surface of a flow-through enhancement nanogrid as part of enhancement unit 1746, pass through optical window 124 and are collected by lens 125. Backward scattered enhanced Raman signals 4004 are collimated by lens 125 and pass through laser rejection filter 126 to remove laser light prior to entering spectrometer 129. Lens 127 focuses the enhanced Raman scattered signals at entrance slit 128 of spectrometer 129. The étendue of the optical collection system, comprised of optical elements 124, 125, 126, 127, and 128, is optimized to maximize the intensities of the Raman scattered signals. Optical detector 130 detects the dispersed Raman scattered emission lines and converts the signal data into a format suitable for data processing by digital computer 131 for data analytics and visual display of the Raman spectrum representing the vibration bands of the constituent molecules in the sample gas, and for providing alerts of potential hazardous gases, or other gases of interest, in a multi-gas sample.

Figure 37:
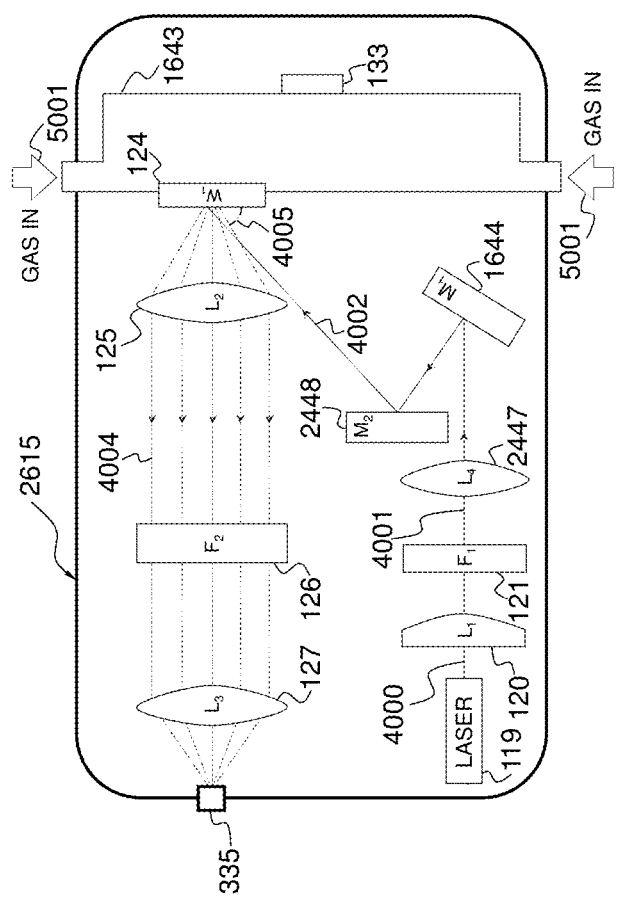
FIG. 37 is a schematic diagram of a multi-gas Raman detector with a fiber-optic port for connection to an external Raman detector, a laser beam at variable incidence angle, and pump-driven gas sampling according to an example embodiment of the present invention.

FIG. 37 illustrates an example embodiment of a multi-gas Raman detector 2615 in accordance with the current invention. Multi-gas Raman detector 2615 is connected to an external Raman detector and enables the detection of multi-gas samples for a wide variety of applications. The gas sample is actively drawn through the detector by a motorized pump. In this embodiment, multi-gas Raman detector 2615 is based on an optical design that separates the optical pathways of the laser beam, for generating the plasmon-enhanced Raman scattered signals of the sample gas, and the backward scattered enhanced Raman signals. The optical pathway of the laser beam is arranged to enable an incidence angle that maximizes the plasmon-enhanced Raman scattered signals of the sample gas. Multi-gas Raman detector 2615 includes laser source 119 that generates laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser source 119. Narrow-band bandpass filter 121 is coupled to collimation lens 120. Bandpass filter 121 removes optical noise accompanying the laser beam. Collimated laser beam 4001 is directed to enhancement unit 1643 by lens 2447, mirror 1644, and mirror 2448. Mirrors 1644 and 2448 can be rotated to change incidence angle 4005 of laser beam 4002, with respect to the surface of optical window 124. Optical window 124 is made of an appropriate material with both faces coated with an anti-reflective layer. Focused laser beam 4002 enters enhancement unit 1643 via optical window 124 with incidence angle 4005 and interacts with a flow-through enhancement nanogrid, which is described elsewhere herein. Focused laser beam 4002 at the nanogrid generates plasmon-enhanced Stokes-shifted Raman scattering of the constituent molecules in a multi-gas sample within, or flowing through, the flow-through enhancement nanogrid. Incidence angle 4005 of laser beam 4002 is selected to maximize the enhancement of Raman scattering of the gas sample. Incidence angle 4005 can vary from 5° up to 85° depending on the dimensions and arrangement of the nanostructures of the enhancement nanogrid and the wavelength of the laser beam. The gas is drawn through enhancement unit 1643, via gas inlets 5001, using motorized pump 133. Motorized pump 133 actively draws the sample gas into enhancement unit 1643, which can reduce the response time of the multi-gas Raman detector. The sample flow rate can be actively modulated with motorized pump 133. For example, the sample gas can be drawn continuously through the detector at varying flow rates enabling controlled volume sampling. Furthermore, the sample gas can be continuously drawn through the detector and subsequently recirculated through the enhancement nanogrids to maximize the enhanced Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at gas inlets 5001 to remove particles and debris from the sample gas. The backward scattered Raman signals, of gas molecules from the top surface of a flow-through enhancement nanogrid as part of enhancement unit 1643, pass through optical window 124 and are collected by lens 125. Backward scattered Raman signals 4004 are collimated by lens 125 and pass through laser rejection filter 126 to remove laser light prior to entering exit fiber-optic port 335. Lens 127 focuses the Raman signals at exit fiber-optic port 335. The étendue of the optical collection system, comprised of optical elements 124, 125, 126, 127, and 335 is optimized to maximize the intensities of the Raman scattered signals directed to exit fiber-optic port 335. Multi-gas Raman detector 2615 is coupled to an external Raman detector by an appropriate fiber-optic cable through exit port 335.

Figure 38:
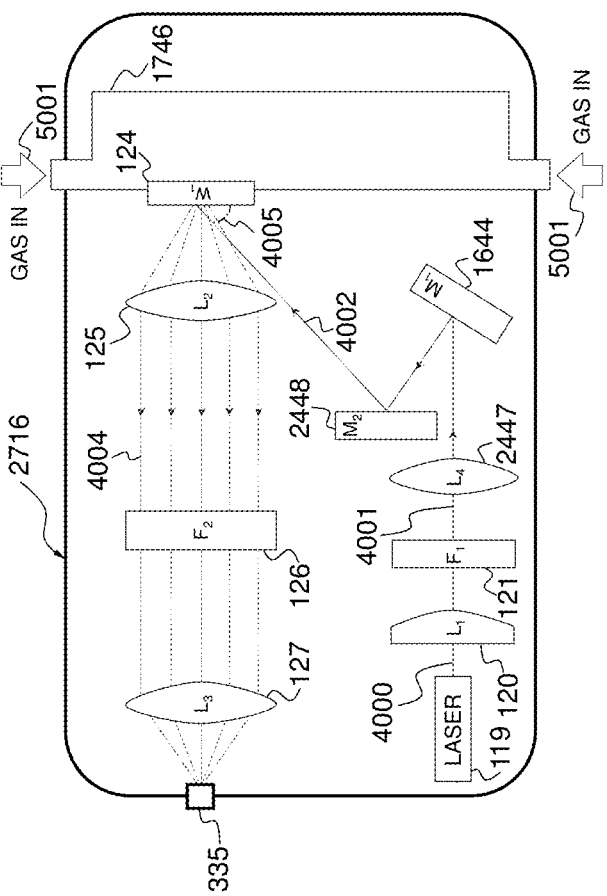
FIG. 38 is a schematic diagram of a multi-gas Raman detector with a fiber-optic port for connection to an external Raman detector, a laser beam at variable incidence angle, and diffusion-driven gas sampling according to an example embodiment of the present invention.

FIG. 38 illustrates an example embodiment of a multi-gas Raman detector 2716 in accordance with the current invention. Multi-gas Raman detector 2716 is connected to an external Raman detector and enables the detection of multi-gas samples for a wide variety of applications. The gas sample moves through the detector by diffusion. In this embodiment, Multi-gas Raman detector 2716 is based on an optical design that separates the optical pathways of the laser beam, for generating the plasmon-enhanced Raman scattered signals of the sample gas, and the backward scattered plasmon-enhanced Raman signals. The optical pathway of the laser beam is arranged to enable an incidence angle that maximizes the plasmon-enhanced Raman scattered signals of the sample gas. Multi-gas Raman detector 2716 includes laser source 119 that generates laser beam 4000 with a wavelength in the VIS to NIR wavelength range. In certain cases, the laser source polarization state is controlled and aligned to the orientation of the nanogrids of the flow-through enhancement nanogrid array as part of enhancement unit 1746, which is described elsewhere herein. Collimation lens 120 is coupled to laser source 119. Narrow-band bandpass filter 121 is coupled to the collimation lens 120. Bandpass filter 121 removes optical noise accompanying the laser beam. Collimated laser beam 4001 is directed to enhancement unit 1746 by lens 2447, mirror 1644, and mirror 2448. Mirrors 1644 and 2448 can be rotated to change incidence angle 4005 of laser beam 4002, with respect to the surface of optical window 124. Optical window 124 is made of an appropriate material with both faces coated with an anti-reflective layer. Focused laser beam 4002 enters enhancement unit 1746 via optical window 124 with incidence angle 4005 and interacts with a flow-through enhancement nanogrid, which is described elsewhere herein. Focused laser beam 4002 at the nanogrid generates plasmon-enhanced Stokes-shifted Raman scattering of the constituent molecules in a multi-gas sample within, or flowing through, the flow-through enhancement nanogrid. Incidence angle 4005 of the laser beam is selected to maximize the enhancement of Raman scattering of the gas sample. Incidence angle 4005 can vary from 5° up to 85° depending on the dimensions and arrangement of the nanostructures of the enhancement nanogrid and the wavelength of the laser beam. The gas moves through enhancement unit 1746, via gas inlets 5001, by diffusion. Diffusion-driven sample gas flow is a passive process that reduces cost and power consumption of the multi-gas Raman detector, while typically resulting in a longer response time. A filter is used at gas inlets 5001 to remove particles and debris from the sample gas. The resulting backward scattered Raman signals, of gas molecules from the top surface of a flow-through enhancement nanogrid as part of enhancement unit 1746, pass through optical window 124 and are collected by lens 125. Backward scattered Raman signals 4004 are collimated by lens 125 and pass through laser rejection filter 126 to remove laser light prior to entering exit fiber-optic port 335. Lens 127 focuses the enhanced Raman signals at exit fiber-optic port 335. The étendue of the optical collection system, comprised of optical elements 124, 125, 126, 127, and 335 is optimized to maximize the enhanced Raman signals directed to exit port 335. Multi-gas Raman detector 2716 is coupled to an external Raman detector by an appropriate fiber-optic cable through exit port 335.

Figure 39:
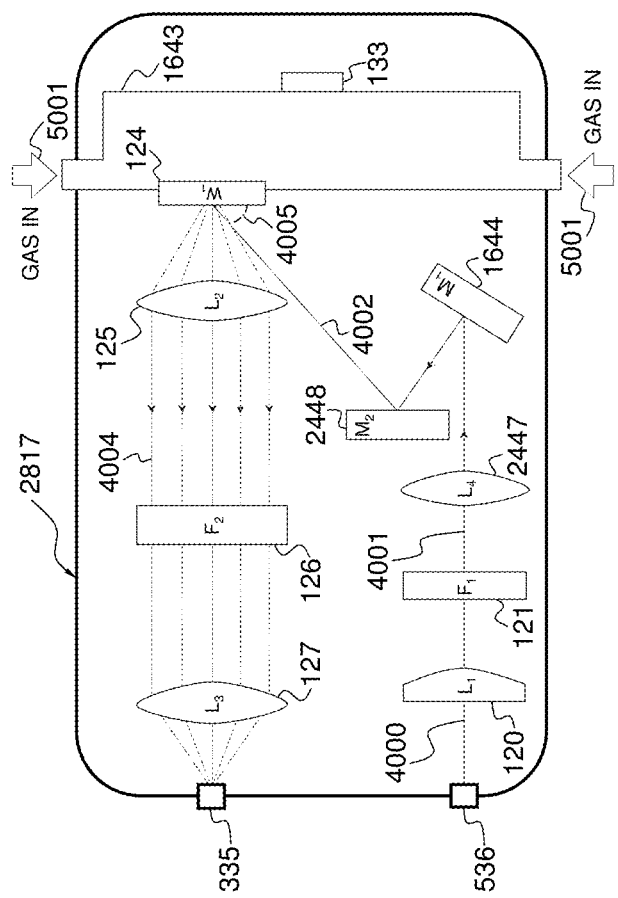
FIG. 39 is a schematic diagram of multi-gas Raman detector with fiber-optic ports for connection to an external laser and external Raman detector, a laser beam at variable incidence angle, and pump-driven gas sampling according to an example embodiment of the present invention.

FIG. 39 illustrates an example embodiment of a multi-gas Raman detector 2817 in accordance with the current invention. Multi-gas Raman detector 2817 is connected to an external laser source and an external Raman detector and enables the detection of multi-gas samples for a wide variety of applications. The gas sample is actively drawn through the detector by a motorized pump. Multi-gas Raman detector 2817 is based on an optical design that separates the optical pathways of the laser beam, for generating the plasmon-enhanced Raman scattered signals of the sample gas, and the backward scattered enhanced Raman signals. The optical pathway of the laser beam is arranged to enable an incidence angle that maximizes the plasmon-enhanced Raman scattered signals of the sample gas. An external laser source generates laser beam 4000 with a wavelength in the VIS to NIR wavelength range and is coupled to multi-gas Raman detector 2817 by an appropriate fiber-optic cable connected to entrance fiber-optic port 536. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser beam 4000 that enters multi-gas Raman detector 2817 through entrance port 536. Narrow-band bandpass filter 121 is coupled to collimation lens 120. Bandpass filter 121 removes optical noise accompanying the laser beam. Collimated laser beam 4001 is directed to enhancement unit 1643 by lens 2447, mirror 1644, and mirror 2448. Mirrors 1644 and 2448 can be rotated to change incidence angle 4005 of laser beam 4002, with respect to the surface of optical window 124. Optical window 124 is made of an appropriate material with both faces coated with an anti-reflective layer. Focused laser beam 4002 enters enhancement unit 1643 via optical window 124 with incidence angle 4005 and interacts with a flow-through enhancement nanogrid, which is described elsewhere herein. Focused laser beam 4002 at the nanogrid generates plasmon-enhanced Stokes-shifted Raman scattering of the constituent molecules in a multi-gas sample within, or flowing through, the flow-through enhancement nanogrid. Incidence angle 4005 of laser beam 4002 is selected to maximize the enhancement of Raman scattering of the gas sample. Incidence angle 4005 can vary from 5° up to 85° depending on the dimensions and arrangement of the nanostructures of the enhancement nanogrid and the wavelength of the laser beam. The gas is drawn through enhancement unit 1643, via gas inlets 5001, using motorized pump 133. Motorized pump 133 actively draws the sample gas into enhancement unit 1643, which can reduce the response time of the multi-gas detector. The sample flow rate can be actively modulated with motorized pump 133. For example, the sample gas can be drawn continuously through the multi-gas detector at varying flow rates enabling controlled volume sampling. Furthermore, the sample gas can be continuously drawn through the detector and subsequently recirculated through the enhancement nanogrids to maximize the Raman scattered signals which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the multi-gas detector. A filter is used at gas inlets 5001 to remove particles and debris from the sample gas. The backward enhanced Raman scattered signals, of gas molecules from the top surface of a flow-through enhancement nanogrid as part of enhancement unit 1643, pass through optical window 124 and are collected by lens 125. Backward scattered Raman signals 4004 are collimated by lens 125 and pass through laser rejection filter 126 to remove laser light prior to entering exit fiber-optic port 335. Lens 127 focuses the enhanced Raman signals at exit fiber-optic port 335. The étendue of the optical collection system, comprised of optical elements 124, 125, 126, 127, and 335 is optimized to maximize the intensities of the enhanced Raman scattered signals 4004 directed to exit port 335. Multi-gas Raman detector 2617 is coupled to an external Raman detector by an appropriate fiber-optic cable through exit port 335.

Figure 40:
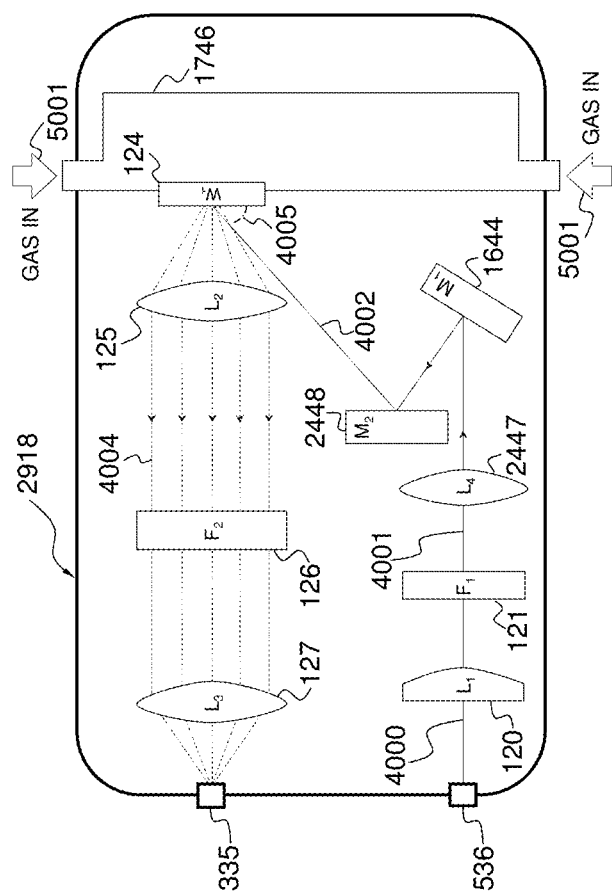
FIG. 40 is a schematic diagram of a multi-gas Raman detector with fiber-optic ports for connection to an external laser and external Raman detector, a laser beam at variable incidence angle, and diffusion-driven gas sampling according to an example embodiment of the present invention.

FIG. 40 illustrates an example embodiment of a multi-gas Raman detector 2918 in accordance with the current invention. Multi-gas Raman detector 2918 is connected to an external laser source and an external Raman detector and enables the detection of multi-gas samples for a wide variety of applications. The gas sample moves through the detector by diffusion. Multi-gas Raman detector 2918 is based on an optical design that separates the optical pathways of the laser beam, for generating the plasmon-enhanced Raman scattered signals of the sample gas, and the backward scattered plasmon-enhanced Raman signals. The optical pathway of the laser beam is arranged to enable an incidence angle that maximizes the plasmon-enhanced Raman scattered signals of the sample gas. An external laser source generates laser beam 4000 with a wavelength in the VIS to NIR wavelength range and is coupled to multi-gas Raman detector 2817 by an appropriate fiber-optic cable connected to entrance fiber-optic port 536. In certain cases, the laser source polarization state is controlled and aligned to the orientation of the nanogrids of the flow-through enhancement nanogrid array as part of enhancement unit 1643, which is described elsewhere herein. Collimation lens 120 is coupled to laser beam 4000 that enters multi-gas Raman detector 2918 through entrance port 536. Narrow-band bandpass filter 121 is coupled to collimation lens 120. Bandpass filter 121 removes optical noise accompanying the laser beam. Collimated laser beam 4001 is directed to enhancement unit 1746 by lens 2447, mirror 1644, and mirror 2448. Mirrors 1644 and 2448 can be rotated to change incidence angle 4005 of laser beam 4002, with respect to the surface of optical window 124. Optical window 124 is made of an appropriate material with both faces coated with an anti-reflective layer. Focused laser beam 4002 enters enhancement unit 1746 via optical window 124 with incidence angle 4005 and interacts with a flow-through enhancement nanogrid, which is described elsewhere herein. Focused laser beam 4002 at the nanogrid generates plasmon-enhanced Stokes-shifted Raman scattering of the constituent molecules in a multi-gas sample within, or flowing through, the flow-through enhancement nanogrid. Incidence angle 4005 of laser beam 4002 is selected to maximize the enhancement of Raman scattering of the gas sample. Incidence angle 4005 can vary from 5° up to 85° depending on the dimensions and arrangement of the nanostructures of the enhancement nanogrid and the wavelength of the laser beam. The gas moves through enhancement unit 1746, via gas inlets 5001, by diffusion. Diffusion-driven sample gas flow is a passive process that reduces cost and power consumption of the multi-gas Raman detector, while typically resulting in a longer response time. A filter is used at gas inlets 5001 to remove particles and debris from the sample gas. Backward scattered enhanced Raman signals, of gas molecules from the top surface of a flow-through enhancement nanogrid as part of enhancement unit 1746, pass through optical window 124 and are collected by lens 125. Backward scattered enhanced Raman signals 4004 are collimated by lens 125 and pass through laser rejection filter 126 to remove laser light prior to entering exit fiber-optic port 335. Lens 127 focuses enhanced Raman signals 4004 at exit port 335. The étendue of the optical collection system, comprised of optical elements 124, 125, 126, 127, and 335 is optimized to maximize the Raman signals directed to exit fiber-optic port 335. Multi-gas Raman detector 2918 is coupled to an external Raman detector by an appropriate fiber-optic cable through exit port 335.

Figure 41:
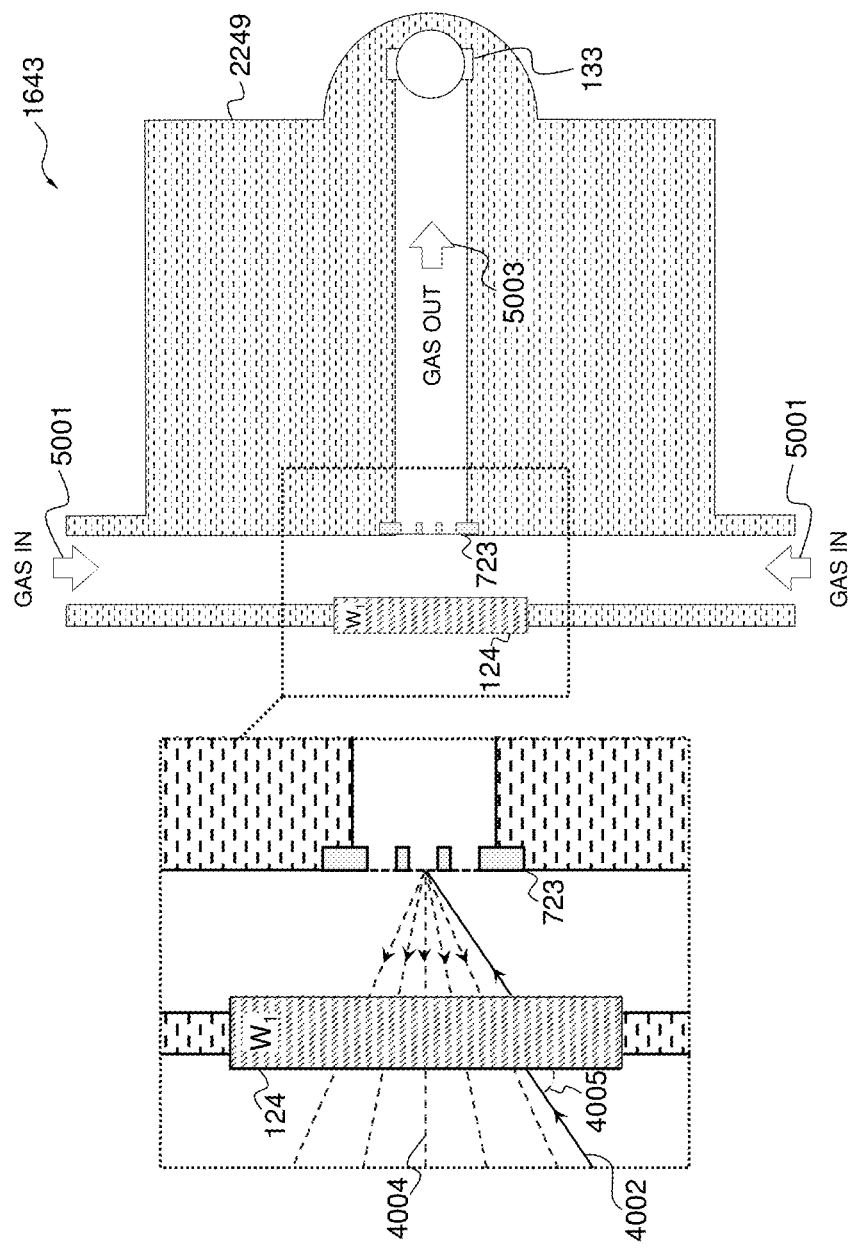
FIG. 41 is a schematic diagram of an enhancement unit forming part of the multi-gas Raman detectors of FIG. 35, FIG. 37, and FIG. 39.

FIG. 41 illustrates an example embodiment of the enhancement unit 1643, which includes housing 2249 that defines the flow path of the sample gas, optical window 124 that defines the optical pathway of laser beam 4002 and backward scattered enhanced Raman signals, and flow-through enhancement nanogrid 723 that provides plasmon-enhanced Raman scattering of the sample gas. The gas sample is drawn through the flow-through nanogrid of the enhancement unit 1643, via gas inlets 5001, using motorized pump 133. Motorized pump 133 actively draws the sample gas into enhancement unit 1643 through gas inlet ports 5001, through flow-through enhancement nanogrid array 723, and out through gas exit port 5003, which can reduce the response time of the multi-gas detector. Gas outlet 5003 is connected to a motorized pump, as described in the multi-gas Raman detectors of FIG. 35, FIG. 37, and FIG. 39. The sample flow rate can be actively modulated with a motorized pump. For example, the sample gas can be drawn continuously through the detector at varying flow rates enabling controlled volume sampling. Furthermore, the sample gas can be continuously drawn through the detector and subsequently recirculated through the enhancement nanogrids to maximize the Raman scattered signals, which is described elsewhere herein. Alternatively, the flow rate of the sample gas can be pulsed, on and off, with a variable duty cycle to optimize the residence time of the sample in the enhancement nanogrids, while ensuring sufficient sample gas is drawn through the detector. A filter is used at gas inlets 5001 to remove particles and debris from the sample gas. From the inset, laser beam 4002 enters enhancement unit 1643 via optical window 124 with incidence angle 4005 and excites the localized surface plasmon resonance of flow-through enhancement nanogrid 723, which results in the generation of plasmon-enhanced Stokes-shifted Raman scattering 4004 from molecules in a sample gas within, or flowing through, enhancement nanogrid 723 as part of enhancement unit 1643. Plasmon-enhanced Raman scattering enhancement, of multi-gas Raman detectors defined by FIG. 35, FIG. 37, and FIG. 39, is maximized through spectral alignment of the electric field enhancement factor spectrum to the laser beam wavelength by controlling incidence angle 4005 of laser beam 4002 with respect to flow-through enhancement nanogrid 723, as described elsewhere herein. For applications requiring temperature control of the Raman scattering process, an integrated temperature controller can be utilized to set the temperature of flow-through enhancement nanogrid 723. Many different configurations are possible with these key components.

Figure 42:
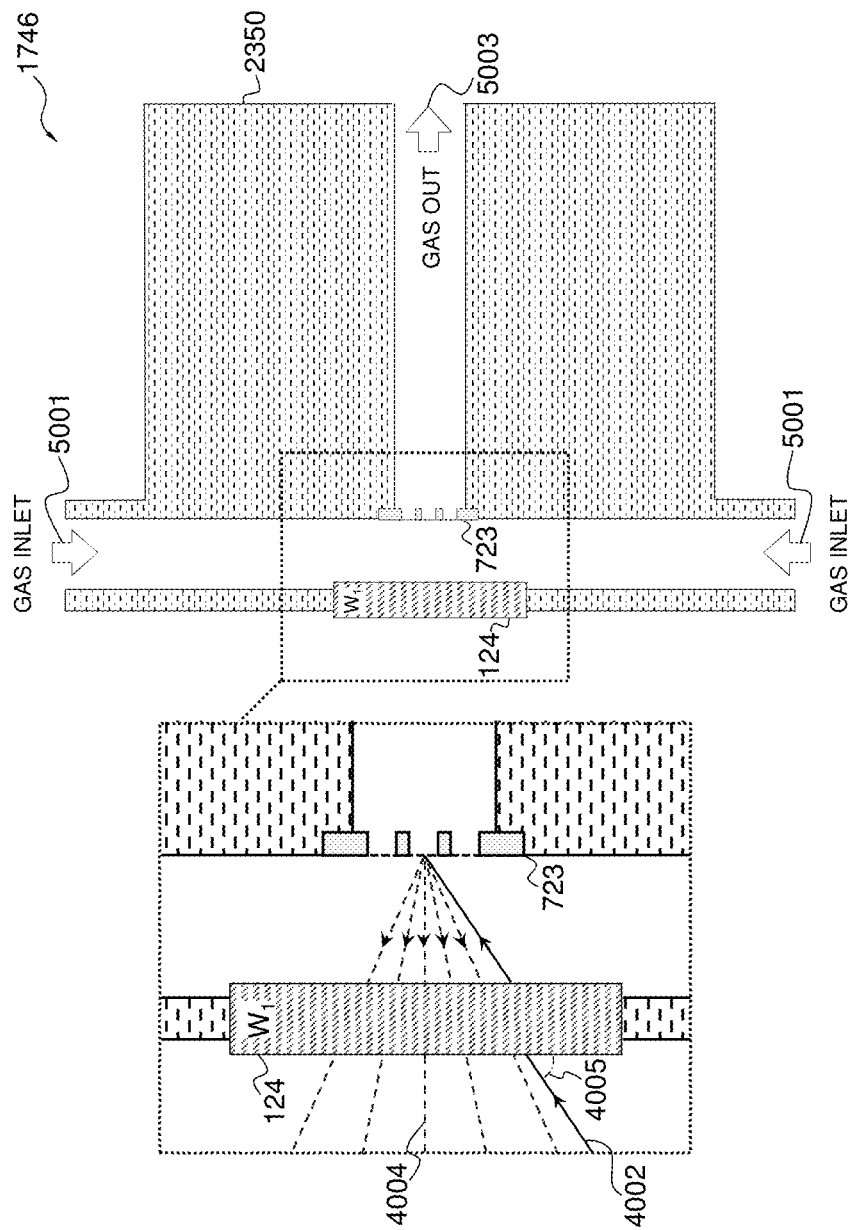
FIG. 42 is a schematic diagram of an enhancement unit forming part of the multi-gas Raman detectors of FIG. 36, FIG. 38, and FIG. 40.

FIG. 42 illustrates an example embodiment of the enhancement unit 1746, which includes housing 2350 that defines the flow path of the sample gas, optical window 124 that defines the optical pathway of laser beam 4002 and backward scattered enhanced Raman signals 4004, and flow-through enhancement nanogrid 723 that provides plasmon-enhanced Raman scattering of the sample gas. The gas sample moves through the flow-through nanogrid of enhancement unit 1746, via gas inlets 5001, by diffusion. The sample gas enters enhancement unit 1643 through gas inlets 5001, passes through flow-through enhancement nanogrid array 723, and exits enhancement unit 1746 through gas outlet 5003. From the inset, laser beam 4002 enters enhancement unit 1746 via optical window 124 with incidence angle 4005 and excites the localized surface plasmon resonance of the nanogrid of flow-through enhancement nanogrid array 723, which results in the generation of plasmon-enhanced Stokes-shifted Raman scattering 4004 from molecules in the sample gas within, or flowing through, enhancement nanogrid element 723, as part of enhancement unit 1746. Plasmon-enhanced Raman scattering of multi-gas Raman detectors defined by FIG. 36, FIG. 38, and FIG. 40 is maximized through spectral alignment of the spectrum of the electric field enhancement factor to the laser beam wavelength by controlling incidence angle 4005 of laser beam 4002 with respect to flow-through enhancement nanogrid 723, as described elsewhere herein. For applications requiring temperature control of the Raman scattering process, an integrated temperature controller can be utilized to set the temperature of flow-through enhancement nanogrid 723. Many different configurations are possible with these key components.

Gas monitoring can be performed with portable gas detectors, portable gas detectors coupled to handheld sampling probes, and fixed-location gas detectors, or a combination of all three. When the source of gases to be monitored is unknown or non-stationary, portable gas detectors are used to directly alert a person of a potential hazard. Portable multi-gas detectors and portable multi-gas detectors with handheld sampling probes are important for applications such as, but not limited to, non-stationary industrial hazard monitoring, environmental hazard monitoring, pre-entry monitoring of confined spaces, hazardous materials handling, and emergency response. Portable gas detectors are classified as standard personal protective equipment attached directly to the clothing of the person, which are designed specifically to protect personnel from the threat of hazardous gases by directly monitoring their breathing zone.

Figure 43:
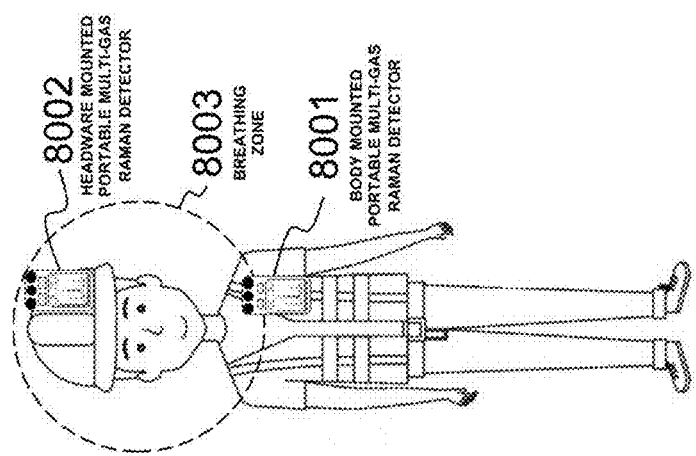
FIG. 43 shows a portable multi-gas Raman detector mounted directly on a worker as personal protective equipment.

FIG. 43 illustrates a multi-gas Raman detector used as a portable multi-gas Raman detector attached directly to the uniform 8001, or headgear 8002 of a person as standard personal protection equipment. The portable multi-gas Raman detector continuously monitors the breathing zone 8003.

Figure 44:
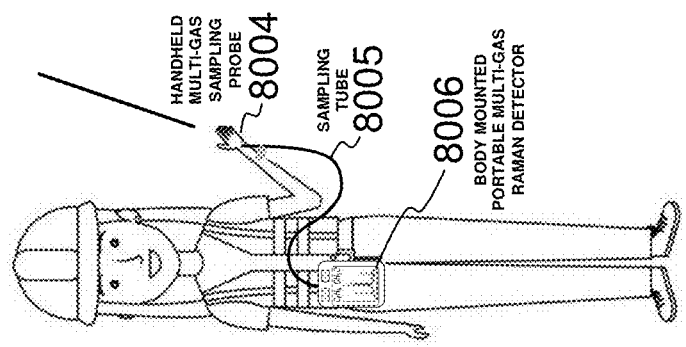
FIG. 44 shows a handheld sampling probe with sampling tube connected to portable multi-gas Raman detector for remote monitoring.

FIG. 44 illustrates a portable multi-gas detector and handheld sampling probe 8004 coupled via a sampling tube 8005 to a portable multi-gas Raman detector 8006 attached directly to the uniform of a person that can be used for remote monitoring of potentially hazardous areas, such as confined spaces.

Figure 45:
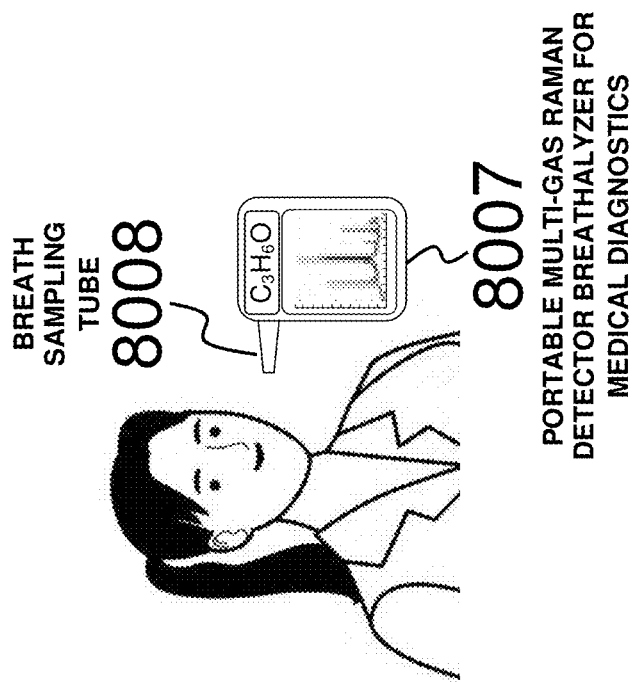
FIG. 45 shows a portable multi-gas Raman detector used as a breath analyzer for medical diagnostics.

FIG. 45 illustrates a portable multi-gas detector used as a breathalyzer, or breath analyzer, for the analyses of the constituent gases in a multi-gas breath sample. The multi-gas Raman detector can be employed as a portable breathalyzer 8007 coupled to a breath sampling tube 8008 for non-invasive, early warning disease detection.

Figure 46:
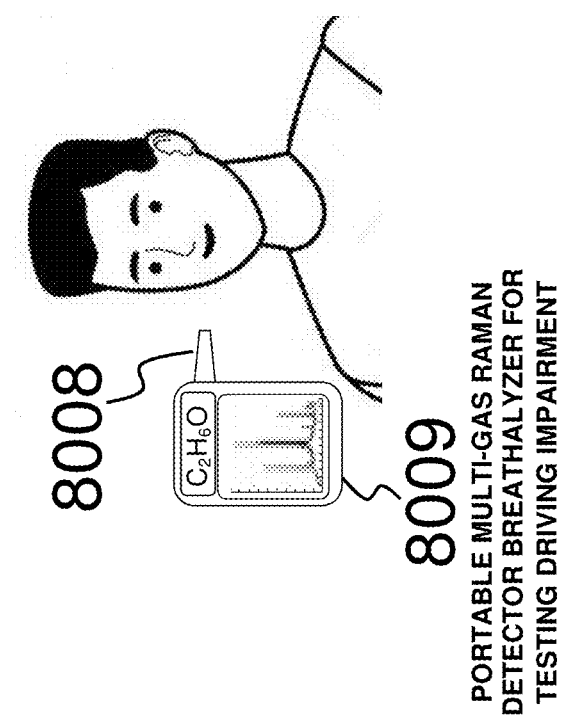
FIG. 46 shows a portable multi-gas Raman detector used as a breath analyzer for assessing vehicle operator impairment.

FIG. 46 illustrates a multi-gas Raman detector employed as a portable breathalyzer 8009 for assessing the presence of substances in exhaled breath that can impair the safe operation of vehicles or heavy equipment, such as ethanol to estimate blood alcohol content, and tetrahydrocannabinol for estimating recent marijuana use.

Industrial sites commonly employ a combination of portable and fixed-location gas detectors to protect on-site personnel and plant assets from hazardous gas exposure, and for monitoring manufacturing processes and hazardous gas emissions. Fixed-location gas detectors are placed in permanent locations and continuously monitor known gases in known locations.

Figure 47:
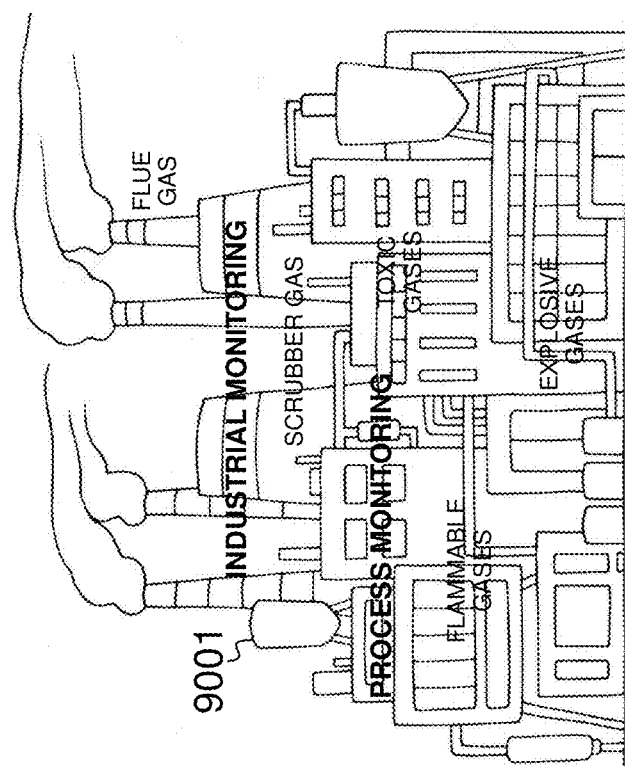
FIG. 47 shows fixed-location and portable multi-gas Raman detectors used for industrial and process monitoring.

FIG. 47 illustrates a multi-gas Raman detector used as a fixed multi-gas detector for industrial monitoring 9001, such as oil and gas refineries, chemical processing and production, power generation, glass and ceramic production, cement production, metal production, waste-water treatment, mining operations, military operations, and the shipping industry. The multi-gas Raman detector can be used to continuously monitor toxic, flammable, and explosive gases in areas where leaks or potential hazards are most likely to occur, and to monitor manufacturing emission stacks, such as scrubbers and flues. Furthermore, monitoring industrial processes with a fixed-location multi-gas detector is an excellent way to optimize manufacturing efficiency, such as monitoring flue gas concentrations to optimize the combustion process of furnaces, heaters, and boilers, which can result in significant operational cost savings, as well as reducing the emission of hazardous and toxic pollutants.

Figure 48:
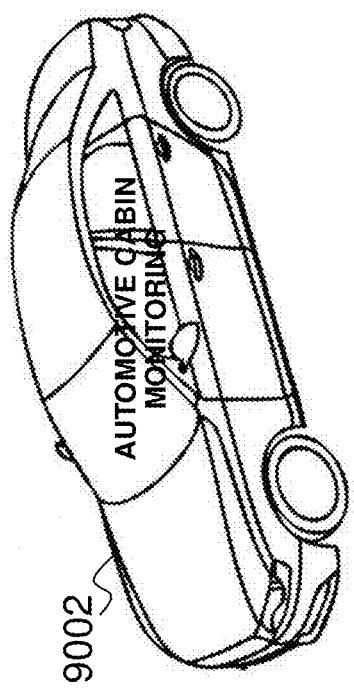
FIG. 48 shows fixed-location multi-gas Raman detectors used for automotive cabin monitoring.

FIG. 48 illustrates a multi-gas Raman detector as a fixed-location multi-gas detector mounted in an automobile to continuously monitor the cabin for hazardous gases 9002.

Figure 49:
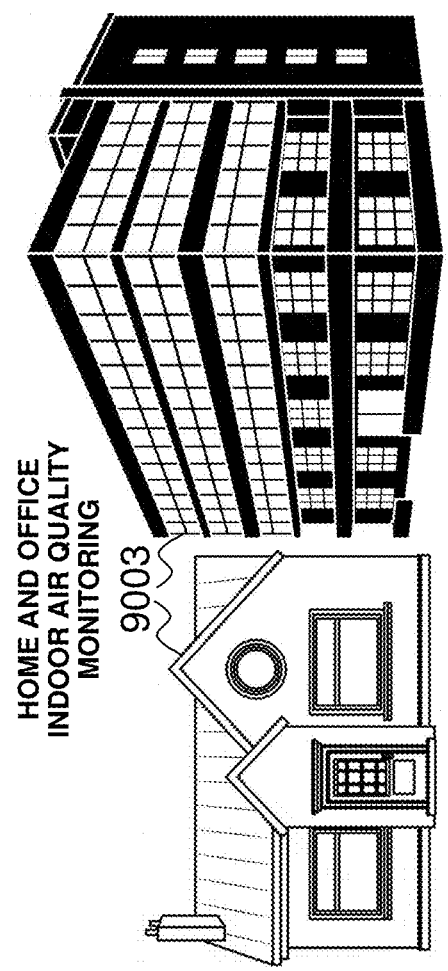
FIG. 49 shows fixed-location and portable multi-gas Raman detectors used for home and office building indoor air quality monitoring.

FIG. 49 illustrates a multi-gas Raman detector as a fixed-location multi-gas detector for monitoring indoor air quality of homes and office buildings 9003.

Figure 50:
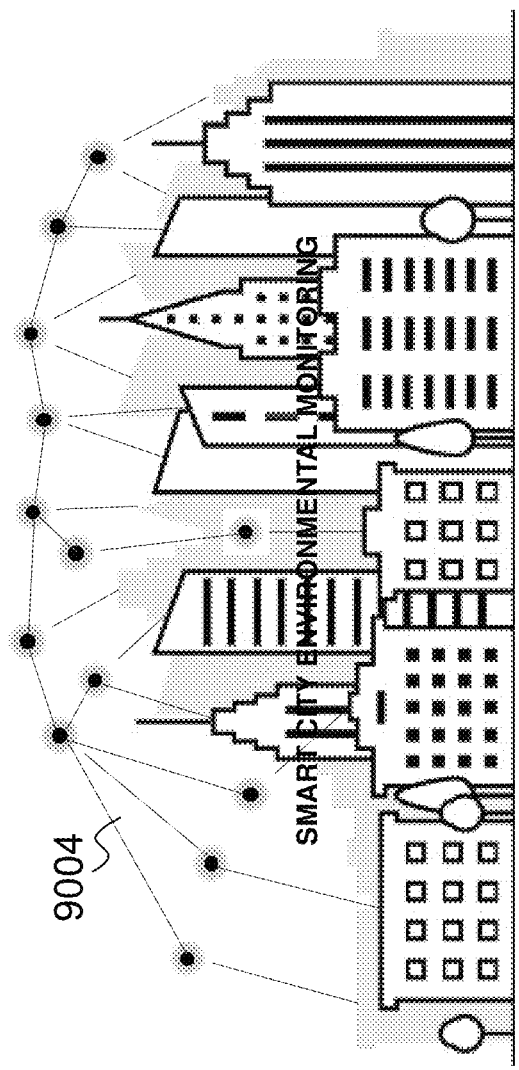
FIG. 50 shows fixed-location and portable multi-gas Raman detectors used for smart city environmental monitoring.

FIG. 50 illustrates a multi-gas Raman detector as a fixed-location multi-gas detector for environmental monitoring in smart cities 9004. The multi-gas Raman detector is suitable for many more applications.

A key importance of applying Raman vibrational spectroscopy for multi-gas detection is the high detection selectivity offered by vibrational spectroscopy, which is a proven technique for multi-gas detection and analysis. Employing Raman spectroscopy provides a unique spectrum of bands at specific frequencies, intensities, and bandwidths that represent molecular vibrations of specific molecular bonds of the sample gas, thus providing a molecular fingerprint that can be used for highly specific sample identification and quantification of each gas of a multi-gas sample. The multi-gas Raman detector invention described herein can be broadly divided into two main subsystems; the Detector and Analyzer subsystems. For example, referring to FIG. 1, the Detector subsystem of multi-gas Raman detector 11 includes laser 119, microlens array 122, enhancement unit 132, optical window 124, optical components for laser beam and enhanced Raman signal steering and conditioning, i.e., lens 120, filter 121, lens 125, filter 126, lens 127, entrance slit 128, spectrometer 129, and optical detector 130. Enhancement unit 132 contains the gas sampling and control hardware, i.e., motorized pumps 133, valves, filters, and gas distribution channels. Regardless of the application, the Detector subsystem hardware remains the same. The Analyzer subsystem is composed of electronic signal conditioning hardware for interfacing to the optical detector, digital computer and display 131, and application software to process the data for the identification and quantification of the detected spectral bands using key metrics, such as, but not limited to, spectral position, band intensity, bandwidth, and band area. In cases where the spectral bands detected from a multi-gas sample are overlapping, the Analyzer can be configured to optimize the multi-gas Raman detector for a particular application. Data analytic chemometric methods, such as principal component analysis and/or machine learning algorithms can aid in the interpretation of the detected Raman spectra of multi-gas samples. Furthermore, vast libraries of a priori measured Raman spectra of various gases are available that enable fast and efficient Raman spectra interpretation. The Analyzer subsystem can be customized for a specific application by means of application-specific software to match for specific spectral characteristics required by the application. The multi-gas Raman detector can be tailored for a specific application by means of application-specific software programmed Analyzer and does not require hardware changes to the multi-gas Raman detector.

The descriptions disclosed herein below will call out components, materials, inputs, or outputs from FIGS. 1-50. The example herein below relates to a Raman multi-gas detection system.

In one embodiment, a Raman multi-gas detection system 11 is composed of an enhancement unit 132 coupled between a light source 119 and a detector 130. The enhancement unit 132 includes a nanogrid 723 with a plurality of nanogaps 6001 where a gas is configured to flow through the plurality of nanogaps 6001, and where constituent molecules in the gas in the nanogaps 6001 are configured to undergo enhanced Raman scattering.

In one embodiment, Raman multi-gas detection system 11 has a nanogrid 723 comprises one or more plasmon-active materials 1141 configured for exciting localized surface plasmon resonance and generation of plasmon-enhanced electric fields 4003.

In one embodiment, Raman multi-gas detection system 11 has a light source which is a laser 119 configured to generate plasmon-enhanced electric fields 4003 in the plurality of nanogaps 6001 of the nanogrid 723 to induce enhanced Raman scattering of the constituent molecules in the gas within the plurality of nanogaps 6001.

In one embodiment, Raman multi-gas detection system 11 has an electric field enhancement factor spectrum 4007 spectrally aligned to the incident laser beam wavelength 4006 and a range of wavelengths where Raman spectra are generated from gas molecules in a multi-gas mixture.

In one embodiment, Raman multi-gas detection system 11 has a laser 119 where laser 119 is configured to be focused on the nanogrid 723 such that only a portion of the plurality of nanogaps 6001 of the nanogrid 723 undergo enhanced Raman scattering.

In one embodiment, Raman multi-gas detection system 11 has a microlens array 122 where microlens array 122 is configured to form a plurality of laser beams 4002 from an incident laser beam 4001, where microlens array 122 is focused at nanogrid 723 such that each laser beam 4002 of the plurality of laser beams excites the localized surface plasmon resonance that generates the plasmon-enhanced electric fields 4003 in the plurality of nanogaps 6001 in nanogrid 723.

In one embodiment, Raman multi-gas detection system 11 where a nanogap 6001 of the plurality of nanogaps in the nanogrid 723 has a circular path.

In one embodiment, Raman multi-gas detection system 11 where a nanogap 6001 of the plurality nanogaps in the nanogrid 723 has a straight line path.

In one embodiment, Raman multi-gas detection system 11 where a nanogap 6001 of the plurality of nanogaps have both a short-range order of 10-100 nm and a long-range order of 10-100 um.

In one embodiment, where Raman multi-gas detection system 11 includes an analyzer 131 coupled to the detector 130.

In one embodiment, Raman multi-gas detection system 11 where a molecule in the gas is configured to scatter the light from the light source 119 at a rate more than 1000 times greater than in free space.

In one embodiment, Raman multi-gas detection system 11 where the enhancement unit 132 is configured to support identification of two or more gases in the gas simultaneously.

In one embodiment, Raman multi-gas detection system 11 where the gas is configured to be recycled through Raman multi-gas detection system 11.

In one embodiment, where Raman multi-gas detection system 11 comprising: a single laser 119; an enhancement unit 132 coupled to the laser configured for receiving a gas; a detector 130; and an analyzer 131 coupled to the detector 130 where the gas is coupled to enhancement unit 132, where the gas is configured to flow through one or more regions of plasmon-enhanced electric fields 4003, and where at least two different constituent molecules in the gas are configured to undergo Raman scattering within enhancement unit 132 and analyzer 131 is configured to identify a first gas and a second gas corresponding to the at least two different constituent molecules.

In one embodiment, Raman multi-gas detection system 11 where the enhancement unit 132 includes a nanogrid 723 having a plurality of nanogaps 6001, where a gas is configured to flow through the plurality of nanogaps 6001, where the single laser 119 is configured to generate plasmon-enhanced electric fields 4003 in the plurality of nanogaps 6001 of nanogrid 723 such that constituent molecules in the gas are configured to undergo enhanced Raman scattering.

In one embodiment, Raman multi-gas detection system 11 where the enhancement unit 132 increases Raman scattering of the at least two different constituent molecules by the gas at a rate more than 1000 times greater than in free space.

In one embodiment, Raman multi-gas detection system 11 where a third different constituent molecule undergoes Raman scattering within the enhancement unit 132 and the analyzer 131 is configured to identify a third gas corresponding to the third different constituent molecule.

In one embodiment, Raman multi-gas detection system 11 is a handheld unit and where $O_2$, $N_2$, $H_2$, $Cl_2$, HCN, CO, $CO_2$, $O_3$, NO, $NO_2$, $N_2O$, $SO_2$, $H_2S$, $ClO_2$, $NH_3$, $PH_3$, $CH_2O$, $C_2H_2$, $CH_4$, $C_3H_8$, and $C_4H_{10}$ are configured to undergo Raman scattering by the single laser 119 in the enhancement unit 132 and are configured to simultaneously be identified by the analyzer 131.

In one embodiment, Raman multi-gas detection system 11 is a handheld unit and where $O_2$, $N_2$, $H_2$, $Cl_2$, HF, HCl, HCN, CO, $CO_2$, $O_3$, NO, $NO_2$, $N_2O$, $SO_2$, $H_2S$, $ClO_2$, $NH_3$, $PH_3$, $AsH_3$, $SiH_4$, HBr, $NH_4Cl$, $CH_2O$, $CCl_4$, $CHCl_3$, $COCl_2$, $C_2Cl_4$, $CH_4$, $C_3H_8$, $CH_3OH$, $C_2H_5OH$, $C_4H_8O$, $C_3H_8O$, $C_2H_2$, $C_2H_4$, $C_2H_6$, $C_4H_{10}$, $C_6H_{14}$, $C_5H_{12}$, $C_2H_4O$, $CH_3CHO$, $C_6H_6$, $C_7H_8$, $C_3H_6O$, $CF_4$, $SF_6$, $SiF_4$, $SO_2F_2$, $C_8F_8$, $C_8H_{10}$, $C_2H_3Cl_3$, and $C_6H_5CH_2CH_3$, are configured to undergo Raman scattering by the single laser 119 in the enhancement unit 132 and are configured to be identified by the analyzer 131.

In one embodiment, Raman multi-gas detection system 11 comprising: a single laser 119; an enhancement unit 132 coupled to the laser 119 where enhancement unit 132 increases Raman scattering by the gas at a rate more than 1000 times greater than in free space; a detector 130; and an analyzer 131 coupled to detector 130 where analyzer 131 is configured to identify at least three different constituent molecules in the gas corresponding to a first gas, a second gas, and a third gas.

While the present invention has been described with reference to particular embodiments, those skilled in the art will recognize that many changes may be made thereto without departing from the spirit and scope of the present invention. Each of these embodiments and obvious variations thereof is contemplated as falling within the spirit and scope of the invention.

What is claimed is:

1. A Raman multi-gas detection system having an enhancement unit coupled between a light source and a detector wherein the enhancement unit includes a nanogrid having a plurality of nanogaps, wherein the nanogrid has a first side and a second side, wherein a gas having constituent molecules to be detected is configured to enter the nanogaps of the nanogrid on the first side of the nanogrid, wherein the nanogaps of the nanogrid are configured having plasmon-enhanced electric fields, and wherein the gas is configured to exit the nanogaps on the second side of the nanogrid such that constituent molecules in the gas are configured to undergo enhanced Raman scattering as they pass through the plasmon-enhanced electric fields of the nanogaps of the nanogrid.

2. The Raman multi-gas detection system of claim 1 wherein the nanogrid is suspended in the system, wherein the nanogaps of the nanogrid extend from the first side to the second side comprising one or more plasmon-active materials configured for exciting localized surface plasmon resonance and generation of the plasmon-enhanced electric fields in the nanogaps of the nanogrid.

3. The Raman multi-gas detection system of claim 1 wherein in the light source comprises a laser and wherein the laser is configured to generate plasmon-enhanced electric fields in the nanogaps of the nanogrid to induce enhanced Raman scattering of the constituent molecules in the gas within and flowing through the plurality of nanogaps of the nanogrid.

4. The Raman multi-gas detection system of claim 3 wherein an electric field enhancement spectrum from the nanogaps of the nanogrid is spectrally aligned to an incident laser beam wavelength and a range of wavelengths where Raman spectra are generated from gas molecules in a multi-gas mixture to optimize enhancement of Raman scattering of the constituent molecules in the gas.

5. The Raman multi-gas detection system of claim 3 wherein the laser is configured to be focused on the nanogrid such that only a portion of the plurality of nanogaps of the nanogrid undergo enhanced Raman scattering.

6. The Raman multi-gas detection system of claim 1 wherein a microlens array is configured to form a plurality of laser beams from an incident laser beam, wherein the microlens array is focused at an array of nanogrids such that each laser beam of the plurality of laser beams excites the localized surface plasmon resonance that generates the plasmon-enhanced electric fields in each nanogrid of the array of nanogrids.

7. The Raman multi-gas detection system of claim 1 wherein at least one nanogap in the nanogrid has a circular path thereby providing excitation of localized surface resonance and generation of the plasmon-enhanced electric fields in the at least one nanogap having the circular path with any laser polarization.

8. The Raman multi-gas detection system of claim 1 wherein a nanogap of the plurality of nanogaps in the nanogrid has a straight line path.

9. The Raman multi-gas detection system of claim 1 wherein a nanogap of the plurality of nanogaps have both a short-range 10-100 nm order and a long-range 10-100 um order.

10. The Raman multi-gas detection system of claim 1 further including a spectral analyzer coupled to the detector.

11. The Raman multi-gas detection system of claim 1 wherein the Raman scattering of the constituent molecules in the gas from interaction with the plasmon-enhanced electric fields occurs at a rate more than 10000 times greater than in the free space.

12. The Raman multi-gas detection system of claim 1 wherein the enhancement unit is configured to support identification of two or more gases in the gas simultaneously.

13. The Raman multi-gas detection system of claim 1 wherein the system is configured to allow the gas to be recycled through the Raman multi-gas detection system.

14. A Raman multi-gas detection system comprising:
a single laser;
an enhancement unit coupled to the laser, wherein the enhancement unit is configured for receiving a gas, wherein the enhancement unit includes a nanogrid having nanogaps, wherein the system is configured to allow gas to flow through the nanogaps of the nanogrid, and wherein the single laser is configured to generate plasmon-enhanced electric fields in at least some of the nanogaps of the nanogrid;
a detector configured to detect enhanced Raman scattering wherein the gas includes at least two different constituent molecules to be detected and wherein the at least two different constituent molecules in the gas undergo enhanced Raman scattering when in the enhanced plasmon electric fields in the at least some of the nanogaps of the nanogrid; and
an analyzer coupled to the detector wherein the analyzer identifies the at least two different constituent molecules in the gas that generate Raman scattering upon flowing through the at least some of the nanogaps of the nanogrid.

15. The Raman multi-gas detection system of claim 14 wherein the enhancement unit of the system is configured to allow gas to flow approximately perpendicular to a plane of the nanogrid and through the nanogaps.

16. The Raman multi-gas detection system of claim 14 wherein the enhancement unit increases Raman scattering of the at least two different constituent molecules by the gas at a rate more than 10000 times greater than in free space.

17. The Raman multi-gas detection system of claim 14 wherein a third different constituent molecule undergoes Raman scattering within the enhancement unit and the analyzer is configured to identify a third gas corresponding to the third different constituent molecule.

18. The Raman multi-gas detection system of claim 14 wherein the Raman multi-gas detection system is a handheld unit and wherein $O_2$, $N_2$, $H_2$, $Cl_2$, HCN, CO, $CO_2$, $O_3$, NO, $NO_2$, $N_2O$, $SO_2$, $H_2S$, $ClO_2$, $NH_3$, $PH_3$, $CH_2O$, $C_2H_2$, $CH_4$, $C_3H_8$, and $C_4H_{10}$ simultaneously undergo Raman scattering by the single laser in the enhancement unit and are identified by the analyzer.

19. The Raman multi-gas detection system of claim 14 wherein the Raman multi-gas detection system is a handheld unit and wherein $O_2$, $N_2$, $H_2$, $Cl_2$, HF, HCl, HCN, CO, $CO_2$, $O_3$, NO, $NO_2$, $N_2O$, $SO_2$, $H_2S$, $ClO_2$, $NH_3$, $PH_3$, $AsH_3$, $SiH_4$, HBr, $NH_4Cl$, $CH_2O$, $CCl_4$, $CHCl_3$, $COCl_2$, $C_2Cl_4$, $CH_4$, $C_3H_8$, $CH_3OH$, $C_2H_5OH$, $C_4H_8O$, $C_3H_8O$, $C_2H_2$, $C_2H_4$, $C_2H_6$, $C_4H_{10}$, $C_6H_{14}$, $C_5H_{12}$, $C_2H_4O$, $CH_3CHO$, $C_6H_6$, $C_7H_8$, $C_3H_6O$, $CF_4$, $SF_6$, $SiF_4$, $SO_2F_2$, $C_8F_8$, $C_8H_{10}$, $C_2H_3Cl_3$, and $C_6H_5CH_2CH_3$, simultaneously undergo Raman scattering by the single laser in the enhancement unit and are identified by the analyzer.

20. A Raman multi-gas detection system comprising:
   a single laser;
   an enhancement unit coupled to the laser wherein the enhancement unit includes a nanogrid having nanogaps, wherein the single laser is configured to generate plasmon-enhanced electric fields in at least some of the nanogaps of the nanogrid, wherein the system is configured to allow the gas to flow through the nanogaps of the nanogrid such that constituent molecules to be detected in the gas undergo enhanced Raman scattering as the constituent molecules enter the enhanced plasmon electric fields of the at least some of the nanogaps of the nanogrid;
   a detector configured to detect the enhanced Raman scattering; and
   an analyzer coupled to the detector wherein the analyzer identifies the constituent molecules in the gas from the enhanced Raman scattering and wherein the gas exiting the nanogrid is configured to be recycled by the system to flow through the nanogaps of nanogrid at least a second time.

* * * * *